US008216065B2

(12) United States Patent
Kaminkow et al.

(10) Patent No.: US 8,216,065 B2
(45) Date of Patent: Jul. 10, 2012

(54) GAMING SYSTEM HAVING MULTIPLE ADJACENTLY ARRANGED GAMING MACHINES WHICH EACH PROVIDE A COMPONENT FOR A MULTI-COMPONENT GAME

(75) Inventors: Joseph E. Kaminkow, Reno, NV (US); Michael MacVittie, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1025 days.

(21) Appl. No.: 11/470,169

(22) Filed: Sep. 5, 2006

(65) Prior Publication Data

US 2007/0167217 A1 Jul. 19, 2007

Related U.S. Application Data

(60) Provisional application No. 60/715,562, filed on Sep. 9, 2005.

(51) Int. Cl.
*A63F 9/24* (2006.01)
*A63F 13/00* (2006.01)
*G06F 17/00* (2006.01)
*G06F 19/00* (2011.01)

(52) U.S. Cl. ................. 463/30; 463/16; 463/17; 463/31

(58) Field of Classification Search .................... 463/17, 463/20, 21, 22, 42, 43
See application file for complete search history.

(56) References Cited

U.S. PATENT DOCUMENTS 2,068,379 A 1/1937 Frantz et al.
4,009,522 A 3/1977 Borianne
4,093,215 A 6/1978 Ballard
4,093,235 A 6/1978 Barry
4,140,319 A 2/1979 Aycock et al.
4,146,233 A 3/1979 Musolino
4,261,575 A 4/1981 Matthews et al.
4,302,016 A 11/1981 Astle et al.
4,332,386 A 6/1982 Townsend
4,437,670 A 3/1984 Simon
4,440,397 A 4/1984 Butner
(Continued)

FOREIGN PATENT DOCUMENTS

AU 200245837 12/2002
(Continued)

OTHER PUBLICATIONS

3RV—Jackpot Party Advertisement, written by WMS Gaming, Inc., published Aug. 8, 2002.

(Continued)

*Primary Examiner* — David L Lewis
*Assistant Examiner* — Reginald Renwick
(74) *Attorney, Agent, or Firm* — Neal, Gerber & Eisenberg LLP

(57) ABSTRACT

A gaming system including a plurality of adjacently arranged gaming machines which are linked by a multi-component game. Each of the gaming machines includes a base or primary game which is operable upon a wager by a player. Upon the occurrence of a component triggering event at one of the gaming machines, that gaming machine generates one or more components of the multi-component game. Upon an evaluation triggering event at one of the gaming machines, that gaming machine determines a multi-component game outcome to provide to the player based on that generated components of other gaming machines. The gaming system determines an award, if any, for that player based on the multi-component game outcome.

67 Claims, 40 Drawing Sheets

U.S. PATENT DOCUMENTS

| | | | |
|---|---|---|---|
| 4,448,419 | A | 5/1984 | Telnaes |
| 4,484,748 | A | 11/1984 | Becze |
| 4,569,526 | A | 2/1986 | Hamilton |
| 4,582,324 | A | 4/1986 | Koza et al. |
| 4,618,150 | A | 10/1986 | Kimura |
| 4,621,814 | A | 11/1986 | Stepan et al. |
| 4,624,459 | A | 11/1986 | Kaufman |
| 4,637,614 | A | 1/1987 | Gibbon et al. |
| 4,666,160 | A | 5/1987 | Hamilton |
| 4,669,731 | A | 6/1987 | Clarke |
| 4,695,053 | A | 9/1987 | Vazquez, Jr. et al. |
| 4,805,907 | A | 2/1989 | Hagiwara |
| 4,838,552 | A | 6/1989 | Hagiwara |
| 4,890,842 | A | 1/1990 | Plange |
| 4,890,843 | A | 1/1990 | Chauve |
| 4,900,027 | A | 2/1990 | Sheridan |
| 4,910,775 | A | 3/1990 | Yves et al. |
| 4,926,327 | A | 5/1990 | Sidley |
| 4,927,156 | A | 5/1990 | Breslow et al. |
| 4,991,848 | A | 2/1991 | Greenwood et al. |
| 5,011,158 | A | 4/1991 | Roberts et al. |
| 5,076,588 | A | 12/1991 | Minh |
| 5,078,405 | A | 1/1992 | Jones et al. |
| 5,083,271 | A | 1/1992 | Thacher et al. |
| 5,088,737 | A | 2/1992 | Frank et al. |
| 5,092,598 | A | 3/1992 | Kamille |
| 5,116,055 | A | 5/1992 | Tracy |
| 5,163,687 | A | 11/1992 | Jenkins |
| 5,178,390 | A | 1/1993 | Okada |
| 5,205,555 | A | 4/1993 | Hamano |
| 5,280,909 | A | 1/1994 | Tracy |
| 5,292,133 | A | 3/1994 | Alexander |
| 5,326,104 | A | 7/1994 | Pease et al. |
| 5,342,047 | A | 8/1994 | Heidel et al. |
| 5,342,056 | A | 8/1994 | Ajaji |
| 5,344,144 | A | 9/1994 | Canon |
| 5,347,306 | A | 9/1994 | Nitta |
| 5,375,830 | A | 12/1994 | Takemoto et al. |
| 5,377,973 | A | 1/1995 | Jones et al. |
| 5,397,125 | A | 3/1995 | Adams |
| 5,407,200 | A | 4/1995 | Zalabak |
| 5,445,391 | A | 8/1995 | Gleason, Jr. |
| 5,456,465 | A | 10/1995 | Durham |
| 5,511,781 | A | 4/1996 | Wood et al. |
| 5,524,888 | A | 6/1996 | Heidel |
| 5,536,016 | A | 7/1996 | Thompson |
| 5,539,450 | A | 7/1996 | Handelman |
| 5,542,669 | A | 8/1996 | Charron et al. |
| 5,560,603 | A | 10/1996 | Seelig et al. |
| 5,564,700 | A | 10/1996 | Celona |
| 5,564,701 | A | 10/1996 | Dettor |
| 5,580,055 | A | 12/1996 | Hagiwara |
| 5,584,485 | A | 12/1996 | Jones et al. |
| 5,584,764 | A | 12/1996 | Inoue |
| 5,592,212 | A | 1/1997 | Handelman |
| 5,611,535 | A | 3/1997 | Tiberio |
| 5,645,485 | A | 7/1997 | Clapper, Jr. |
| 5,645,486 | A | 7/1997 | Nagao et al. |
| 5,655,961 | A | 8/1997 | Acres et al. |
| 5,668,591 | A | 9/1997 | Shintani |
| 5,695,400 | A | 12/1997 | Fennell, Jr. et al. |
| 5,702,304 | A | 12/1997 | Acres et al. |
| 5,707,286 | A | 1/1998 | Carlson |
| 5,711,525 | A | 1/1998 | Breeding |
| 392,340 | A | 3/1998 | DeSimone |
| 5,722,891 | A | 3/1998 | Inoue |
| 5,741,183 | A | 4/1998 | Acres et al. |
| 5,749,785 | A | 5/1998 | Rossides |
| 5,752,882 | A | 5/1998 | Acres et al. |
| 5,766,074 | A | 6/1998 | Cannon et al. |
| 5,766,076 | A | 6/1998 | Pease et al. |
| 5,769,716 | A | 6/1998 | Saffari et al. |
| 5,772,509 | A | 6/1998 | Weiss |
| 5,775,692 | A | 7/1998 | Watts et al. |
| 5,779,547 | A | 7/1998 | Byrne |
| 5,779,549 | A | 7/1998 | Walker et al. |
| 5,788,235 | A | 8/1998 | Thomas |
| 5,788,573 | A | 8/1998 | Baerlocher et al. |
| 5,807,172 | A | 9/1998 | Piechowiak |
| 5,816,918 | A | 10/1998 | Kelly et al. |
| 5,817,172 | A | 10/1998 | Yamada et al. |
| 5,820,459 | A | 10/1998 | Acres et al. |
| 5,823,874 | A | 10/1998 | Adams |
| 5,830,063 | A | 11/1998 | Brune |
| 5,833,538 | A | 11/1998 | Weiss |
| 5,836,817 | A | 11/1998 | Acres et al. |
| 5,848,932 | A | 12/1998 | Adams |
| 5,851,148 | A | 12/1998 | Brune et al. |
| 5,851,149 | A | 12/1998 | Xidos et al. |
| 5,855,514 | A | 1/1999 | Kamille |
| 5,855,515 | A | 1/1999 | Pease et al. |
| 5,873,781 | A | 2/1999 | Keane |
| 5,876,283 | A | 3/1999 | Parra et al. |
| 5,876,284 | A | 3/1999 | Acres et al. |
| 5,882,105 | A | 3/1999 | Barlow |
| 5,882,261 | A | 3/1999 | Adams |
| 5,885,158 | A | 3/1999 | Torango et al. |
| 5,890,963 | A | 4/1999 | Yen |
| 5,902,184 | A | 5/1999 | Bennett |
| 5,910,048 | A | 6/1999 | Feinberg |
| 5,911,418 | A | 6/1999 | Adams |
| 5,917,725 | A | 6/1999 | Thacher et al. |
| 5,927,714 | A | 7/1999 | Kaplan |
| 5,934,672 | A | 8/1999 | Sines et al. |
| 5,947,820 | A | 9/1999 | Morro et al. |
| 5,951,011 | A | 9/1999 | Potter et al. |
| 5,951,397 | A | 9/1999 | Dickinson |
| 5,957,775 | A | 9/1999 | Cherry |
| 5,964,463 | A | 10/1999 | Moore, Jr. |
| 5,967,893 | A | 10/1999 | Lawrence et al. |
| 5,967,894 | A | 10/1999 | Kinoshita et al. |
| 5,969,704 | A | 10/1999 | Green et al. |
| 416,054 | A | 11/1999 | McGahn et al. |
| 5,976,015 | A | 11/1999 | Seelig et al. |
| 5,976,016 | A | 11/1999 | Moody et al. |
| 5,980,384 | A | 11/1999 | Barrie |
| 5,984,310 | A | 11/1999 | English |
| 5,984,781 | A | 11/1999 | Sunaga |
| 5,993,316 | A | 11/1999 | Coyle et al. |
| 5,997,002 | A | 12/1999 | Goldman |
| 5,997,400 | A | 12/1999 | Seelig et al. |
| 5,997,401 | A | 12/1999 | Crawford |
| 6,001,016 | A | 12/1999 | Walker et al. |
| 6,004,207 | A | 12/1999 | Wilson, Jr. et al. |
| 6,009,458 | A | 12/1999 | Hawkins et al. |
| 6,012,983 | A | 1/2000 | Walker et al. |
| 6,015,344 | A | 1/2000 | Kelly et al. |
| 6,015,346 | A | 1/2000 | Bennett |
| 6,019,369 | A | 2/2000 | Nakagawa et al. |
| 6,030,288 | A | 2/2000 | Davis et al. |
| 6,032,955 | A | 3/2000 | Luciano et al. |
| 6,033,307 | A | 3/2000 | Vancura |
| 6,045,447 | A | 4/2000 | Yoshizawa et al. |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,065,752 | A | 5/2000 | Beltran |
| 6,071,192 | A | 6/2000 | Weiss |
| 6,077,162 | A | 6/2000 | Weiss |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,102,400 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,110,043 | A | 8/2000 | Olsen |
| 6,113,098 | A | 9/2000 | Adams |
| 6,120,031 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |

6,135,884 A 10/2000 Hedrick et al.
6,142,872 A 11/2000 Walker et al.
6,142,873 A 11/2000 Weiss et al.
6,142,874 A 11/2000 Kodachi et al.
6,142,875 A 11/2000 Kodachi et al.
6,146,273 A * 11/2000 Olsen .............................. 463/27
6,155,925 A 12/2000 Giobbi et al.
6,158,741 A 12/2000 Koelling
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,162,122 A 12/2000 Acres et al.
6,165,072 A 12/2000 Davis et al.
6,168,520 B1 1/2001 Baerlocher et al.
6,168,522 B1 1/2001 Walker et al.
6,168,523 B1 1/2001 Piechowiak et al.
6,174,233 B1 1/2001 Sunaga et al.
6,174,235 B1 1/2001 Walker et al.
6,174,237 B1 1/2001 Stephenson
6,186,894 B1 2/2001 Mayeroff
6,190,254 B1 2/2001 Bennett
6,190,255 B1 2/2001 Thomas et al.
6,192,347 B1 2/2001 Graff
6,200,216 B1 3/2001 Peppel
6,203,429 B1 3/2001 Demar et al.
6,206,782 B1 3/2001 Walker et al.
6,210,275 B1 4/2001 Olsen
6,210,277 B1 4/2001 Stefan
6,210,279 B1 4/2001 Dickinson
6,213,876 B1 4/2001 Moore, Jr.
6,217,448 B1 4/2001 Olsen
6,220,959 B1 4/2001 Holmes, Jr. et al.
6,224,482 B1 5/2001 Bennett
6,224,483 B1 5/2001 Mayeroff
6,224,484 B1 5/2001 Okuda et al.
6,227,969 B1 5/2001 Yoseloff
6,227,971 B1 5/2001 Weiss
6,231,442 B1 5/2001 Mayeroff
6,231,445 B1 5/2001 Acres
6,234,897 B1 5/2001 Frohm et al.
6,236,900 B1 5/2001 Geiger
6,238,287 B1 5/2001 Komori et al.
6,241,608 B1 6/2001 Torango
6,244,957 B1 6/2001 Walker et al.
6,244,958 B1 6/2001 Acres
6,254,481 B1 7/2001 Jaffe
6,254,482 B1 7/2001 Walker et al.
6,254,483 B1 7/2001 Acres
6,257,981 B1 7/2001 Acres et al.
6,260,019 B1 7/2001 Courts
6,261,177 B1 7/2001 Bennett
6,270,409 B1 8/2001 Shuster
6,270,412 B1 8/2001 Crawford et al.
6,293,864 B1 9/2001 Romero
6,296,569 B1 10/2001 Congello, Jr.
6,299,165 B1 10/2001 Nagano
6,302,790 B1 10/2001 Brossard
6,302,791 B1 10/2001 Frohm et al.
6,305,686 B1 10/2001 Perrie et al.
6,309,299 B1 10/2001 Weiss
6,309,300 B1 10/2001 Glavich
6,311,976 B1 11/2001 Yoseloff et al.
6,312,331 B1 11/2001 Tamaki
6,312,332 B1 11/2001 Walker et al.
6,312,333 B1 11/2001 Acres
6,312,334 B1 11/2001 Yoseloff
6,315,660 B1 11/2001 Demar et al.
6,315,662 B1 11/2001 Jorasch et al.
6,315,664 B1 11/2001 Baerlocher et al.
6,319,122 B1 11/2001 Packes, Jr. et al.
6,319,123 B1 11/2001 Paludi
6,319,124 B1 11/2001 Baerlocher et al.
6,319,125 B1 11/2001 Acres
6,328,649 B1 12/2001 Randall et al.
6,336,860 B1 1/2002 Webb
6,336,862 B1 1/2002 Brune
6,346,043 B1 2/2002 Colin et al.
6,347,996 B1 2/2002 Gilmore et al.
6,356,539 B1 3/2002 Zuliani et al.
6,358,147 B1 3/2002 Jaffe et al.
6,358,149 B1 3/2002 Schneider et al.
6,364,768 B1 4/2002 Acres et al.
6,368,214 B1 4/2002 Luciano
6,371,852 B1 4/2002 Acres
6,375,187 B1 4/2002 Baerlocher
6,375,567 B1 4/2002 Acres
6,375,568 B1 4/2002 Roffman et al.
6,375,569 B1 4/2002 Acres
6,386,975 B1 5/2002 Peterson
6,398,218 B1 6/2002 Vancura
6,409,172 B1 6/2002 Vancura
6,428,412 B1 8/2002 Anderson et al.
6,431,983 B2 8/2002 Acres
6,435,511 B1 8/2002 Vancura et al.
6,439,995 B1 8/2002 Hughs-Baird et al.
6,443,456 B1 9/2002 Gajor
6,443,841 B1 9/2002 Rossides
6,450,884 B1 9/2002 Seelig et al.
RE37,885 E 10/2002 Acres et al.
6,461,241 B1 10/2002 Webb et al.
6,464,582 B1 10/2002 Baerlocher et al.
6,468,159 B1 10/2002 La Mura et al.
6,482,089 B2 11/2002 DeMar et al.
6,491,584 B2 12/2002 Graham et al.
6,494,785 B1 12/2002 Gerard et al.
6,506,117 B2 1/2003 Demar et al.
6,506,118 B1 1/2003 Baerlocher et al.
6,508,707 B2 1/2003 Demar et al.
6,514,141 B1 2/2003 Kaminkow et al.
6,520,855 B2 2/2003 Demar et al.
6,565,434 B1 5/2003 Acres
6,565,442 B2 5/2003 La Mura et al.
6,569,015 B1 5/2003 Baerlocher et al.
6,569,018 B2 5/2003 Jaffe
6,571,344 B1 5/2003 Sitnik
6,572,471 B1 6/2003 Bennett
6,575,831 B1 6/2003 Gonen et al.
6,575,832 B1 6/2003 Manfredi et al.
6,582,302 B2 6/2003 Romero
6,582,306 B1 6/2003 Kaminkow
6,585,586 B1 7/2003 Romero
6,592,459 B2 7/2003 Parra et al.
6,592,460 B2 7/2003 Torango
6,599,192 B1 7/2003 Baerlocher et al.
6,599,193 B2 7/2003 Baerlocher et al.
6,607,438 B2 8/2003 Baerlocher et al.
6,607,441 B1 8/2003 Acres
6,609,969 B1 8/2003 Luciano et al.
6,609,970 B1 8/2003 Luciano, Jr.
6,620,046 B2 9/2003 Rowe
6,626,758 B1 9/2003 Parham et al.
6,632,141 B2 10/2003 Webb et al.
6,632,142 B2 10/2003 Keith
6,634,942 B2 10/2003 Walker et al.
6,648,753 B1 11/2003 Tracy et al.
6,648,754 B2 11/2003 Baerlocher et al.
6,648,757 B1 11/2003 Slomiany et al.
6,648,759 B2 11/2003 Vancura
6,652,378 B2 11/2003 Cannon et al.
6,656,043 B2 12/2003 Seelig et al.
6,656,047 B1 12/2003 Tarantino et al.
6,656,050 B2 12/2003 Busch et al.
6,659,861 B1 12/2003 Faris et al.
6,676,513 B2 1/2004 Gauselmann
6,676,521 B1 1/2004 La Mura et al.
6,682,073 B2 1/2004 Bryant et al.
6,682,419 B2 1/2004 Webb et al.
6,682,420 B2 1/2004 Webb et al.
6,688,973 B2 2/2004 Satloff et al.
6,688,976 B1 2/2004 Tulley et al.
6,692,354 B2 2/2004 Tracy et al.
6,692,355 B2 2/2004 Baerlocher et al.
6,695,696 B1 2/2004 Kaminkow
6,709,330 B1 3/2004 Klein et al.
6,712,695 B2 3/2004 Mothwurf et al.
6,712,697 B2 3/2004 Acres

| | | | | |
|---|---|---|---|---|
| 6,718,312 | B1 | 4/2004 | Mcafee et al. | |
| 6,719,632 | B2 | 4/2004 | Palmer et al. | |
| 6,722,981 | B2 | 4/2004 | Kaminkow et al. | |
| 6,722,982 | B2 | 4/2004 | Kaminkow et al. | |
| 6,726,562 | B2 | 4/2004 | Vancura | |
| 6,726,563 | B1 | 4/2004 | Baerlocher et al. | |
| 6,733,389 | B2 | 5/2004 | Webb et al. | |
| 6,733,390 | B2 * | 5/2004 | Walker et al. | 463/23 |
| 6,735,324 | B1 | 5/2004 | Mckinley et al. | |
| 6,739,970 | B2 | 5/2004 | Luciano | |
| 6,745,236 | B1 | 6/2004 | Hawkins et al. | |
| 6,746,332 | B1 | 6/2004 | Ing et al. | |
| 6,749,510 | B2 | 6/2004 | Giobbi | |
| 6,758,746 | B1 | 7/2004 | Hunter et al. | |
| 6,758,748 | B2 | 7/2004 | Byrne | |
| 6,760,861 | B2 | 7/2004 | Fukuhara et al. | |
| 6,764,396 | B2 | 7/2004 | Seelig et al. | |
| 6,767,287 | B1 | 7/2004 | Mcquaid et al. | |
| 6,773,344 | B1 | 8/2004 | Gabai et al. | |
| 6,776,711 | B1 | 8/2004 | Baerlocher | |
| 6,786,820 | B2 | 9/2004 | Gerard et al. | |
| 6,793,577 | B1 | 9/2004 | Wilkins et al. | |
| 6,793,579 | B2 | 9/2004 | Baerlocher et al. | |
| 6,796,899 | B2 | 9/2004 | Baerlocher | |
| 6,796,900 | B2 | 9/2004 | Baerlocher et al. | |
| 6,796,905 | B2 | 9/2004 | Baerlocher et al. | |
| 6,800,030 | B2 | 10/2004 | Acres | |
| 6,805,628 | B2 | 10/2004 | Romero | |
| 6,808,452 | B2 | 10/2004 | Baerlocher et al. | |
| 6,811,483 | B1 | 11/2004 | Webb et al. | |
| 6,811,485 | B2 | 11/2004 | Kaminkow | |
| 6,814,664 | B2 | 11/2004 | Baerlocher et al. | |
| 6,832,956 | B1 | 12/2004 | Boyd et al. | |
| 6,832,958 | B2 | 12/2004 | Acres et al. | |
| 6,835,132 | B2 | 12/2004 | Bennett | |
| 6,837,788 | B2 | 1/2005 | Cannon | |
| 6,852,030 | B2 | 2/2005 | Baerlocher et al. | |
| 6,860,810 | B2 | 3/2005 | Cannon et al. | |
| 6,860,811 | B1 | 3/2005 | Wilkins | |
| 6,869,076 | B1 | 3/2005 | Moore et al. | |
| 6,876,988 | B2 | 4/2005 | Helsper et al. | |
| 6,878,063 | B2 | 4/2005 | Manfredi et al. | |
| 6,883,803 | B1 | 4/2005 | Barry | |
| 6,887,154 | B1 | 5/2005 | Luciano, Jr. et al. | |
| 6,896,614 | B2 | 5/2005 | Romero | |
| 6,910,964 | B2 | 6/2005 | Acres | |
| 6,923,720 | B2 | 8/2005 | Loose | |
| RE38,812 | E | 10/2005 | Acres et al. | |
| 6,964,608 | B1 | 11/2005 | Koza | |
| 6,981,917 | B2 | 1/2006 | Webb et al. | |
| 6,986,711 | B2 | 1/2006 | Vancura | |
| 6,988,948 | B2 | 1/2006 | Perrie et al. | |
| 6,996,413 | B2 | 2/2006 | Inselberg | |
| 7,008,324 | B1 * | 3/2006 | Johnson et al. | 463/42 |
| 7,018,292 | B2 | 3/2006 | Tracy et al. | |
| 7,029,395 | B1 | 4/2006 | Baerlocher | |
| 7,033,272 | B1 | 4/2006 | Mason | |
| 7,036,145 | B1 | 4/2006 | Murphy et al. | |
| 7,037,195 | B2 | 5/2006 | Schneider et al. | |
| 7,040,982 | B1 | 5/2006 | Jarvis et al. | |
| 7,048,628 | B2 | 5/2006 | Schneider | |
| 7,054,831 | B2 | 5/2006 | Koenig | |
| 7,056,212 | B2 | 6/2006 | Boyd et al. | |
| 7,056,215 | B1 | 6/2006 | Olive | |
| 7,058,602 | B1 | 6/2006 | La Mura et al. | |
| 7,077,746 | B2 | 7/2006 | Torango | |
| 7,085,740 | B1 | 8/2006 | Meyers | |
| 7,086,945 | B2 | 8/2006 | Vancura | |
| 7,107,239 | B2 | 9/2006 | Graff | |
| 7,130,820 | B2 | 10/2006 | Song | |
| 7,156,741 | B2 | 1/2007 | Hornik et al. | |
| 7,169,041 | B2 | 1/2007 | Tessmer et al. | |
| 7,169,046 | B2 | 1/2007 | Webb et al. | |
| 7,192,350 | B2 | 3/2007 | Nguyen | |
| 7,195,560 | B2 | 3/2007 | Demar et al. | |
| 7,200,571 | B1 | 4/2007 | Jenniges et al. | |
| 7,207,563 | B2 | 4/2007 | Samberg | |
| 2001/0018361 | A1 | 8/2001 | Acres | |
| 2001/0025252 | A1 | 9/2001 | Yoshimoto | |

| | | | | |
|---|---|---|---|---|
| 2001/0029200 | A1 | 10/2001 | Romero | |
| 2001/0030395 | A1 | 10/2001 | Sunday | |
| 2001/0034635 | A1 | 10/2001 | Winters | |
| 2001/0039206 | A1 | 11/2001 | Peppel | |
| 2001/0049625 | A1 | 12/2001 | Mowry | |
| 2001/0055990 | A1 | 12/2001 | Acres | |
| 2001/0056396 | A1 | 12/2001 | Goino | |
| 2002/0002070 | A1 | 1/2002 | Romero | |
| 2002/0006820 | A1 | 1/2002 | Romero | |
| 2002/0013763 | A1 | 1/2002 | Harris | |
| 2002/0028708 | A1 | 3/2002 | Busch et al. | |
| 2002/0042296 | A1 | 4/2002 | Walker et al. | |
| 2002/0086725 | A1 | 7/2002 | Fasbender et al. | |
| 2002/0094869 | A1 | 7/2002 | Harkham | |
| 2002/0103746 | A1 | 8/2002 | Moffett | |
| 2002/0107074 | A1 | 8/2002 | Lee | |
| 2002/0137559 | A1 | 9/2002 | Baerlocher | |
| 2002/0138342 | A1 | 9/2002 | Clark et al. | |
| 2002/0138594 | A1 | 9/2002 | Rowe | |
| 2002/0142832 | A1 | 10/2002 | Loose et al. | |
| 2002/0147045 | A1 | 10/2002 | La Mura et al. | |
| 2002/0147046 | A1 | 10/2002 | Wang | |
| 2002/0147675 | A1 | 10/2002 | Das et al. | |
| 2002/0151342 | A1 | 10/2002 | Tracy et al. | |
| 2002/0155870 | A1 | 10/2002 | Romero | |
| 2002/0155885 | A1 | 10/2002 | Shvili | |
| 2002/0163122 | A1 | 11/2002 | Vancura | |
| 2002/0177483 | A1 | 11/2002 | Cannon | |
| 2002/0178264 | A1 | 11/2002 | Benda et al. | |
| 2002/0183105 | A1 | 12/2002 | Cannon et al. | |
| 2002/0187827 | A1 | 12/2002 | Blankstein | |
| 2002/0187836 | A1 | 12/2002 | Meyer | |
| 2003/0018564 | A1 | 1/2003 | Bonnier et al. | |
| 2003/0027623 | A1 | 2/2003 | Rose | |
| 2003/0027625 | A1 | 2/2003 | Rowe | |
| 2003/0032476 | A1 | 2/2003 | Walker et al. | |
| 2003/0032479 | A1 | 2/2003 | LeMay et al. | |
| 2003/0032480 | A1 | 2/2003 | Keith | |
| 2003/0033607 | A1 | 2/2003 | Schwalb | |
| 2003/0036424 | A1 | 2/2003 | Baerlocher | |
| 2003/0040363 | A1 | 2/2003 | Sandberg | |
| 2003/0045350 | A1 | 3/2003 | Baerlocher et al. | |
| 2003/0046221 | A1 | 3/2003 | Hora | |
| 2003/0054873 | A1 | 3/2003 | Peterson | |
| 2003/0054879 | A1 | 3/2003 | Schneier et al. | |
| 2003/0055713 | A1 | 3/2003 | Pinto et al. | |
| 2003/0057884 | A1 | 3/2003 | Dowling et al. | |
| 2003/0060266 | A1 | 3/2003 | Baerlocher | |
| 2003/0060269 | A1 | 3/2003 | Paulsen et al. | |
| 2003/0060276 | A1 | 3/2003 | Walker et al. | |
| 2003/0060279 | A1 | 3/2003 | Torango | |
| 2003/0060281 | A1 | 3/2003 | Vancura | |
| 2003/0064784 | A1 | 4/2003 | Wells et al. | |
| 2003/0069063 | A1 | 4/2003 | Bilyeu et al. | |
| 2003/0069070 | A1 | 4/2003 | Alcorn et al. | |
| 2003/0078871 | A1 | 4/2003 | Webb | |
| 2003/0092480 | A1 | 5/2003 | White et al. | |
| 2003/0092484 | A1 | 5/2003 | Schneider et al. | |
| 2003/0092490 | A1 | 5/2003 | Gauselmann | |
| 2003/0119570 | A1 | 6/2003 | Maroun | |
| 2003/0144965 | A1 | 7/2003 | Prasad et al. | |
| 2003/0148804 | A1 * | 8/2003 | Ikeya et al. | 463/16 |
| 2003/0153383 | A1 | 8/2003 | Baerlocher et al. | |
| 2003/0153385 | A1 * | 8/2003 | Ikeya et al. | 463/31 |
| 2003/0159083 | A1 | 8/2003 | Fukuhara et al. | |
| 2003/0176214 | A1 * | 9/2003 | Burak et al. | 463/20 |
| 2003/0177347 | A1 | 9/2003 | Schneier et al. | |
| 2003/0195031 | A1 | 10/2003 | O'Donovan et al. | |
| 2003/0195045 | A1 | 10/2003 | Kaminkow et al. | |
| 2003/0199308 | A1 | 10/2003 | Parker | |
| 2003/0199313 | A1 | 10/2003 | Gonen et al. | |
| 2003/0211880 | A1 | 11/2003 | Locke | |
| 2003/0222402 | A1 | 12/2003 | Olive | |
| 2003/0225615 | A1 | 12/2003 | Sumiyoshi | |
| 2003/0225617 | A1 | 12/2003 | Sumiyoshi | |
| 2003/0228904 | A1 | 12/2003 | Acres et al. | |
| 2003/0236116 | A1 | 12/2003 | Marks et al. | |
| 2004/0009811 | A1 | 1/2004 | Torango | |
| 2004/0009817 | A1 | 1/2004 | La Mura et al. | |

| | | | |
|---|---|---|---|
| 2004/0010771 | A1 | 1/2004 | Wallace et al. |
| 2004/0010793 | A1 | 1/2004 | Wallace et al. |
| 2004/0039677 | A1 | 2/2004 | Mura et al. |
| 2004/0043770 | A1 | 3/2004 | Amit et al. |
| 2004/0043815 | A1 | 3/2004 | Kaminkow |
| 2004/0054551 | A1 | 3/2004 | Ausubel et al. |
| 2004/0058731 | A1 | 3/2004 | Rossides |
| 2004/0072615 | A1 | 4/2004 | Maya et al. |
| 2004/0082372 | A1 | 4/2004 | Romero |
| 2004/0083154 | A1 | 4/2004 | Guler et al. |
| 2004/0097287 | A1 | 5/2004 | Postrel |
| 2004/0104530 | A1 | 6/2004 | Moe |
| 2004/0106449 | A1 | 6/2004 | Walker et al. |
| 2004/0110552 | A1 | 6/2004 | Del Prado |
| 2004/0116176 | A1 | 6/2004 | Tulley et al. |
| 2004/0148221 | A1 | 7/2004 | Chu |
| 2004/0162129 | A1 | 8/2004 | Nelson |
| 2004/0180717 | A1 | 9/2004 | Vancura |
| 2004/0192437 | A1 | 9/2004 | Amaitis et al. |
| 2004/0193489 | A1 | 9/2004 | Boyd et al. |
| 2004/0204232 | A1 | 10/2004 | Asher et al. |
| 2004/0204235 | A1 * | 10/2004 | Walker et al. .................. 463/29 |
| 2004/0209663 | A1 | 10/2004 | Webb et al. |
| 2004/0215548 | A1 | 10/2004 | Chieu et al. |
| 2004/0224772 | A1 | 11/2004 | Canessa et al. |
| 2004/0229700 | A1 | 11/2004 | Cannon et al. |
| 2004/0242294 | A1 | 12/2004 | Shiozawa |
| 2004/0242297 | A1 | 12/2004 | Walker et al. |
| 2004/0242315 | A1 | 12/2004 | Paulsen et al. |
| 2004/0242322 | A1 | 12/2004 | Montagna et al. |
| 2004/0248637 | A1 | 12/2004 | Liebenberg et al. |
| 2004/0260641 | A1 | 12/2004 | Cohen |
| 2004/0267624 | A1 | 12/2004 | Nuriel |
| 2005/0004984 | A1 | 1/2005 | Simpson |
| 2005/0020342 | A1 | 1/2005 | Palmer et al. |
| 2005/0032573 | A1 | 2/2005 | Acres et al. |
| 2005/0037840 | A1 | 2/2005 | Baerlocher |
| 2005/0041161 | A1 | 2/2005 | Dowling et al. |
| 2005/0043088 | A1 | 2/2005 | Nguyen et al. |
| 2005/0049933 | A1 | 3/2005 | Upendran et al. |
| 2005/0049957 | A1 | 3/2005 | Vakili et al. |
| 2005/0050160 | A1 | 3/2005 | Upendran et al. |
| 2005/0050576 | A1 | 3/2005 | Upendran et al. |
| 2005/0054429 | A1 | 3/2005 | Baerlocher et al. |
| 2005/0054434 | A1 | 3/2005 | Baerlocher et al. |
| 2005/0056700 | A1 | 3/2005 | Mckinley et al. |
| 2005/0059461 | A1 | 3/2005 | Ching et al. |
| 2005/0060050 | A1 | 3/2005 | Baerlocher |
| 2005/0064937 | A1 | 3/2005 | Ballman |
| 2005/0070353 | A1 | 3/2005 | Webb et al. |
| 2005/0076362 | A1 | 4/2005 | Dukes et al. |
| 2005/0079911 | A1 | 4/2005 | Nakatsu |
| 2005/0079912 | A1 | 4/2005 | Hanafusa |
| 2005/0085300 | A1 | 4/2005 | Johnson |
| 2005/0090306 | A1 | 4/2005 | Seelig et al. |
| 2005/0091144 | A1 | 4/2005 | Longman et al. |
| 2005/0102215 | A1 | 5/2005 | Ausubel et al. |
| 2005/0119047 | A1 | 6/2005 | Olive |
| 2005/0125309 | A1 | 6/2005 | Song |
| 2005/0143168 | A1 | 6/2005 | Torango |
| 2005/0153767 | A1 | 7/2005 | Gauselmann |
| 2005/0164792 | A1 | 7/2005 | Wilcock |
| 2005/0173054 | A1 | 8/2005 | Peterson |
| 2005/0176488 | A1 | 8/2005 | Olive |
| 2005/0176494 | A1 | 8/2005 | Thomas |
| 2005/0181856 | A1 | 8/2005 | Cannon et al. |
| 2005/0187004 | A1 | 8/2005 | Vancura |
| 2005/0187021 | A1 | 8/2005 | Daskalakis |
| 2005/0187873 | A1 | 8/2005 | Labrou et al. |
| 2005/0202873 | A1 | 9/2005 | Asher et al. |
| 2005/0202874 | A1 | 9/2005 | Asher et al. |
| 2005/0209004 | A1 | 9/2005 | Torango |
| 2005/0216391 | A1 | 9/2005 | Tews |
| 2005/0218590 | A1 | 10/2005 | O'Halloran et al. |
| 2005/0233794 | A1 | 10/2005 | Cannon et al. |
| 2005/0233803 | A1 | 10/2005 | Yang |
| 2005/0239542 | A1 | 10/2005 | Olsen |
| 2005/0240318 | A1 | 10/2005 | Naoi et al. |
| 2005/0240558 | A1 | 10/2005 | Gil et al. |
| 2005/0267834 | A1 | 12/2005 | Zetmeir |
| 2005/0269778 | A1 | 12/2005 | Samberg |
| 2005/0273417 | A1 | 12/2005 | Budish |
| 2005/0282615 | A1 | 12/2005 | Englman et al. |
| 2005/0282629 | A1 | 12/2005 | Gagner |
| 2005/0285337 | A1 | 12/2005 | Durham et al. |
| 2006/0003829 | A1 | 1/2006 | Thomas |
| 2006/0003834 | A1 | 1/2006 | Okada |
| 2006/0009283 | A1 | 1/2006 | Englman et al. |
| 2006/0009286 | A1 | 1/2006 | Durham et al. |
| 2006/0014580 | A1 | 1/2006 | Hawthorn |
| 2006/0025211 | A1 | 2/2006 | Wilday et al. |
| 2006/0030402 | A1 | 2/2006 | Chandrakumar et al. |
| 2006/0035705 | A1 | 2/2006 | Jordon |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046817 | A1 | 3/2006 | Paulsen et al. |
| 2006/0046839 | A1 | 3/2006 | Nguyen |
| 2006/0047581 | A1 | 3/2006 | La Mura et al. |
| 2006/0063580 | A1 | 3/2006 | Nguyen et al. |
| 2006/0064184 | A1 | 3/2006 | Ream et al. |
| 2006/0068919 | A1 | 3/2006 | Gottfurcht |
| 2006/0069619 | A1 | 3/2006 | Walker et al. |
| 2006/0073897 | A1 | 4/2006 | Englman et al. |
| 2006/0079317 | A1 | 4/2006 | Flemming et al. |
| 2006/0085261 | A1 | 4/2006 | Chu |
| 2006/0085321 | A1 | 4/2006 | Staib et al. |
| 2006/0089188 | A1 | 4/2006 | Romero |
| 2006/0093142 | A1 | 5/2006 | Schneier et al. |
| 2006/0094495 | A1 | 5/2006 | Gelber et al. |
| 2006/0100006 | A1 | 5/2006 | Mitchell et al. |
| 2006/0105827 | A1 | 5/2006 | Metzger et al. |
| 2006/0111979 | A1 | 5/2006 | Chu |
| 2006/0111985 | A1 | 5/2006 | Sheldon et al. |
| 2006/0116194 | A1 | 6/2006 | Pacey et al. |
| 2006/0121971 | A1 | 6/2006 | Slomiany et al. |
| 2006/0123053 | A1 | 6/2006 | Scannell |
| 2006/0135260 | A1 | 6/2006 | Boss et al. |
| 2006/0138728 | A1 | 6/2006 | Gordon et al. |
| 2006/0167784 | A1 | 7/2006 | Hoffberg |
| 2006/0178217 | A1 | 8/2006 | Jung et al. |
| 2006/0182258 | A1 | 8/2006 | Sisselman et al. |
| 2006/0183547 | A1 | 8/2006 | Mcmonigle |
| 2006/0184989 | A1 | 8/2006 | Slothouber |
| 2006/0189371 | A1 | 8/2006 | Walker et al. |
| 2006/0190392 | A1 | 8/2006 | Samid |
| 2006/0195382 | A1 | 8/2006 | Sung |
| 2006/0205492 | A1 | 9/2006 | Linard et al. |
| 2006/0211482 | A1 | 9/2006 | Pimienta et al. |
| 2006/0217199 | A1 | 9/2006 | Adcox et al. |
| 2006/0221195 | A1 | 10/2006 | Sohmers |
| 2006/0223616 | A1 | 10/2006 | Tulley et al. |
| 2006/0223617 | A1 | 10/2006 | Tulley et al. |
| 2006/0230158 | A1 | 10/2006 | Fukazawa et al. |
| 2006/0234795 | A1 | 10/2006 | Dhunjishaw et al. |
| 2006/0235745 | A1 | 10/2006 | Yano |
| 2006/0246991 | A1 | 11/2006 | Tulley et al. |
| 2006/0247040 | A1 | 11/2006 | Walker et al. |
| 2006/0247056 | A1 | 11/2006 | Luckerson |
| 2006/0252476 | A1 | 11/2006 | Bahou |
| 2006/0258429 | A1 | 11/2006 | Manning et al. |
| 2006/0259361 | A1 | 11/2006 | Barhydt et al. |
| 2006/0259418 | A1 | 11/2006 | Feaver |
| 2006/0259957 | A1 | 11/2006 | Tam et al. |
| 2006/0270478 | A1 | 11/2006 | Barhydt et al. |
| 2006/0277053 | A1 | 12/2006 | Lobb et al. |
| 2006/0287041 | A1 | 12/2006 | Walker et al. |
| 2006/0287924 | A1 | 12/2006 | Admon |
| 2006/0293994 | A1 | 12/2006 | Stuart |
| 2007/0004509 | A1 | 1/2007 | Banton |
| 2007/0004517 | A1 | 1/2007 | Mahajan |
| 2007/0004519 | A1 | 1/2007 | Swart et al. |
| 2007/0010314 | A1 | 1/2007 | Tulley et al. |
| 2007/0021168 | A1 | 1/2007 | Chamizer et al. |
| 2007/0021176 | A1 | 1/2007 | Jackson |
| 2007/0026928 | A1 | 2/2007 | Tulley et al. |

| | | | |
|---|---|---|---|
| 2007/0026929 | A1 | 2/2007 | Tulley et al. |
| 2007/0032286 | A1 | 2/2007 | Muir |
| 2007/0050281 | A1 | 3/2007 | Hoffman |
| 2007/0054718 | A1 | 3/2007 | Del Prado |
| 2007/0055606 | A1 | 3/2007 | Ausubel et al. |
| 2007/0060276 | A1 | 3/2007 | Monahan |
| 2007/0060380 | A1 | 3/2007 | Mcmonigle et al. |
| 2007/0063433 | A1 | 3/2007 | Ross |
| 2007/0072678 | A1 | 3/2007 | Dagres |
| 2007/0077981 | A1 | 4/2007 | Hungate et al. |
| 2007/0077997 | A1 | 4/2007 | Johnson |
| 2007/0087816 | A1 | 4/2007 | Van Luchene |
| 2007/0087820 | A1 | 4/2007 | Van Luchene et al. |
| 2007/0087822 | A1 | 4/2007 | Van Luchene |
| 2007/0087823 | A1 | 4/2007 | Walker et al. |
| 2007/0087833 | A1 | 4/2007 | Feeney et al. |
| 2007/0087835 | A1 | 4/2007 | Van Luchene |
| 2007/0099685 | A1 | 5/2007 | Van Luchene |
| 2007/0105612 | A1 | 5/2007 | Fotevski |
| 2007/0111770 | A1 | 5/2007 | Van Luchene |
| 2007/0111784 | A1 | 5/2007 | Van Luchene |
| 2007/0111789 | A1 | 5/2007 | Van Deursen et al. |
| 2007/0117601 | A1 | 5/2007 | Van Luchene |
| 2007/0117610 | A1 | 5/2007 | Webb et al. |
| 2007/0118432 | A1 | 5/2007 | Vazirani et al. |
| 2007/0129124 | A1 | 6/2007 | Van Luchene |
| 2007/0129125 | A1 | 6/2007 | Van Luchene |
| 2007/0129139 | A1 | 6/2007 | Nguyen et al. |
| 2007/0129148 | A1 | 6/2007 | Van Luchene |
| 2007/0167238 | A1 | 7/2007 | Gatto et al. |

FOREIGN PATENT DOCUMENTS

| | | |
|---|---|---|
| EP | 0 558 307 | 2/1993 |
| EP | 0 981 119 | 2/2000 |
| EP | 1 234 606 | 8/2002 |
| EP | 1 288 817 | 3/2003 |
| EP | 1 306 788 | 5/2003 |
| EP | 1 346 305 | 9/2003 |
| EP | 1 513 114 | 3/2005 |
| EP | 1 513 116 | 3/2005 |
| EP | 1 536 388 | 6/2005 |
| EP | 1 580 701 | 9/2005 |
| GB | 970806 | 9/1964 |
| GB | 2 137 392 | 10/1984 |
| GB | 2 262 642 | 6/1993 |
| GB | 2 322 217 | 8/1998 |
| GB | 2 387 950 | 10/2003 |
| JP | 7213738 | 8/1995 |
| WO | WO 80/01356 | 7/1980 |
| WO | WO 96/25725 | 8/1996 |
| WO | WO 99/03078 | 1/1999 |
| WO | WO 00/12186 | 3/2000 |
| WO | WO 00/32286 | 6/2000 |
| WO | WO 01/73590 | 10/2001 |
| WO | WO 02/097582 | 12/2002 |
| WO | WO 03/026757 | 4/2003 |
| WO | WO 03/032217 | 4/2003 |
| WO | WO 2005/015826 | 2/2005 |
| WO | WO 2005/075037 | 8/2005 |
| WO | WO 2005/077480 | 8/2005 |
| WO | WO 2006/014833 | 2/2006 |
| WO | WO 2006/017431 | 2/2006 |

OTHER PUBLICATIONS

Auction Fever Advertisement, written by Sierra Design Group, available prior to Sep. 9, 2006.

"Auction," [online] [printed on Apr. 27, 2007]. Retrieved from the Internet at <URL: http://en.wikipedia.org/wiki/Auction>.

Creepy and Kooky Article, written by Frank Legato, published by Strictly Slots in Jul. 2000.

Jackpot Party Advertisements on website page http://www.wmsgaming.com/products/video/vjpp/howto.html, printed on Feb. 7, 2001, available prior to Sep. 5, 2006.

Jackpot Party Advertisements and Articles, written by WMS Gaming, Inc., published in Mar. 1998.

Jackpot Party Video 9-Line Advertisement, written by WMS Gaming, Inc., available prior to Sep. 5, 2006.

Slots 2003 Article, written by Melissa Raimondi, published in Jan. 2003.

* cited by examiner

100

260

GAMING SYSTEM HAVING MULTIPLE ADJACENTLY ARRANGED GAMING MACHINES WHICH EACH PROVIDE A COMPONENT FOR A MULTI-COMPONENT GAME

PRIORITY CLAIM

This application is a non-provisional application of, claims priority to and the benefit of U.S. Provisional Patent Application Ser. No. 60/715,562, filed on Sep. 9, 2005, which is incorporated herein in its entirety.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming machines that provide as much enjoyment, entertainment and excitement as possible. Providing interesting and exciting primary games and secondary games in which a player has an opportunity to win potentially large awards or credits is one way to enhance player enjoyment and excitement. Another way to enhance a player's enjoyment, entertainment and excitement with a gaming machine is by including lights, sounds or other visual or audio or audio-visual effects in the gaming machines.

Certain known gaming devices use mechanical devices such as reels, wheels and light displays to enhance the attraction of the machines to players and also to enhance the player's game playing experience. These mechanical devices enable a player to see physical movements of a game, a portion of a game, or a functional game event or element which increases the player's enjoyment of the game.

To increase player enjoyment and excitement with gaming devices, it is desirable to provide new and different gaming systems.

SUMMARY

The present disclosure generally relates to gaming systems and methods, and more particularly a gaming system and method providing a plurality of adjacently arranged gaming machines or devices which are related or linked by a multi-component game having a plurality of individual components. In one embodiment, each of the adjacently arranged gaming machines includes a base or primary game operable upon a wager by a player, a base or primary game display or first display device operable to display the base or primary game, and a component display or second display device operable to display individual components of the multi-component game. The component displays of the adjacently arranged gaming machines co-act to display the components of the multi-component game needed for an evaluation of the multi-component game.

The present disclosure includes various embodiments and configurations of how and when the individual components are generated on each gaming machine by each gaming machine or by a central controller. In one embodiment, each gaming machine includes at least one component triggering event. In this embodiment, upon the occurrence of a component triggering event on one of the gaming machines, the gaming machine generates one of the components of the multi-component game and causes the component display device of that gaming machine to display the generated component. The gaming machine also sends a signal to the central controller to indicate which component the gaming machine generated. This embodiment provides for an independent generation of the components by each of the individual gaming machines. In other embodiments, upon the occurrence of a component triggering event on one of the gaming machines, the central controller determines the individual component for that gaming machine. In one embodiment, when one gaming machine obtains the component triggering event, a different gaming machine displays a different component. That is, another component is not generated on the triggering gaming machine but is generated on another gaming machine. In another embodiment, upon a component triggering event, the player of the triggering gaming machine determines which gaming machine displays the component triggering event. In other embodiments, when one gaming machine has an occurrence of the component triggering event, a plurality or all of the other gaming machines of the gaming system generate and display a component on the component display devices. Each of the component triggering event or events on each gaming machine can be any suitable event.

In other embodiments, the central controller additionally or alternatively determines if component triggering events occur for one or more of the gaming machines, and such individual gaming machines determine the individual components. In further embodiments, the central controller additionally or alternatively determines if a component triggering event occurs for one or more of the gaming machines, and the central controller determines the individual component for the gaming machines and sends a signal to that gaming machine to display that selected component. That is, the central controller determines which component or components the gaming devices generate and display. It should be appreciated that the individual components displayed by the gaming machines may be changed or generated in any suitable manner and at any suitable time (based on the occurrence of the triggering events and in alternative manners including sequentially, simultaneously, randomly, in one or more predetermined patterns etc.). It should also be appreciated that a gaming machine component display may display multiple components, although it is preferable that the component display displays less than a designated number of components needed for an evaluation of the multi-component game.

In one embodiment, the base or primary game influences one or more aspects or characteristics of the multi-component game. In one embodiment, the generated component is derived from the primary game. That is, an element of the primary game influences which component is generated in the multi-component game.

In one embodiment, an element of the primary game is a component triggering event which causes the generation of one component, and an element of the primary game also determines which component is generated for the multi-component game.

The present disclosure also includes various configurations of how and when the combination of individual components displayed by individual gaming machines are evaluated by each gaming machine or by a central controller to determine whether to provide one or more players of the gaming machines any awards. In one embodiment, each gaming machine includes at least one evaluation triggering event. In this embodiment, upon the occurrence of an evaluation triggering event on one of the gaming machines, the gaming machine is operable with the central controller to evaluate the generated and displayed components of the multi-component game on the adjacently arranged gaming machines to determine the multi-component game outcome and if the multi-component game outcome results in an award, to provide the award to the player of that gaming machine. Thus, in one embodiment the evaluation triggering event must occur on or in relation to the gaming machine for that gaming machine to provide an award. In other embodiments, the occurrence of the evaluation triggering event on one of the gaming machines causes a plurality or all of the gaming machines to provide any determined awards. In other embodiments, the central controller additionally or alternatively determines if evaluation triggering events occur for one or more of the gaming machines. In one such embodiment, the central controller also determines the multi-component game outcome and/or the award to provide to the player based on the multi-component outcome.

In one embodiment, a gaming machine which is being played and has an occurrence of either a component triggering event or an evaluation triggering event is considered or assumed to be active or to be in an active state. That is, the gaming machine is active to either generate a component of the multi-component game and/or evaluate the generated components of the gaming system to provide a multi-component outcome to the player.

In one embodiment, the gaming system also enables active or eligible gaming machines to participate in or win awards from the multi-component game though they did not have an occurrence of the component triggering event. That is, the gaming system enables other non-triggering gaming machines to participate in either or both of the component generation and the evaluation event. In one embodiment, if the gaming machine is active during the occurrence of the component triggering event at another one of the gaming machines, any gaming machine which is active, in addition to the triggering gaming machine, generates at least one component of the multi-component game. In one embodiment, if the gaming machine is active during the occurrence of an evaluation triggering event at one of the other gaming machines, the non-triggering gaming machine is operable with the central controller to evaluate the generated and displayed components of the multi-component game on the adjacently arranged gaming machines to determine the multi-component game outcome and if the multi-component game outcome results in an award, to provide the award to the player of that gaming machine. In another embodiment, the central controller determines which gaming machines are active during the occurrence of an evaluation triggering event at one of the other gaming machines. In one such embodiment, the central controller is operable to evaluate the generated and displayed components of the multi-component game on the adjacently arranged gaming machines to determine the multi-component game outcome and if the multi-component game outcome results in an award, to cause the gaming machines to provide one or more awards to one or more players of the gaming machines.

It should appreciated that in certain embodiments the component triggering event and the evaluation triggering event are combined into one event. In one such embodiment, an occurrence of an evaluation triggering event may include the generation and display of one or more components before or after the evaluation.

It should be also appreciated that the occurrence of the component triggering event and the evaluation triggering event may occur at any gaming machine, at any time and in any order. For example, a first gaming machine may have five component triggering events before another gaming machine has one component triggering event. In another example, one gaming machine may have the occurrence of ten component triggering events before having an occurrence of the evaluation triggering event.

It should be appreciated that the primary games of the adjacently arranged gaming machines in the system can be any suitable game such as slot, poker, blackjack, keno, bingo, and any combination thereof. It should also be appreciated that the primary games of the gaming machines can be the same or may be different.

It should be appreciated that the multi-component game provided by the adjacently arranged secondary or component displays of the adjacently arranged gaming machines of the gaming system can be any suitable game with a plurality of individual components such as slot, poker, blackjack, keno, bingo, a digit game, an auction, a trading game, a bidding game or any competition game.

In one embodiment, the primary game on each gaming machine is a slot game and the multi-component game is a slot game. These slot games may be the same slot games or may be different slot games. In this embodiment, each gaming machine includes a first, lower or primary display device for displaying the primary slot game and a second, upper or component display device for displaying one or more components of the multi-component slot game. In one such embodiment, each of the component display devices is operable to display one symbol generator of a multi-symbol generator game. In one embodiment, the symbol generators are reels and the component display devices are each operable to display one reel of a multi-reel slot game. Each reel includes a plurality of components, such as a plurality of conventional reel symbols. Upon a component triggering event on one of the gaming machines, that gaming machine generates at least one symbol and causes the component display device of that gaming machine to display the symbol. The gaming machine sends a signal to the central controller to indicate the generated and displayed symbol. Upon an evaluation triggering event, the central controller in communication with the individual gaming machines, evaluates the displayed symbols on the component displays of the gaming machines to determine if there is a multi-component game winning combination or outcome. The central controller determines an award, if any, to be provided to one or more of the players based on this symbol combination and sends the appropriate signal to the appropriate gaming machines. The appropriate gaming machines provide the determined awards to the players.

In one embodiment, only the gaming machine with the component triggering event displays another component. In another embodiment, one or more of the other non-triggering gaming machines generates and displays another component. In another embodiment, both the triggering gaming machine and one or more of the other non-triggering gaming machines generate and display another component.

In another embodiment, each of the gaming machines of the gaming system includes a primary slot game and a secondary multi-component draw poker game. In one such embodiment, the gaming system includes five gaming machines. In this embodiment, each gaming machine displays one card, so that combining the displayed cards, the gaming system has a five card poker hand in the multi-component game. Upon each component triggering event, at least one of the gaming machines generates and displays one of the cards on its component display device and sends a signal to the central controller indicating the displayed card. In this embodiment, upon the occurrence of an evaluation triggering event on one of the gaming machines, the gaming machine is operable with the central controller to evaluate the generated and displayed cards to determine the multi-component game outcome and if the multi-component game outcome results in an award, to provide the award to the player of that gaming machine.

In one embodiment, the primary game is a slot game and the multi-component game is a digit game. A plurality of the component display devices or each of the component display devices of the gaming devices displays a number or digit. Upon a component triggering event, one or more of the gaming machines display a newly generated digit. Upon an evaluation triggering event, the gaming machines determine an award based on the generated and displayed digits.

In one such embodiment, each of the gaming machines generates another digit at certain intervals of wagers are wagered on that gaming machine. That is, the component triggering event is a designated wager threshold or a wager amount. For example, each gaming machine increases the display digit by 1 for every $20 wagered on the individual gaming machine. In one embodiment, when the displayed digit is a 9, the digit remains a 9 until there is a winner at that gaming machine. In one embodiment, upon a payout, the digit is changed to a 0. Upon an evaluation triggering event, the player wins an award based on all of the digits displayed by all of the component display devices of the gaming system. It should be appreciated that the component triggering event and the evaluation triggering event may be the same event. It should be appreciated that the digits may be generated either randomly or according to any suitable game feature. In one embodiment, upon a payout, the digit or digits are randomly reset. In another embodiment, upon a payout, the digits are reset based on a primary game feature. It should be appreciated that the digits may be reset in any suitable manner.

In another multi-component digit game embodiment, each of the component display devices displays a digit. The digits may either change or remain the same. One of the component display devices displays a decimal point. The gaming machine that displays the decimal point changes upon certain triggering events. That is, different gaming machines each generate and display the decimal point on the component display devices either randomly or upon triggering conditions or events, thus changing the displayed number. Upon an evaluation triggering event at one of the gaming machines, that gaming machine provides an award to the player based on the displayed digits.

In another multi-component digit game embodiment, the digits on one or more of the gaming machines "shift" upon the triggering of a component triggering event. That is, one or more of the component display devices displays a number or digit previously displayed on one of the other adjacent component display devices upon a component triggering event, therefore changing the displayed number. It should be appreciated that the digits may shift to the left or the right and change the award. It should be appreciated that less than all of the digits may shift. In one embodiment, the gaming machine with the component triggering event generates and displays a newly generated digit and the gaming machine to the left of the gaming machine displays the number previously displayed by the triggering gaming machine. The next gaming machine to the left displays the number previously displayed by the gaming machine to the right etc. This embodiment may be implemented in any suitable manner.

In another embodiment, the gaming system includes a plurality of gaming machines and each gaming machine includes a primary game. In this embodiment, each of the gaming machines displays an individual secondary or bonus game on the secondary or component display devices. Each of the secondary or component display devices additionally displays a multi-component game. The bonus game and the multi-component game may be implemented and displayed in any suitable manner. In one embodiment, if a player of one of the gaming devices achieves or obtains a bonus triggering event, the gaming machine enables the player to play the associated individual secondary or bonus game and obtain a bonus game outcome and any associated awards. Upon a multi-component triggering event at one of the gaming machines, the gaming machine generates a new component for the player in the multi-component game. In this embodiment, the evaluation triggering event for the multi-component game is the same triggering event as the component triggering event. Therefore, when a player achieves the component triggering event, the gaming machine generates a new symbol in the multi-component game and evaluates the components for any winning combinations or outcomes. In one embodiment, the bonus game is triggered by an event in the multi-outcome game. In one such embodiment, the bonus game is triggered by a winning combination in the multi-component game.

In another multi-game embodiment, each of the gaming machines includes a primary game and a plurality of bonus games, and the gaming system includes a multi-component game. In one embodiment, the wager for the primary game determines which bonus game the gaming machine enables the player to play if the player achieves the bonus game. For example, a wager of $1 enables the player to play blackjack, a wager of $5 enables the player to play a selection game and a wager of $5 enables the player to play a wheel game. In one embodiment, the primary game includes a component triggering event. Upon an occurrence of the component triggering event, that gaming machine and/or other non-triggering gaming machines generate a new component. That gaming machine makes an evaluation to determine if the components are a multi-component game winning outcome. In one embodiment, a multi-component game winning outcome is the triggering event for the bonus game. Thus, if the player obtains the component triggering event and achieves a winning outcome in the multi-component game, the gaming machine enables the player to play the bonus game. The gaming machine provides the player with any of the awards associated with the games.

It should be appreciated that the components of the multi-component game may be constantly changing. For example, in one embodiment, when each of the gaming machines are active or are being played, each time the player achieves a component triggering event the displayed component changes. As players see the associated combinations of components, they may try to wager more or less on what they see. For example, when the multi-component game is a reel game, and the reels display three jackpot symbols, player may play as fast as they can to try to obtain an evaluation triggering event to win the jackpot award. It should be appreciated that the large display and interaction between the gaming machines creates excitement for the players.

Additional features and advantages are described herein, and will be apparent from, the following Detailed Description and the figures.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
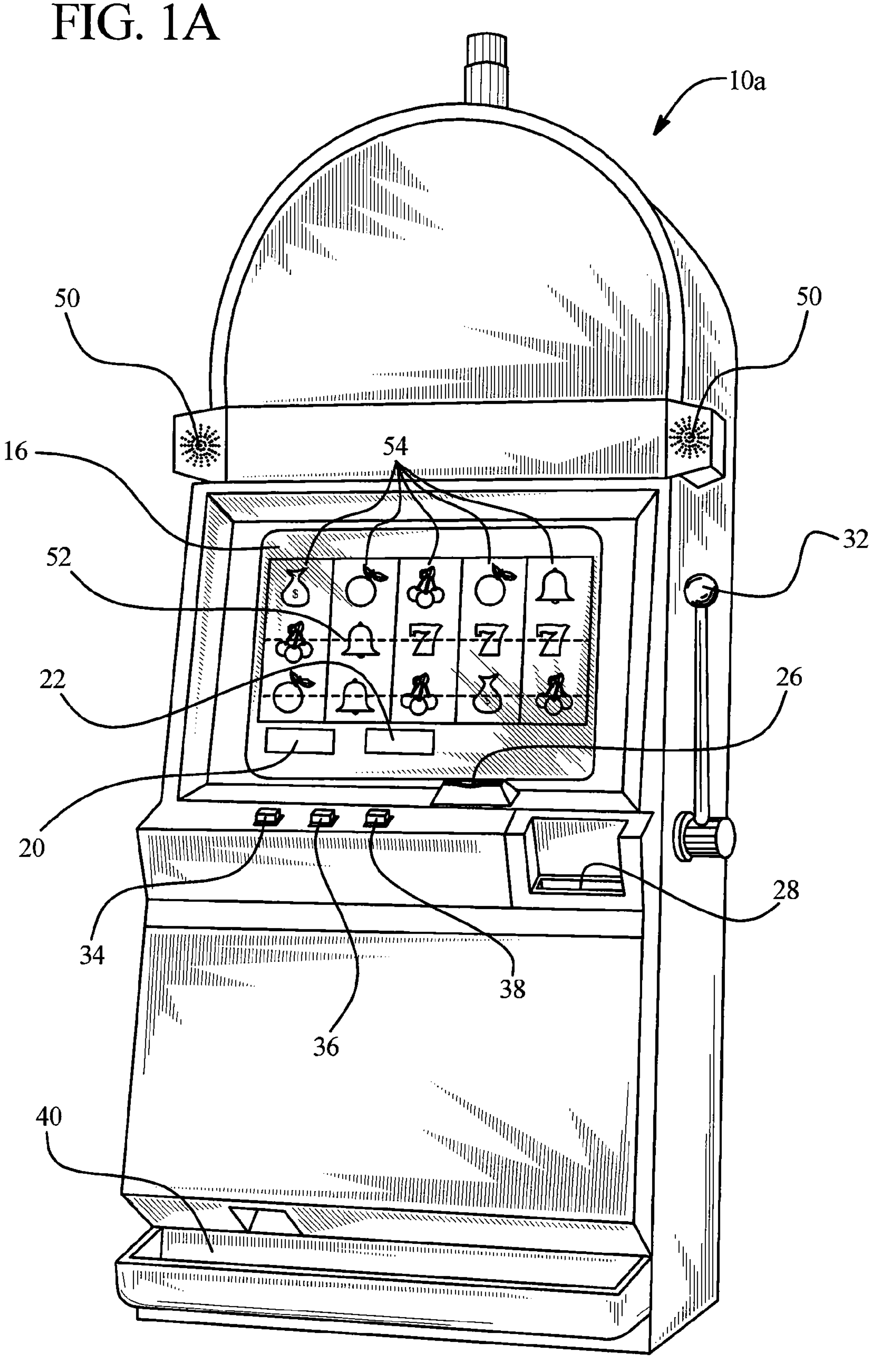
FIGS. 1A and 1B are perspective views of alternative embodiments of the gaming devices of the disclosed gaming system.
Figure 1B:
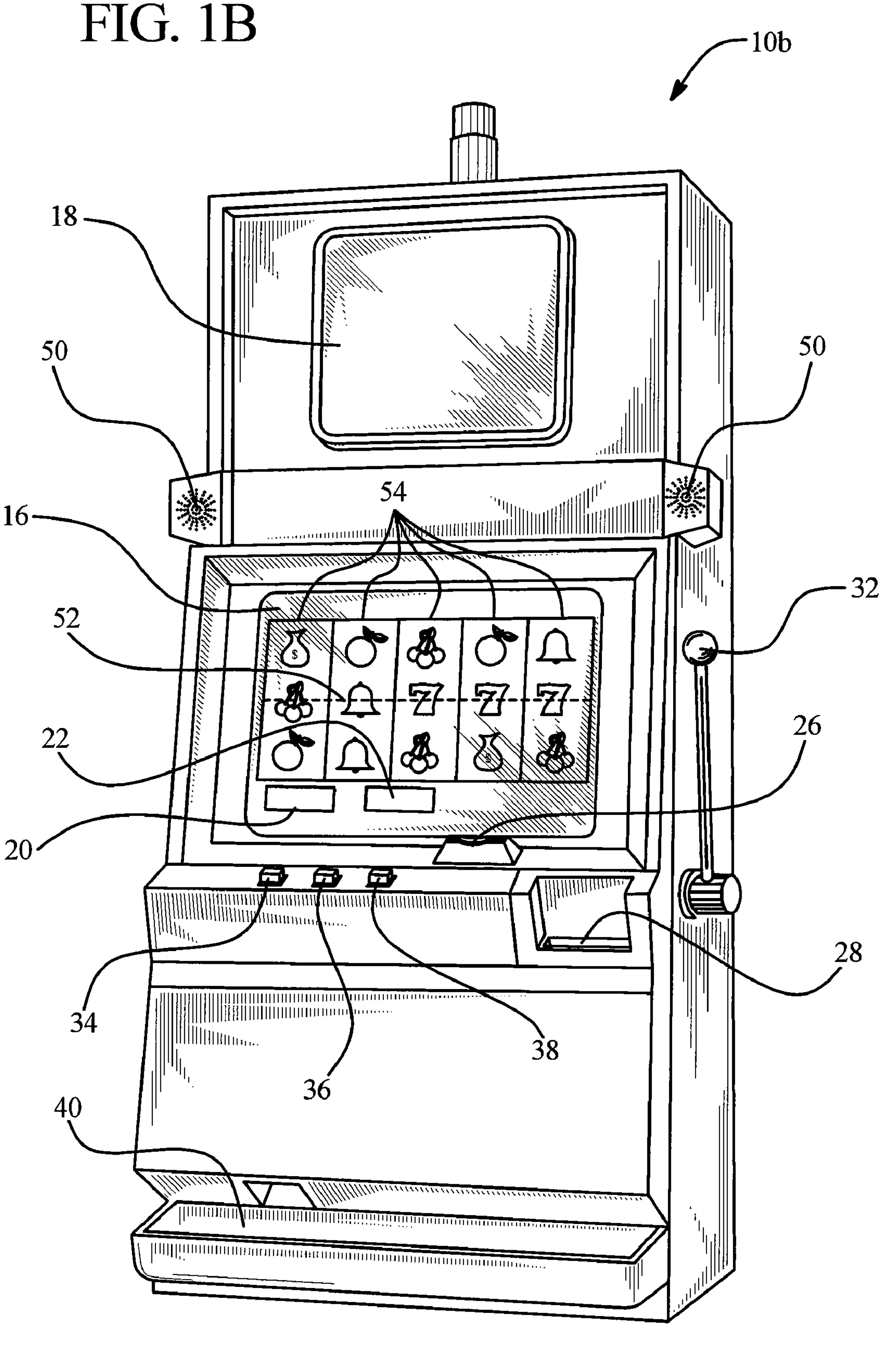

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
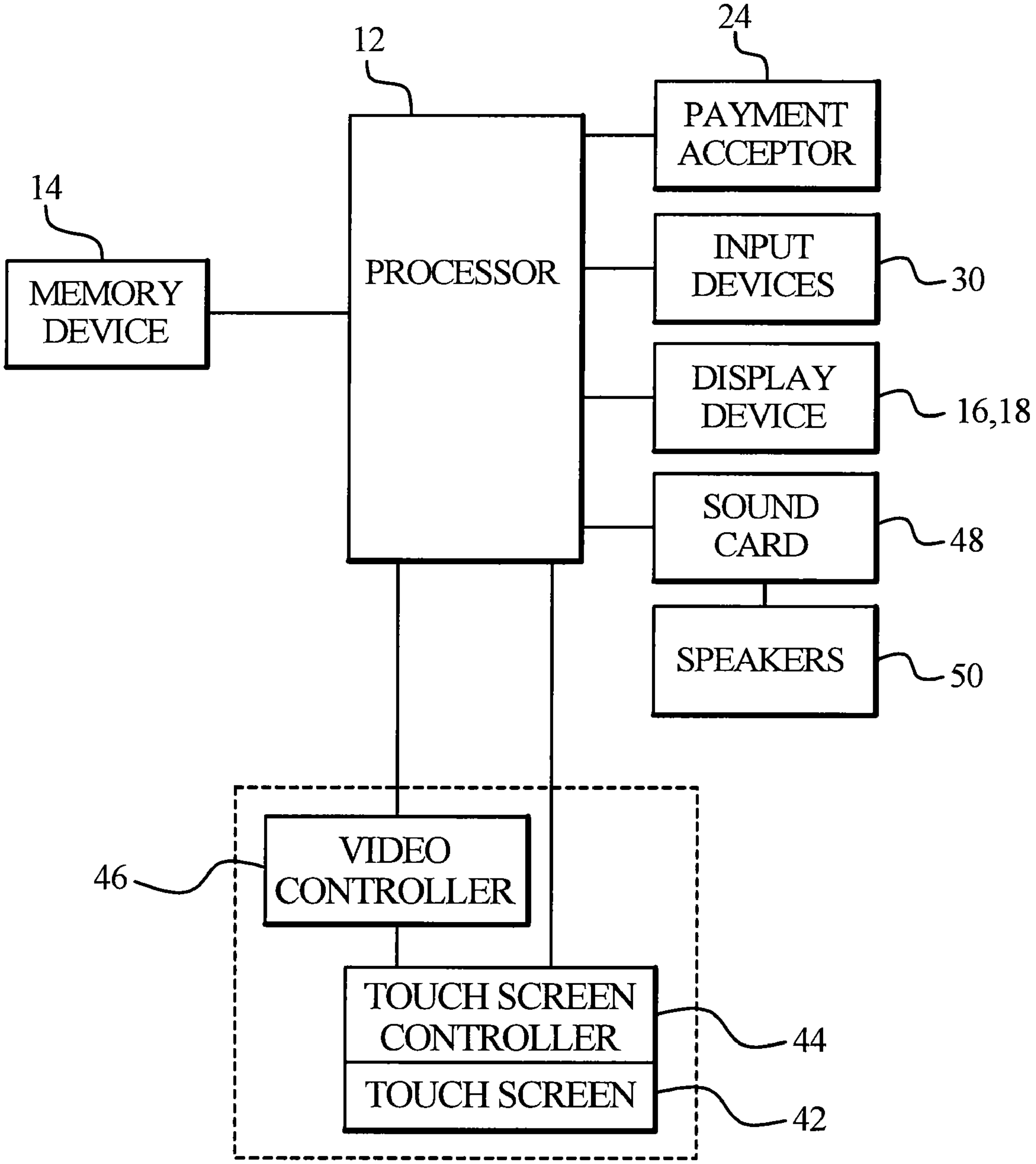
FIG. 2A is a schematic block diagram of an electronic configuration of one embodiment of the disclosed gaming system.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel. It should be appreciated that the utilization of touch-screens is widespread in the gaming industry.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols.

This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
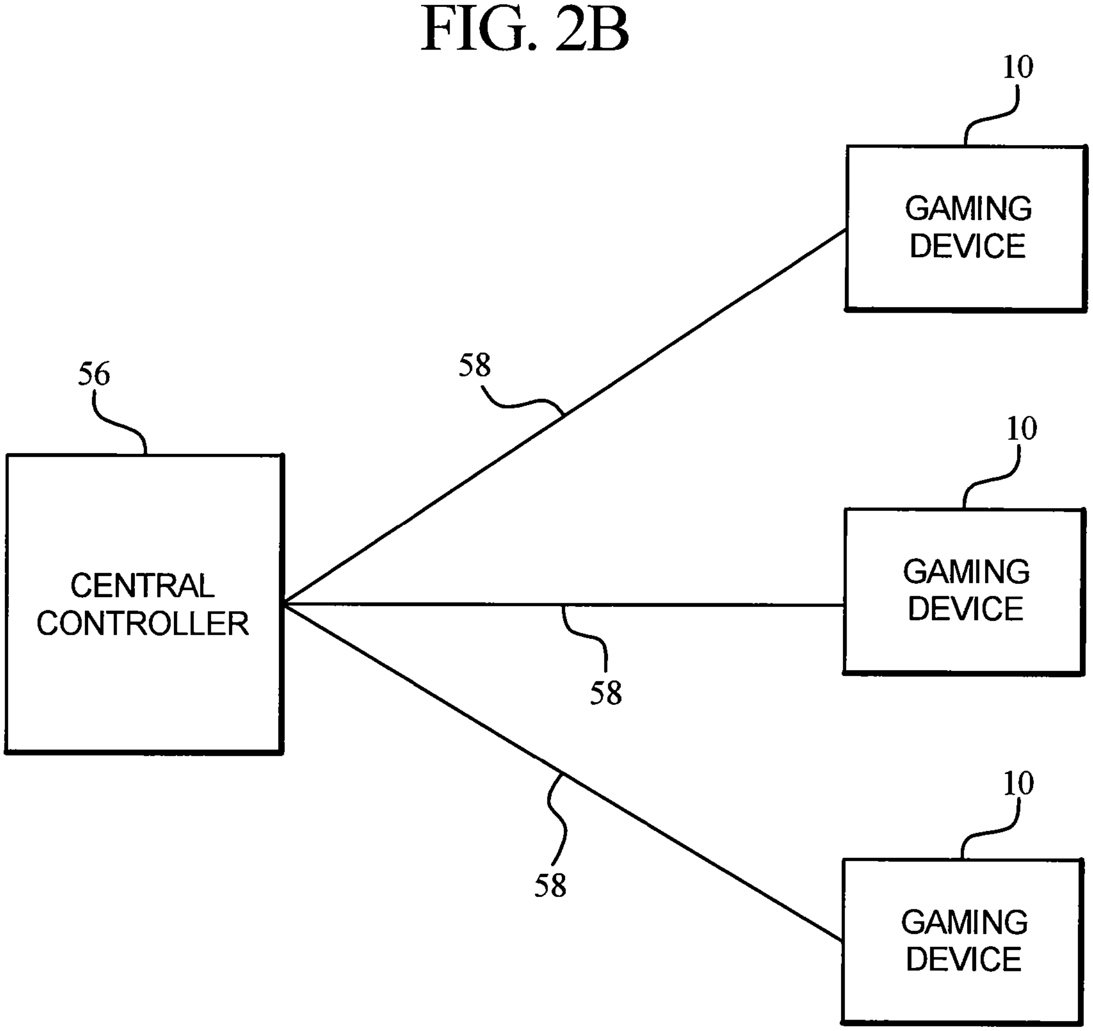
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multi-Component Game

One embodiment of the gaming system 100 illustrated in FIGS. 3A, 3B, 3C, and 3D includes a plurality of gaming machines 102*a*, 102*b*, and 102*c*. In this embodiment, each of the gaming machines includes a primary game displayed on primary display devices 104*a*, 104*b*, and 104*c*. The primary game may be any suitable game. In the illustrated embodiment, the primary game for each of the gaming machines is a slot game and the gaming system includes an information display 108 for providing information to the player. In this example, the information display 108 communicates game rules and outcomes to the players. It should be appreciated that this information display 108 may be used for any suitable purpose.

Each of the gaming machines 102*a*, 102*b*, and 102*c* includes a component display device or a secondary game display 106*a*, 106*b*, and 106*c*. Upon a component triggering event at one of the gaming machines, that gaming machine generates and displays another component on the component display 106*a*, 106*b* and 106*c*. In should be appreciated that the component triggering event may be any suitable event. Upon the component triggering event, the gaming machine sends a signal to the central controller to indicate the generated and displayed symbol. In this embodiment, upon an evaluation triggering event at one of the gaming machines, that gaming machine evaluates the generated and displayed symbols of the multi-component game (communicated from the other gaming machines or the central controller). The gaming machine provides a multi-component game outcome to the player of that gaming machine based on the evaluation and any associated awards.

Figure 3A:
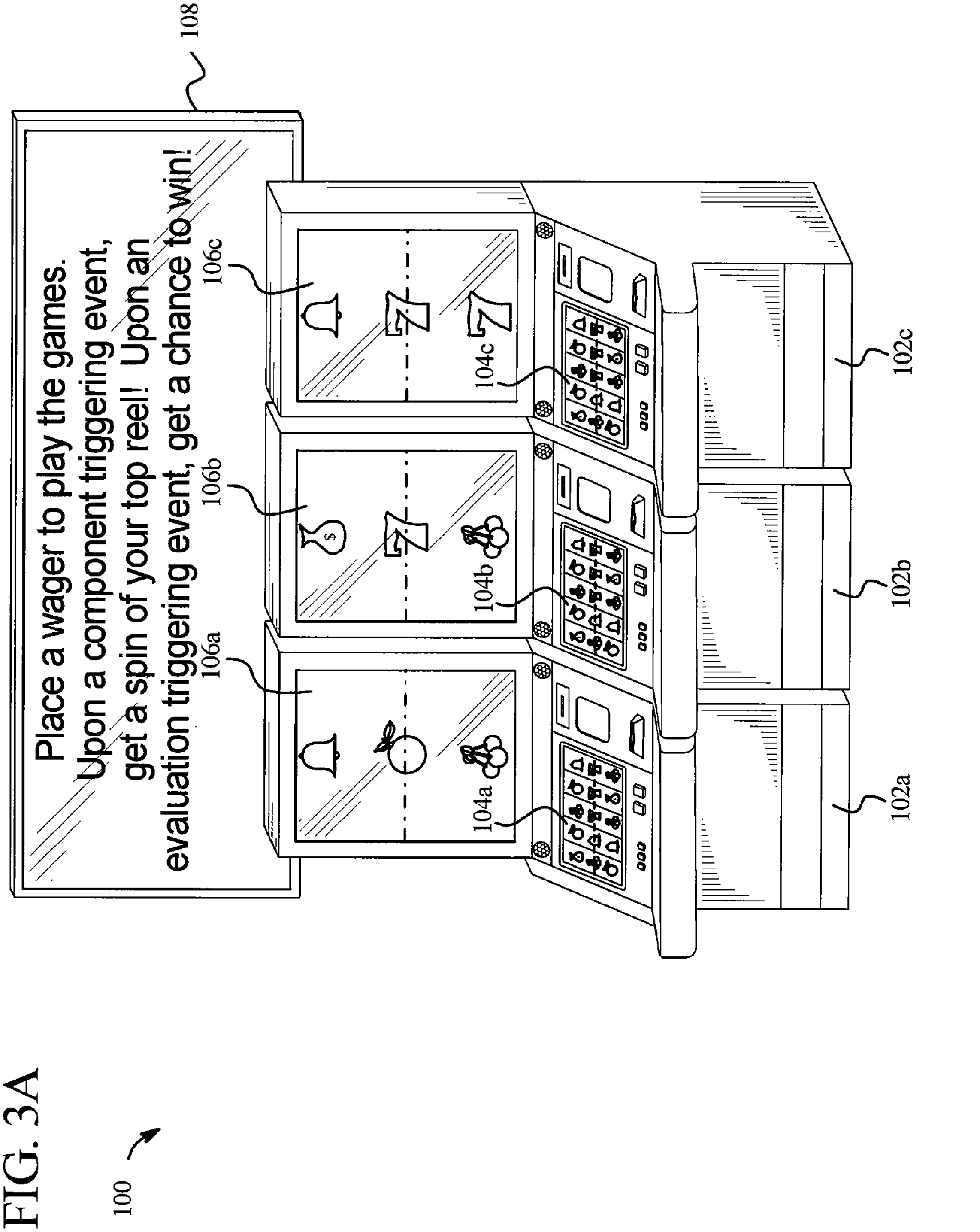
FIGS. 3A, 3B, 3C, 3D 3E and 3F are perspective views of a gaming system including a plurality of gaming machines wherein the gaming system includes a primary game and a multi-component game, wherein the multi-component game is a slot game.

As illustrated in FIG. 3A, each of the component display devices 106*a*, 106*b*, and 106*c* displays at least one starting or initial symbol on the payline. It should be appreciated that in this embodiment the components are reel symbols and may include, in addition to conventional reel symbols, any suitable symbol including wild symbols, blank symbols or spaces in between and scatter symbols. In one embodiment, each gaming machine is enabled to display one or more of the components but not all of the components of the multi-component game at one time on the component display device. In one embodiment, each of the component displays always displays a component during an evaluation. As illustrated in FIG. 3A, the first component display device 106*a* displays an orange symbol, the second component display device 106*b* displays a 7 symbol and the third component display device 106*c* displays a 7 symbol. It should be appreciated that the starting symbols of the game can be determined and generated in any suitable manner and that the starting symbols may change at the first occurrence of a component triggering event. In one embodiment, each time a player wins or receives an award after an evaluation triggering event, the central controller sends a signal to each gaming machine to generate and display another symbol. In another embodiment, the multi-component winning combination remains until another component triggering event. That is, if two evaluation events occur while a same multi-component winning combination is displayed on the reels without being interrupted by a component triggering event, the gaming system and gaming machines provide at least two awards for the same winning symbol combination.

Figure 3B:
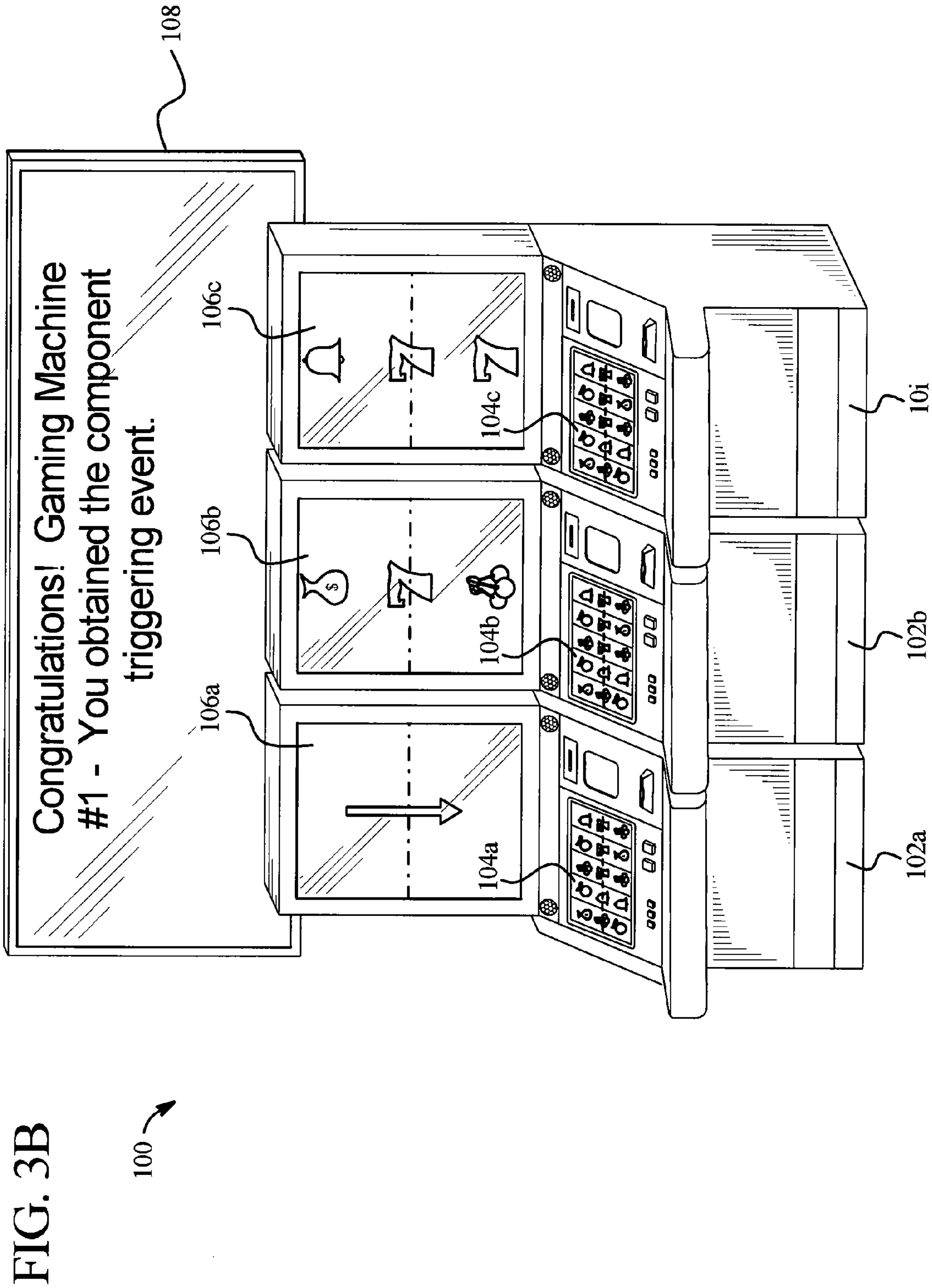

As illustrated in FIG. 3A, the gaming machines each enable a player at that gaming machine to make a wager to play the slot game at the gaming machines 102*a*, 102*b*, and 102*c* of the gaming system 100. In this example, players place wagers at the first gaming machine 102*a* and the third gaming machine 102*c*. In this example, as illustrated in FIG. 3B, the player of the first gaming machine 102*a* obtained the component triggering event as indicated by the information display 108. It should be appreciated that the component triggering event may be any suitable triggering event such as or caused by but not limited to: a symbol combination in the primary game, length of play, point accumulation in the primary game, an amount of a wager, a number of games played, a random generation, a player input or any other suitable triggering event. After the player of the first gaming machine 102*a* obtains a component triggering event, the component display device 106*a* of the triggering gaming machine 102*a* generates and displays one or more symbols.

Figure 3C:
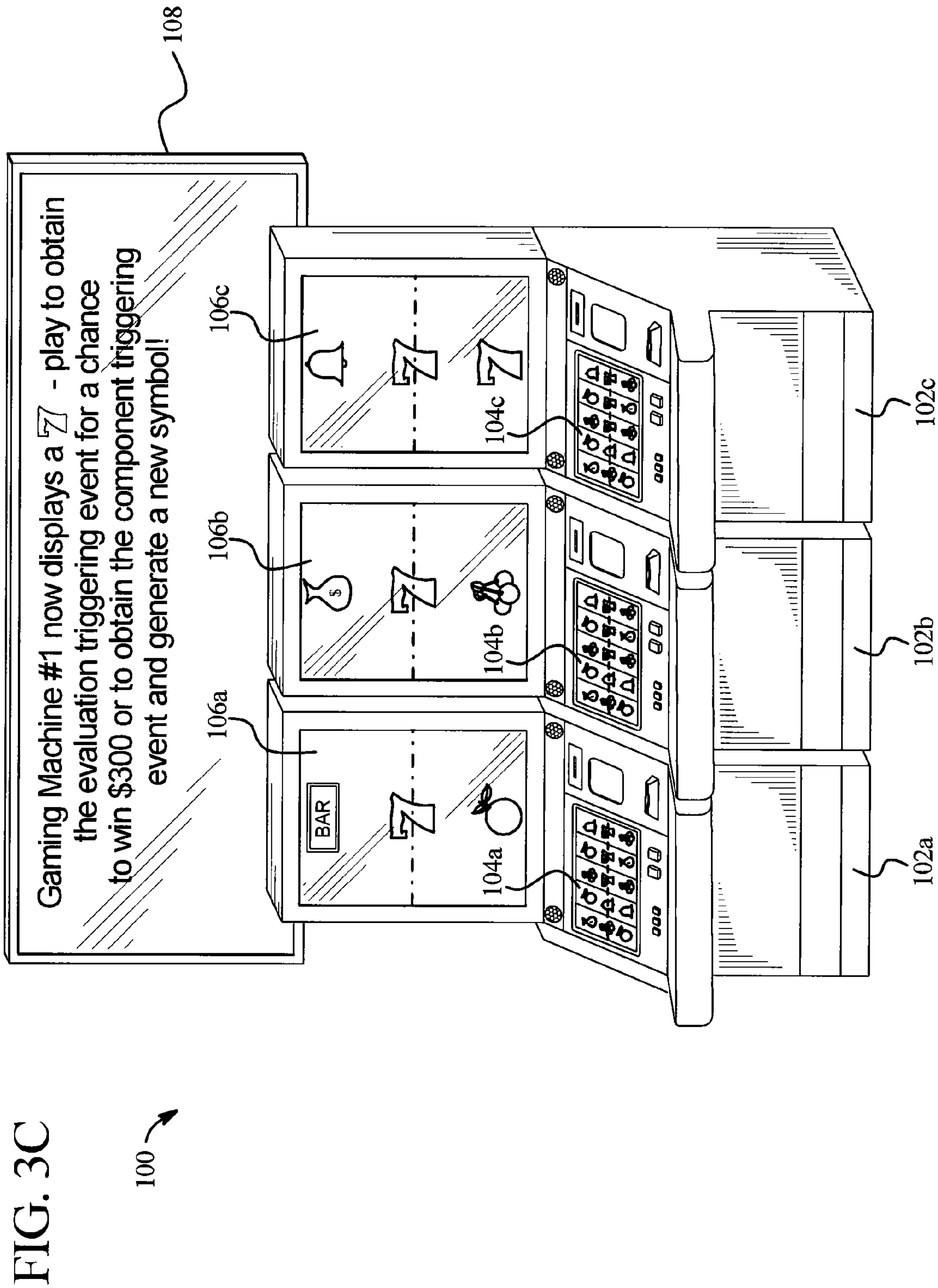

As illustrated in FIG. 3C, the component display device 106*a* generates a 7 symbol. The gaming machine 106*a* sends a signal to the central controller communicating the generated symbol. The information display 108 informs the players that there is currently a winning combination on the reels of 7 7 7 and the award associated with this multi-component winning combination is $300. To have the chance to win the award, a player must trigger the evaluation triggering event.

Figure 3D:
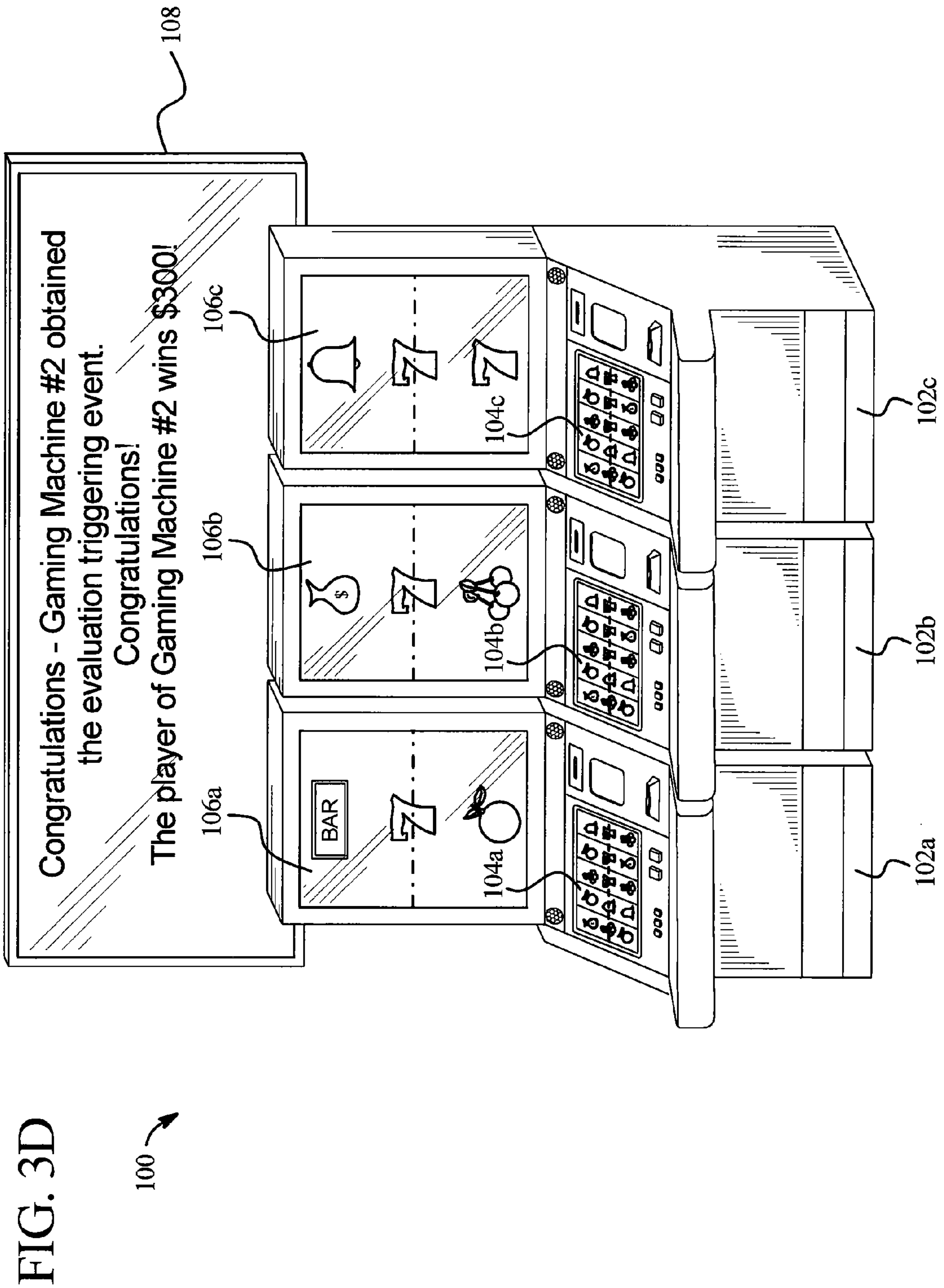

As illustrated in FIG. 3D, the information display 108 indicates that the second gaming machine 102*b* obtained the evaluation triggering event. The central controller evaluates each symbol displayed on the component display devices to determine if it is a multi-component winning symbol combination. In this example, the central controller determines that 7 7 7 is a winning combination and sends a signal to the gaming machine 102*b* indicating the outcome and the award provided to the player. As illustrated in FIG. 3D, the secondary display 108 of the gaming system 100 displays "The Player of Gaming Machine #2 Wins $300-Congratulations." The gaming machine 102*b* provides the player of the second gaming machine 102*b* an award because a symbol combination of 7 7 7 in the multi-component game is associated with an award of 300 credits.

Figure 3E:
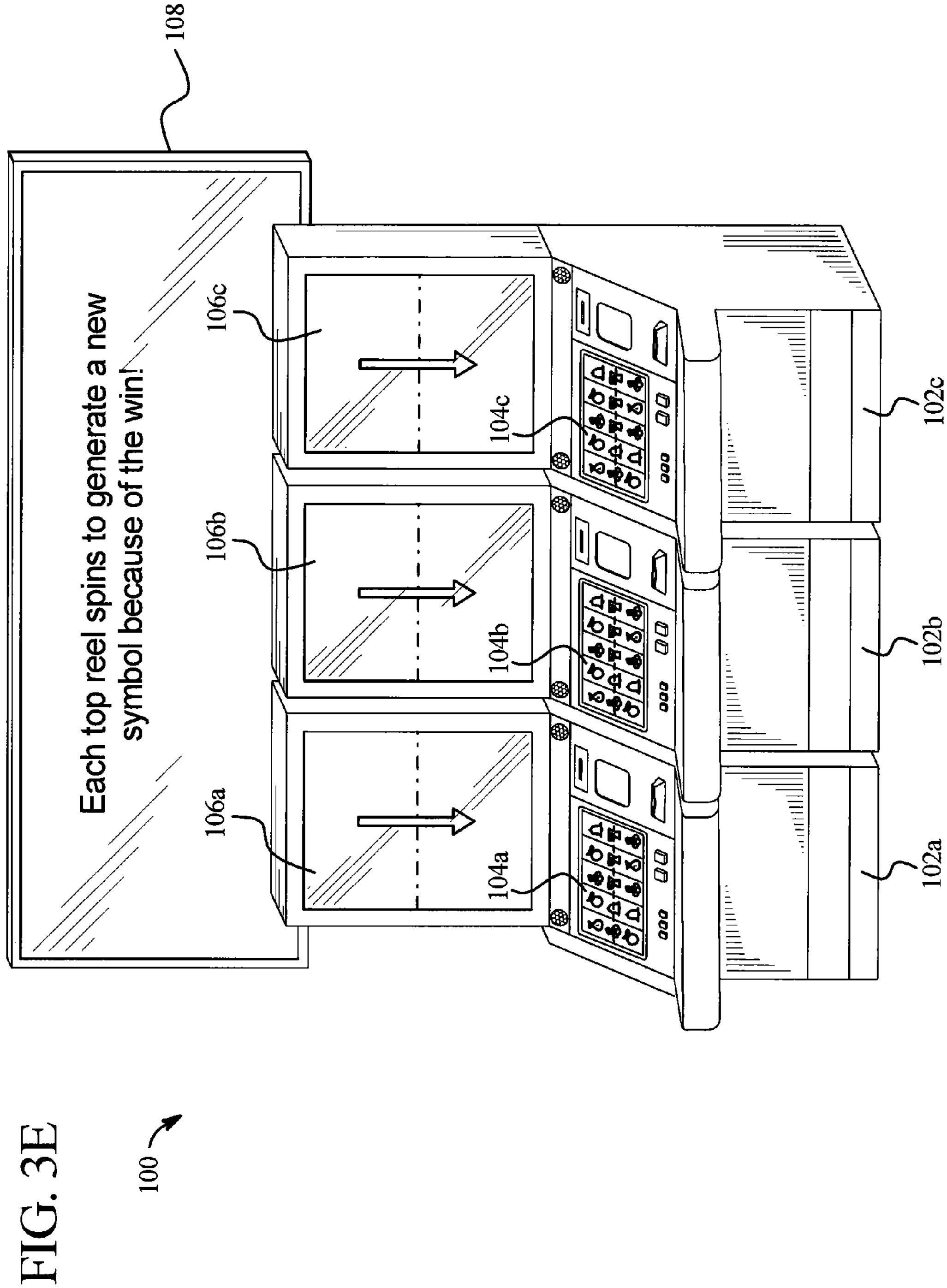

As illustrated in FIG. 3E, the central controller sends a signal to each gaming machine to generate and display another symbol following the win. It should be appreciated that each gaming device may generate the same symbol previously display or generate a different symbol.

Figure 3F:
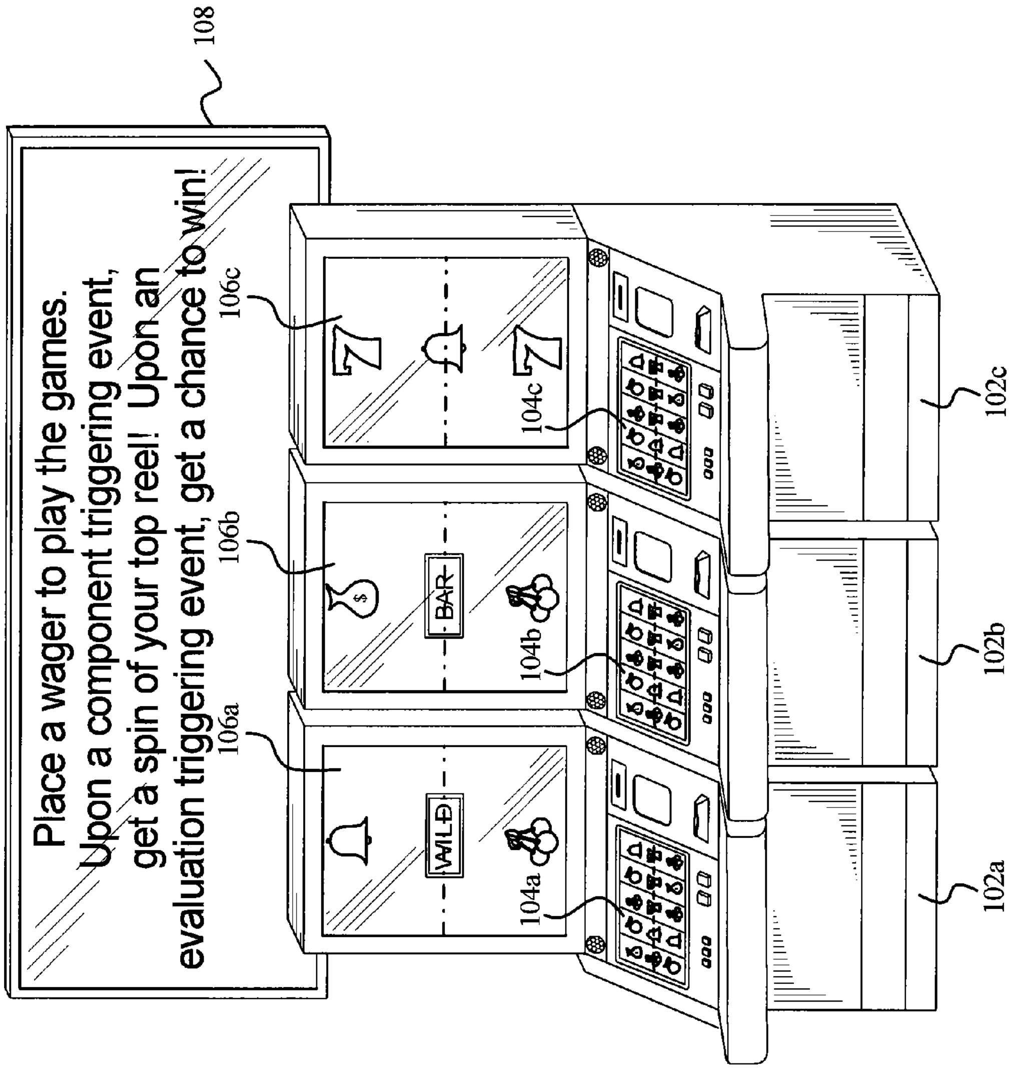

As illustrated in FIG. 3F, each of the gaming machines generates and displays at least one symbol on the component display devices. As illustrated in FIG. 3F, the first gaming device 102*a* generates a wild symbol on the first component display 106*a*. The second gaming device 102*b* generates a bar symbol on the second component display 106*b*. The third gaming device 102*c* generates a bell symbol on the third component display 106*c*. As indicated on the information display 108, the gaming machines are operable to receive a wager and play the games again.

In another embodiment, instead of having a separate component triggering event and a separate evaluation triggering event, the gaming machine or the gaming system automatically evaluates the symbols displayed by each of the component display devices to determine a multi-component outcome for the player who triggered the multi-component game. That is, the component triggering event and the evaluation triggering event are combined into one event. It should be appreciated that this event may be any suitable event.

In another embodiment, when a component triggering event occurs at one of the gaming machines, one of the other non-triggering gaming machines generates another component in the multi-component game. For example, in the above embodiment illustrated in FIG. 3A, where the first gaming machine displays a 7, and the second and third gaming machines display a bar, a triggering event on either the second or the third gaming machines could cause the first gaming machine to generate another symbol. In one embodiment, the triggering gaming machine enables the player to choose or determine which gaming machine generates and displays another component. In another embodiment, the gaming machine randomly determines which gaming machine generates another component. In another embodiment, the central controller determines which gaming machine generates another component based on the currently displayed components. In one embodiment, regardless of how the determination of the gaming machine that generates a new component is made (i.e. the player, the triggering gaming machine or the central controller), the component triggering event and the evaluation event are the same event. That is, if the newly generated components generate a winning outcome, the triggering gaming machine provides the player an award. In one such embodiment, the winning combination or the multi-component winning outcome is the evaluation triggering event, and the player of the triggering gaming machine with the multi-component winning outcome wins an award. It should be appreciated that this embodiment may include a player at every gaming machine of the gaming system and the symbol combinations or component combinations are constantly changing as players try to obtain a multi-component award. For example, a player may have the option to generate one or more components on one or more of the gaming machines. When the multi-component game is a three reel game and two of the symbols are part of a winning combination, the players race to change the last symbol to complete the winning combination and thus win the award.

In another embodiment, the gaming system provides an award to all of the players of the gaming machines. In one embodiment, when one of the gaming machines achieves an evaluation triggering event and provides the player an award, the central controller determines which gaming machines are active. The central controller sends a signal to each active gaming machine to provide the player an award. In one embodiment, the gaming machines provide the other players the same award as award provided to the player of the triggering gaming machine. In another embodiment, the gaming machines split the achieved award evenly between all of the active gaming machines and provide equal portions to the players. For example, if the award associated with the multi-outcome winning outcome is $300 and there are three active gaming machines (including the triggering player), each active gaming machine provides the player $100. In another embodiment, the gaming machines provide the players of the non-triggering gaming machines a different award than the award provided to the triggering player. In one such embodiment, the achieved award is provided unevenly to the players of the active gaming machines. For example, if the award associated with the multi-outcome winning outcome is $300 and there are three active gaming machines, the triggering player receives $200 and both of the other non-triggering players receive $50.

In another embodiment, as illustrated in FIGS. 4A, 4B, 4C, and 4D, the gaming system 110 includes a plurality of gaming machines 112*a*, 112*b*, 112*c*, 112*d* and 112*e* which include a primary slot game displayed on a plurality of primary display devices 114*a*, 114*b*, 114*c*, 114*d* and 114*e* and a multi-component game poker game, with one individual card displayed on each of the component display devices 116*a*, 116*b*, 116*c*, 116*d* and 116*e*. It should be appreciated that the poker game may be implemented in any suitable manner. In one embodiment, upon a component triggering event, the gaming machine generates a card. Unlike the typical video poker which enables a player to make a decision to hold or draw a dealt card, in this embodiment, a player is displayed a card and is not enabled to make a decision. The gaming machine displays a card as in the reel game. In another embodiment, the gaming machine automatically determines whether to hold or draw upon a component triggering event according to a predefined set of rules or upon a random generation. In the illustrated embodiment, the gaming machine enables the player to make an input whether to hold or draw upon being displayed a card.

Figure 4A:
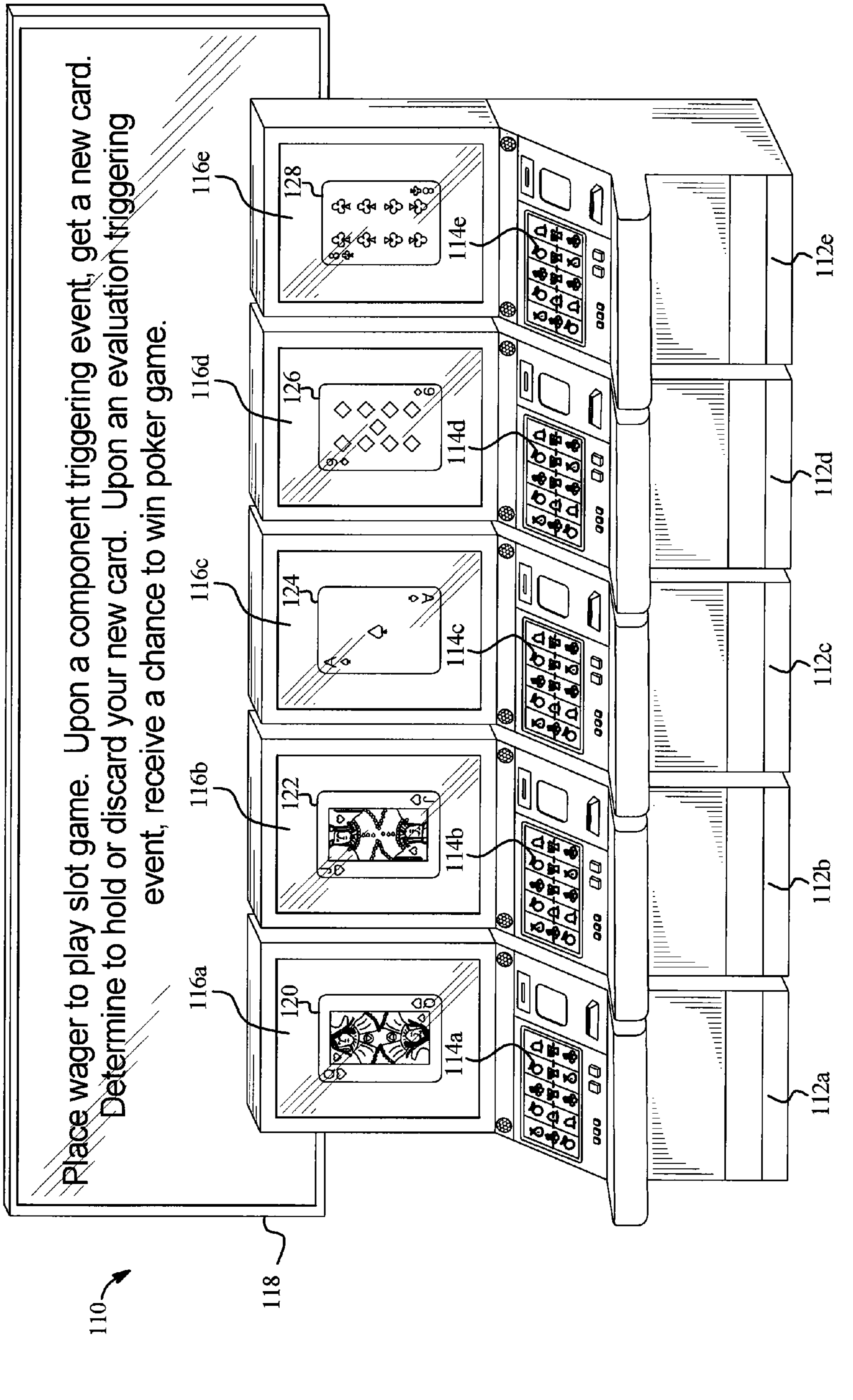
FIGS. 4A, 4B, 4C, 4D and 4E are perspective views of one embodiment of the gaming system of the present disclosure which includes a plurality of gaming machines that enables players to participate in a primary game and upon appropriate triggering events a multi-component game.

As illustrated in FIG. 4A, each gaming machine 112*a*, 112*b*, 112*c*, 112*c*, 112*d* and 112*e* displays one card face up from a virtual deck of playing cards, such as a fifty-two card deck, similar to a conventional game of video poker. It should be appreciated that the multi-component game may be any suitable card game with any suitable number of decks and that the cards may include any suitable symbols, including wild symbols. In this embodiment, each gaming machine enables a player to place a wager on a primary game. If a player obtains a component triggering event, the gaming machine displays a new card from the virtual card deck on the component display device. In one embodiment, the player determines whether to hold the generated card or discard the generated card and draw a new card. It should be appreciated that the player can input the decision in any suitable manner. In one embodiment, if the player wishes to draw, the player selects draw via one or more input devices, such as pressing related buttons or via a touch screen. The gaming machine deals a replacement card from the remaining cards in the deck. This results in a final five-card hand with all of the cards combined. The gaming system 110 includes an information display 118 to communicate the game rules and the results to the player.

As illustrated in FIG. 4A, initially, the component displays 116*a*, 116*b*, 116*c*, 116*c*, 116*d* and 116*e* display: a queen of hearts 120, a jack of hearts 122, an ace of spades 124, a nine of diamonds 126 and an eight of clubs 128, respectively. It should be appreciated that the initial cards may be determined, displayed and generated in any suitable manner.

Figure 4B:
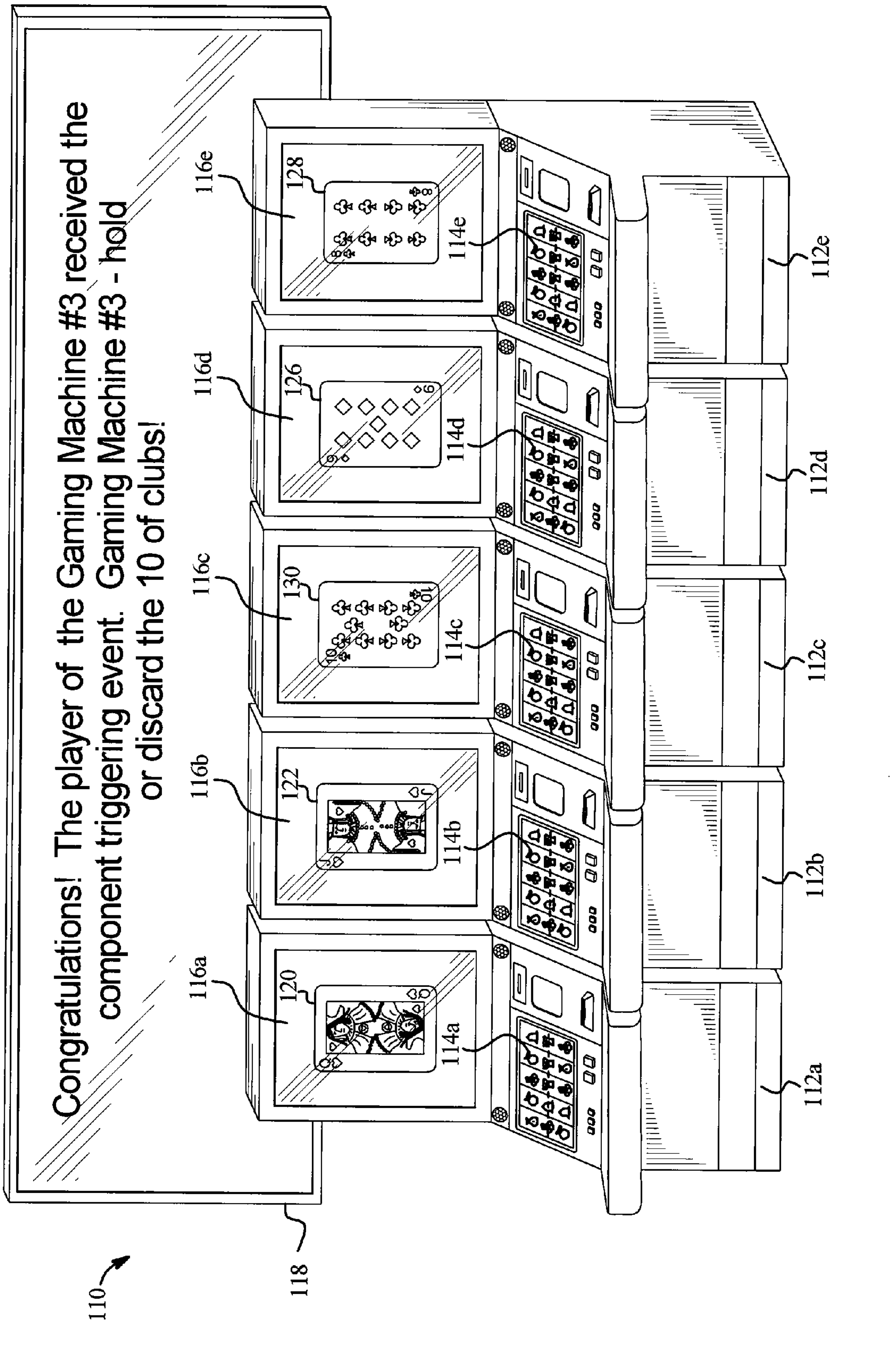

As illustrated in FIG. 4B, the player of the third gaming machine 112*c* obtains or receives the component triggering event as indicated on the information display 118. The gaming machine 112*c* deals or displays the ten of clubs 130 on the component display device 116*c*. The gaming machine enables the player to hold the ten of clubs or to draw a new card.

Figure 4C:
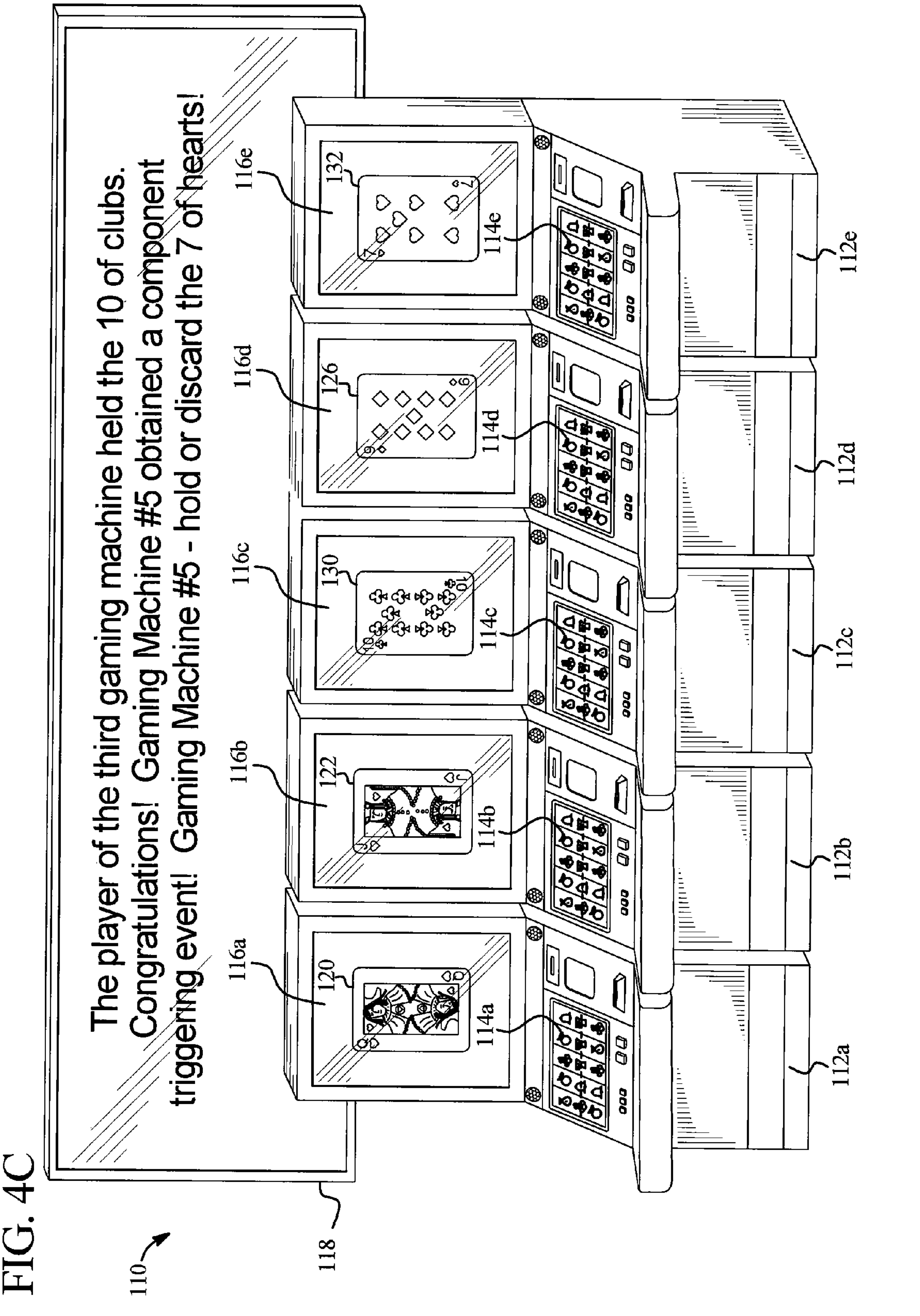
Figure 4D:
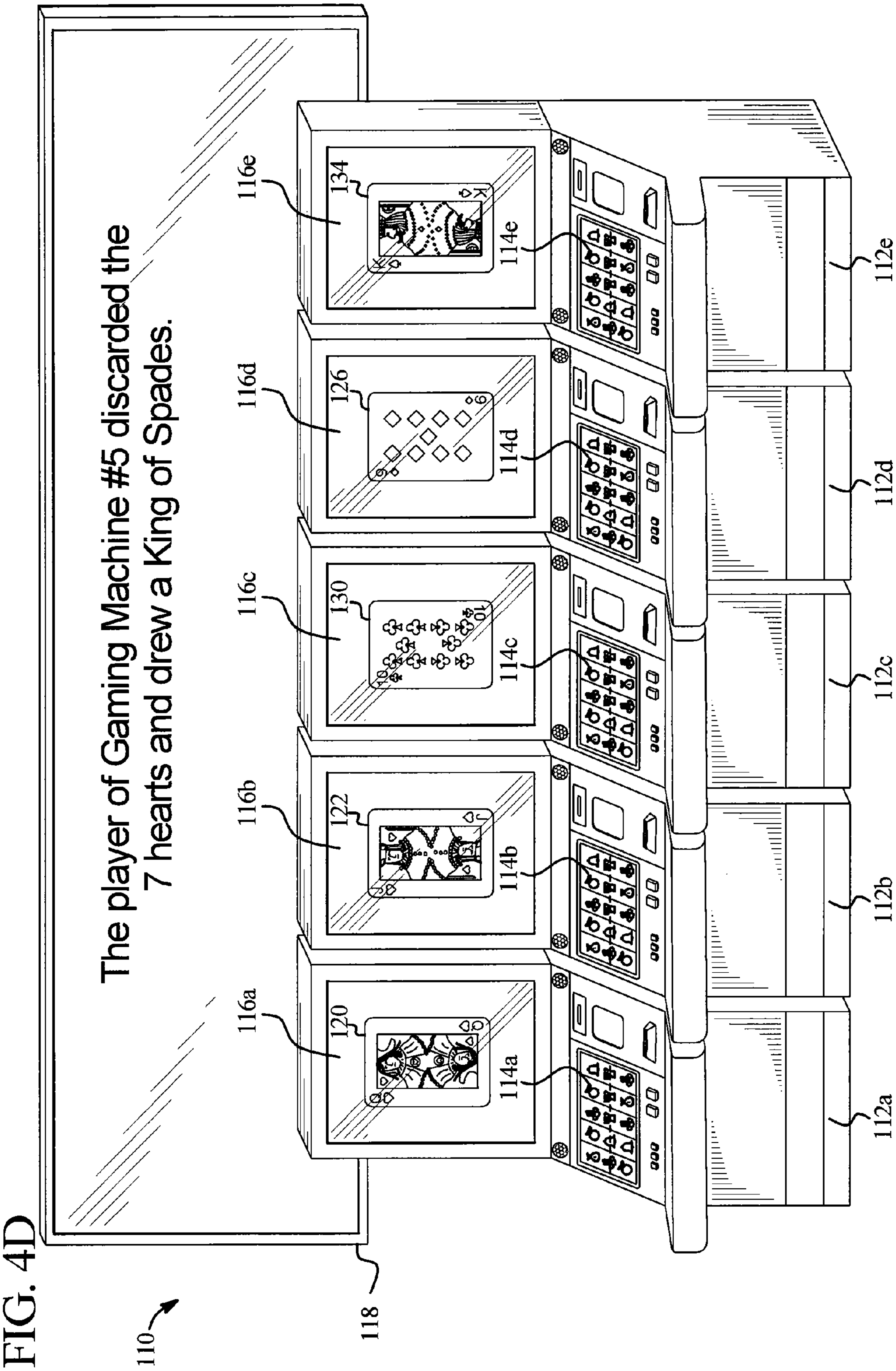

In this example, as illustrated on the information display 118 in FIG. 4C, the player of the third gaming machine holds the ten of clubs 130. As illustrated in FIG. 4C, the fifth gaming machine 116*e* obtains a component triggering event 112*e* and displays the seven of hearts 132 on the component display device 116*e*. As illustrated in FIG. 4D, the player of the fifth gaming machine discards the 7 of hearts and is dealt or draws of King of hearts 134. That is, the component display device 116*e* of the fifth gaming machine 112*e* displays the king of hearts.

Figure 4E:
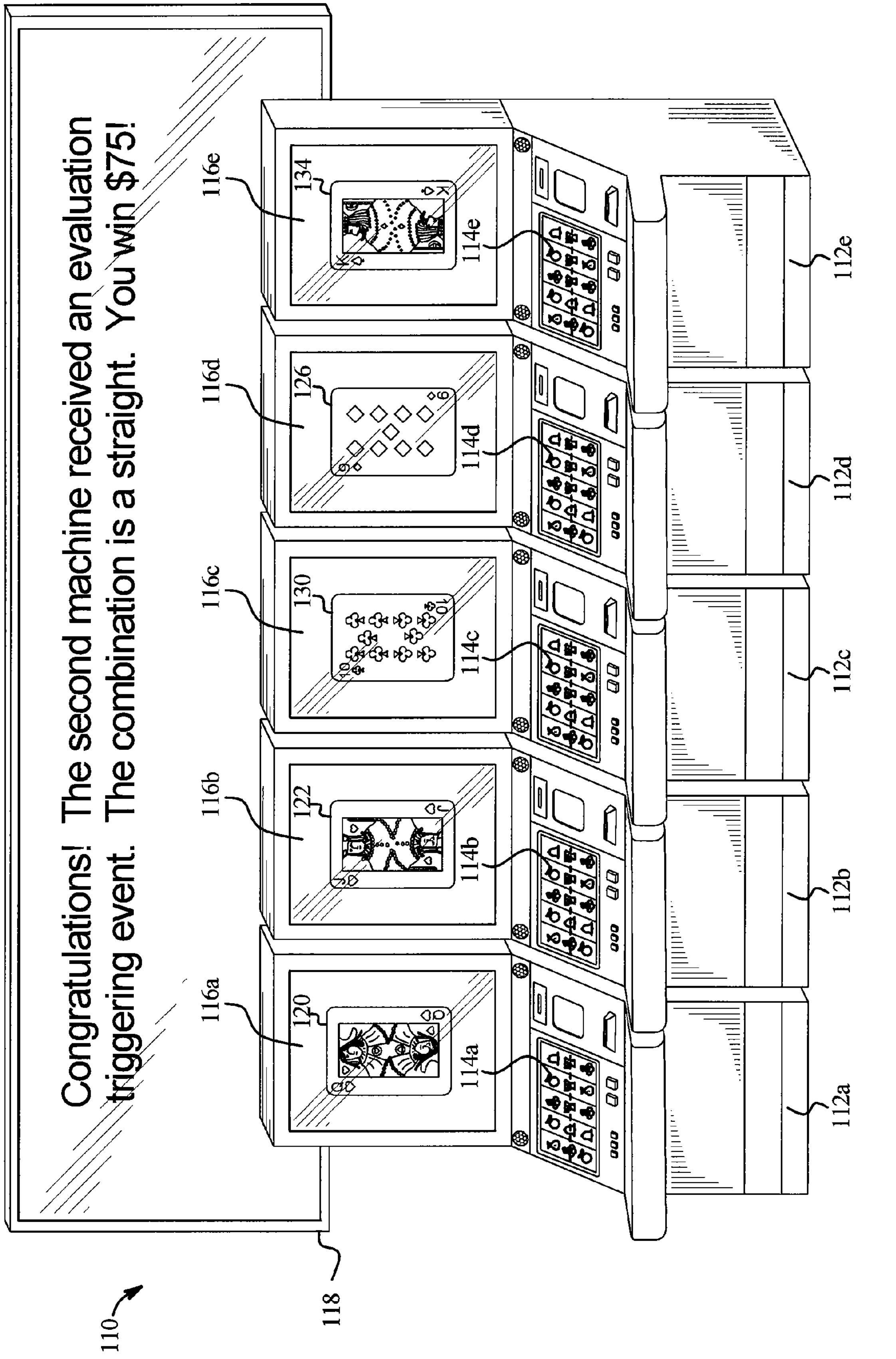

As illustrated in 4E, the second gaming machine generates an evaluation triggering event. The gaming machine, with the central controller, evaluates the generated and displayed cards of the poker game to determine the multi-component poker game outcome. In this example, the first gaming machine 112*a* displays a queen of hearts 120, the second gaming machine 112*b* displays a jack of hearts 122, the third gaming machine 112*c* displays a ten of hearts 128, the fourth gaming machine 112*d* displays a nine of diamonds 126, and the fifth gaming machine 112*e* displays a king of spades 134. Under conventional poker rules, the combination is a straight. The gaming device compares the combination to a paytable and determines an award for the player. As illustrated in FIG. 4E, in this embodiment, the second gaming device 112*b* provides the player an award of $75 for the winning combination.

It should be appreciated that the poker game may be implemented in any suitable manner. In one embodiment, upon an occurrence of the component triggering event, the player is enabled to make an input whether to hold or discard a newly generated card. In another embodiment, upon an occurrence of the component triggering event, the gaming machine does not display or generate a new card but enables the player to hold or discard the already displayed card. In another embodiment, upon an occurrence of the component triggering event, the gaming machine determines automatically whether to hold or discard the generated card based on a set of rules or through a random generation. The gaming machine then either holds the card or draws and displays a new card. In another embodiment, all players of active gaming machines receive an award upon a winning evaluation.

As illustrated in FIGS. 5A, 5B, 5C and 5D, in one embodiment, an aspect of the primary game influences or determines an aspect or result of the multi-component game. In one embodiment, the movement of the reels in the primary game influences the multi-component game generation for that gaming machine. In one embodiment, as illustrated in FIGS. 5A, 5B, 5C and 5D, the gaming system 150 includes a plurality of adjacently arranged gaming machines 152*a*, 152*b*, and 152*c*. The gaming system includes an information display 158. In this embodiment, the gaming system 150 generates a new component every time the primary game is played. That is, a play of the primary game is the component triggering event. While the reels are still spinning, the number changes. When the reels of the primary game stop spinning, the component display device finalizes and displays a number. It should be appreciated that any triggering event or component triggering event can cause the gaming machine to generate a new component of the multi-component game in any suitable manner. In this embodiment, the gaming machine only performs an evaluation for the multi-component game when an evaluation triggering event occurs. In this embodiment, the evaluation triggering event is the combination of five money bags generated along a payline in the primary game.

Figure 5A:
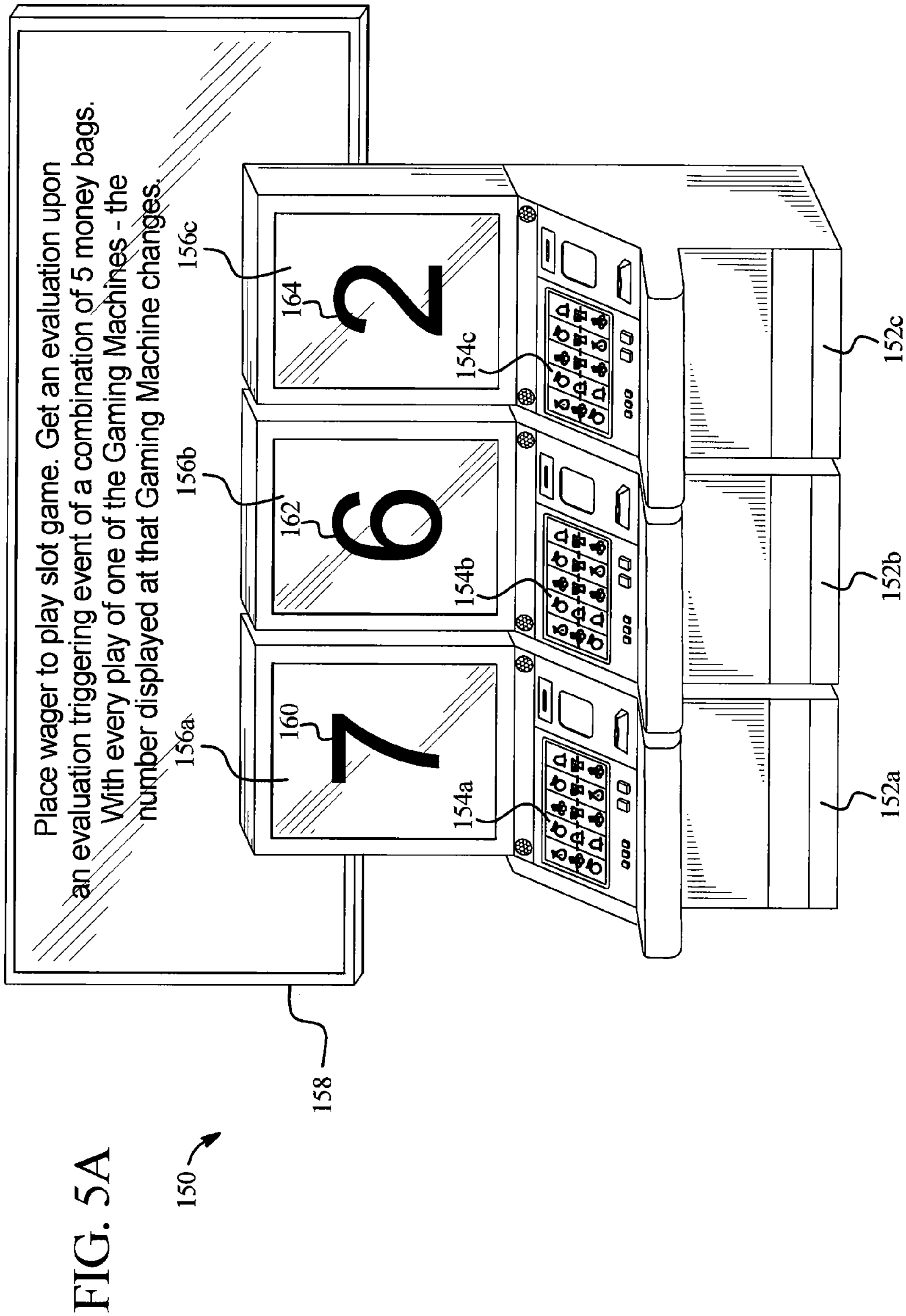
FIGS. 5A, 5B, 5C and 5D are perspective views of one embodiment of the gaming system of the present disclosure including a plurality of gaming machines that enable players to participate in a primary game and upon appropriate triggering events a multi-component game.

As illustrated in FIG. 5A, the component display devices 156*a*, 156*b* and 156*c* each display a number. The first gaming machine 152*a* displays a 7 labeled 160, the second gaming machine 152*b* displays a 6 labeled 162 and the third gaming machine 152*c* displays a 2 labeled 164. It should be appreciated that each gaming machine or the gaming system may determine the initially displayed number in any suitable manner. In this embodiment, each gaming machine randomly determines or generates a number to display. Each of the gaming machines include a slot primary game displayed on the primary display devices 154*a*, 154*b*, and 154*c*.

Figure 5B:
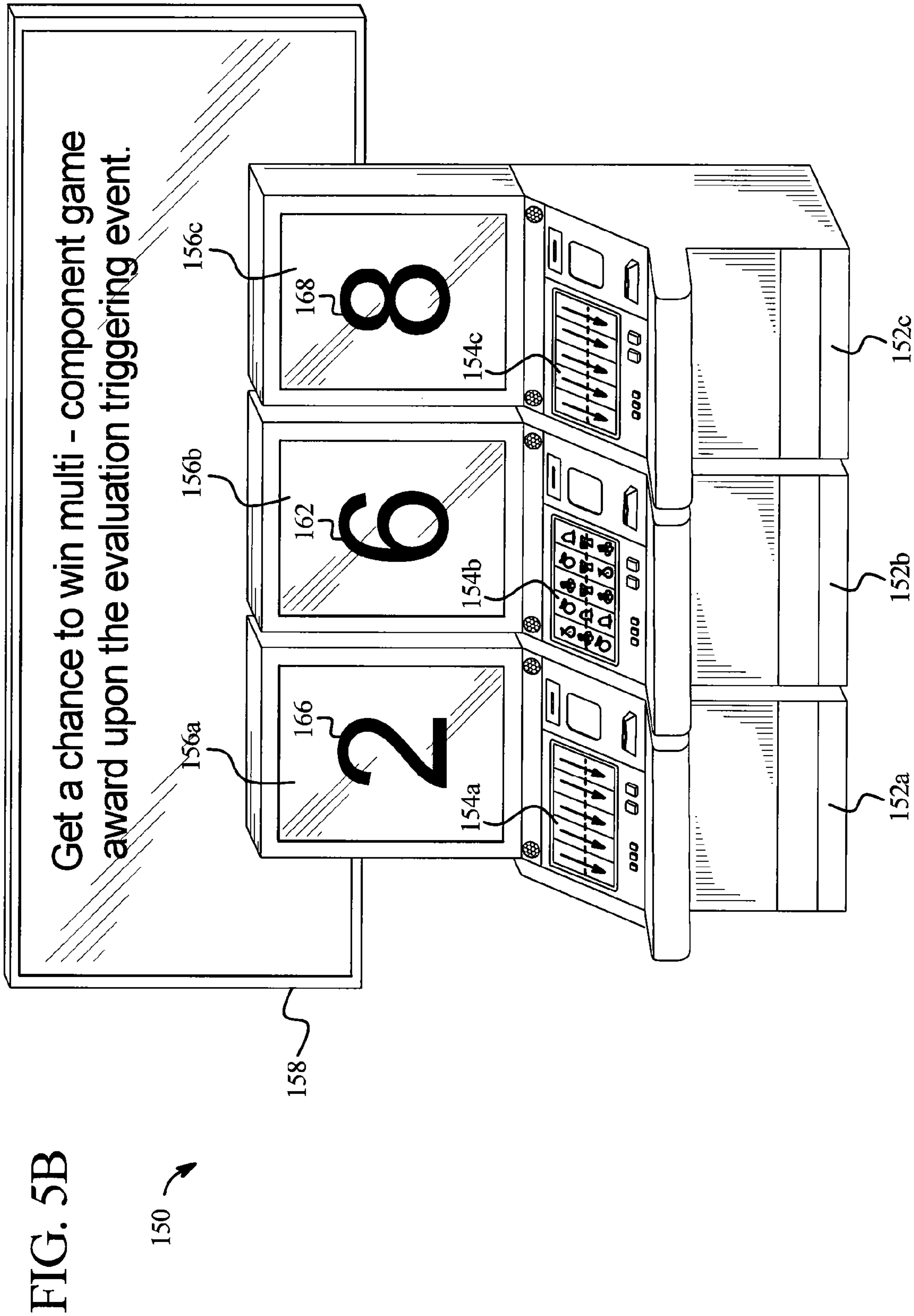

As illustrated in FIG. 5B, in this example, only the first gaming machine 152*a* and the third gaming machine 152*c* are wagered upon or are active as indicated by the reels of the primary slot game spinning 154*a* and 154*c*.

As indicated in FIG. 5B, the component display devices 156*a*, 156*b* and 156*c* each display a number. The number changes while the reels of that gaming machine are spinning. When the reels of that gaming machine stop spinning, the number displayed on that gaming machine stops changing.

As illustrated in FIGS. 5A and 5B, the first component display device 156*a* first displays a 7 labeled 160 as illustrated in FIG. 5A and then displays a 2 labeled 166 as illustrated in FIG. 5B. The third component display device 156*c* first displays a 2 labeled 164 as illustrated in FIG. 5A and then displays an 8 labeled 168 as illustrated in FIG. 5B.

Figure 5C:
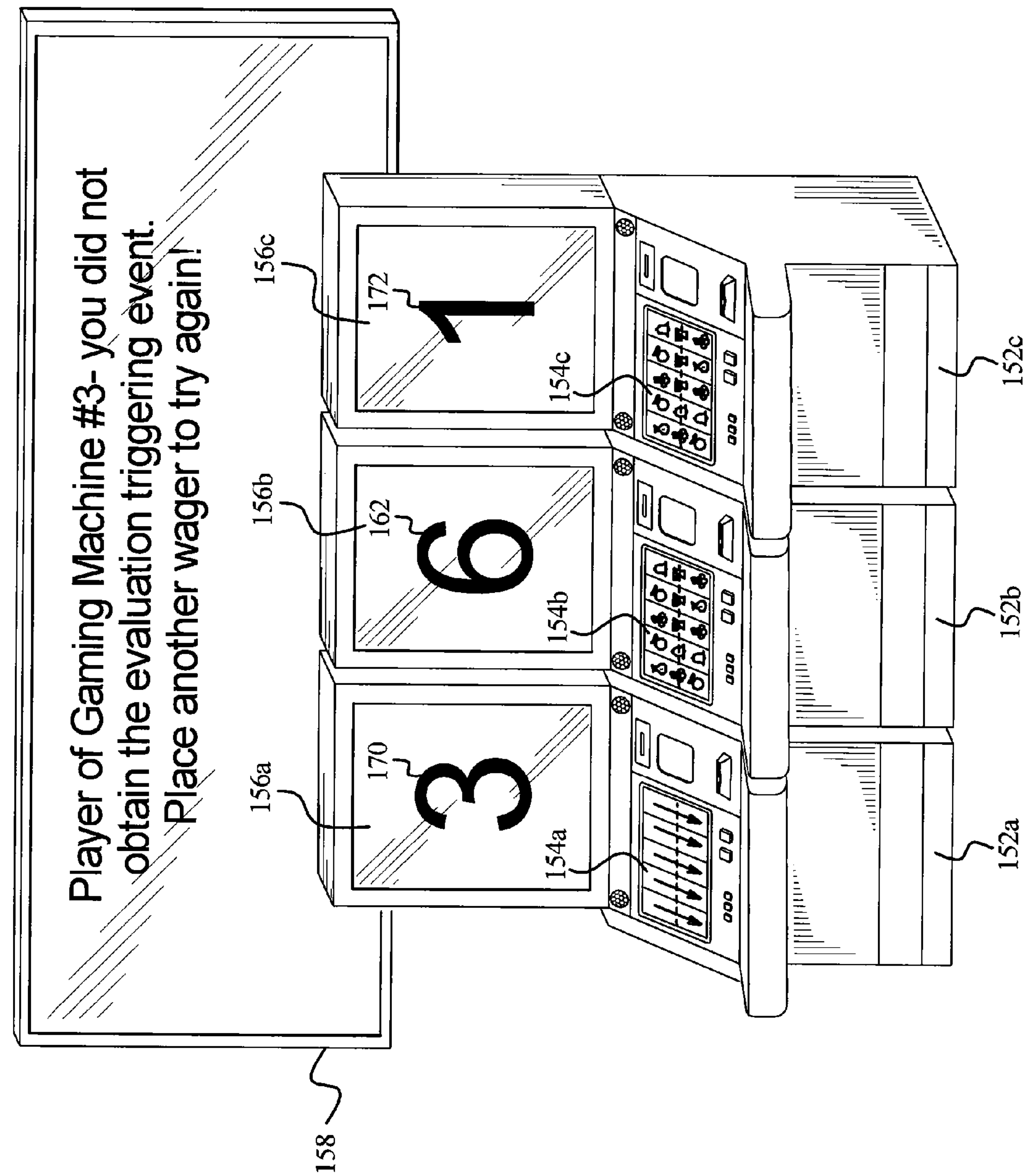

As illustrated in FIG. 5C, the reels of the last gaming machine 152*c* stop spinning and the component display device 156*c* displays a 1 labeled 172. Therefore, the number displayed by the component display device 156*c* stops changing and the number remains a 1.

Figure 5D:
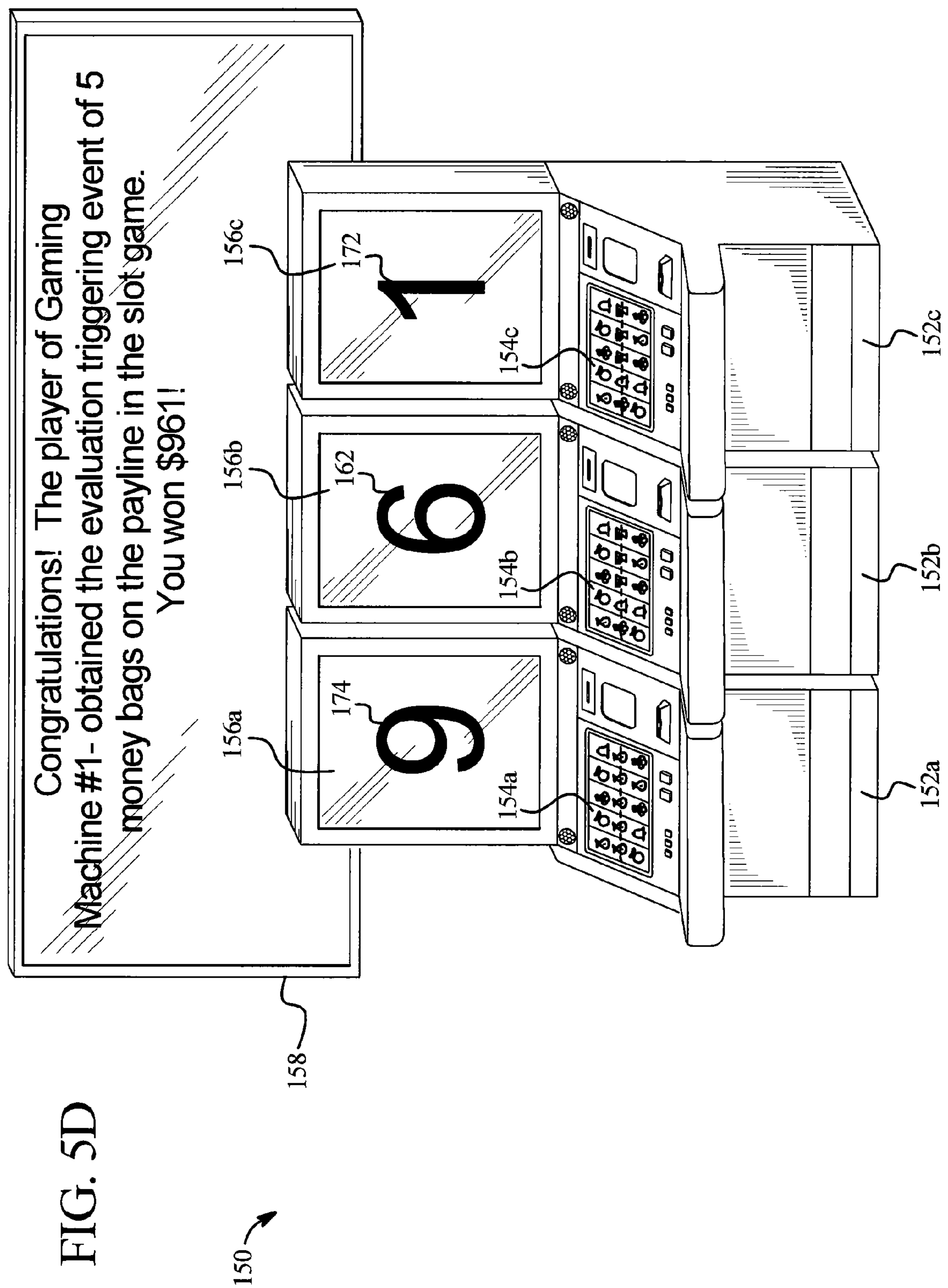

As illustrated in FIG. 5D, the reels of the first gaming machine 152*a* stop spinning and the combination of five money bags is generated on the payline on the primary display device 154*a*. Thus, the first gaming device 152*a* achieved the evaluation triggering event. The number 9 labeled 174 is displayed and finalized on the component display device 156*a*. Therefore, the components of the multi-component game are 9, 6 and 1. In the illustrated embodiment, upon the occurrence of the evaluation triggering event, the gaming machine automatically awards the triggering player the displayed award amount. In the illustrated embodiment, upon the combination of five money bags, the gaming machine determines that the player of the first gaming machine wins and awards the player $961.

It should be appreciated that the gaming machine or gaming system may provide any award to the player based on the multi-component game outcome at the time of evaluation. It should also be appreciated that the gaming machine may provide any number of players any suitable award.

Figure 6A:
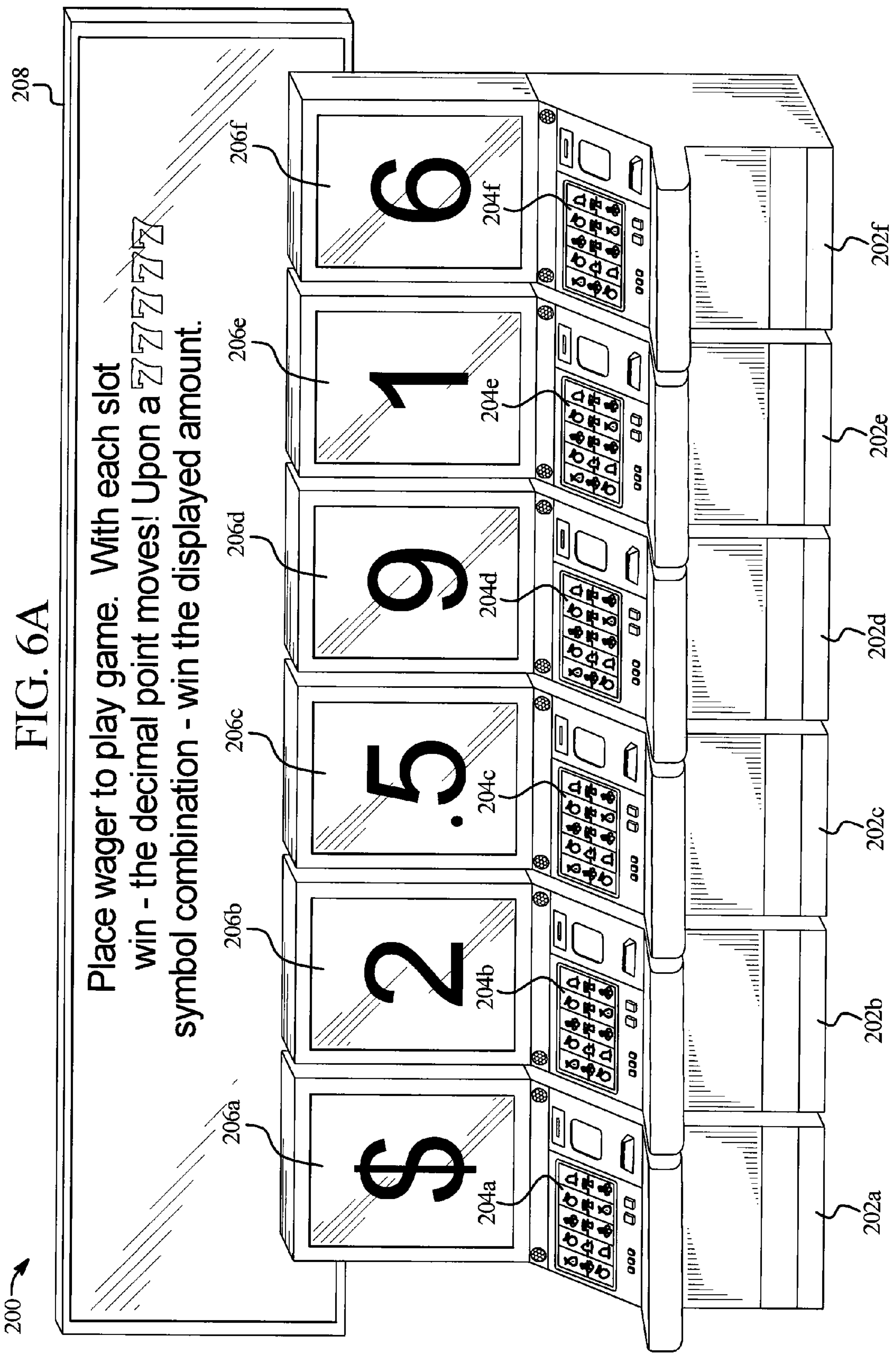
FIGS. 6A, 6B, 6C and 6D are perspective views of one embodiment of the gaming system of the present disclosure including a plurality of gaming machines that enable players to participate in a primary game and upon appropriate triggering events a multi-component game.

As illustrated in 6A, in one embodiment, the multi-component game is a digit game. As illustrated in FIG. 6A, a plurality of component displays 206*b*, 206*c*, 206*d*, 206*e* and 206*f* of a plurality of adjacently arranged gaming machines 202*b*, 202*c*, 202*d*, 202*e* and 202*f* of a gaming system 200 display a number and the first gaming machine 202*a* displays a dollar sign 206*a*. The second gaming machine 202*b* displays a 2 symbol. The third gaming machine 202*c* displays a 5 symbol, with a decimal point preceding it. The fourth gaming machine 202*d* displays a 9 symbol. The fifth gaming machine 202*e* displays a 1 symbol. The sixth gaming machine 202*f* displays a 6 symbol. Thus, combined, the gaming machines display a multi-component game outcome of 2.5916.

As illustrated in FIG. 6A, the gaming system 200 includes an information display 208. The information display 208 displays the rules and awards to the player. In this embodiment, with each slot machine win, the decimal point moves to that machine. That is, the component triggering event is a slot machine win and the component generation is the decimal point displayed at that gaming machine. In this embodiment, the evaluation triggering event is the symbol combination of five 7's generated on a payline in the primary slot machine game provided on the primary display 206*a*, 206*b*, 206*c*, 206*d*, 206*e* and 206*f* of each of the gaming machines 202*a*, 202*b*, 202*c*, 202*d*, 202*e* and 202*f*.

Figure 6B:
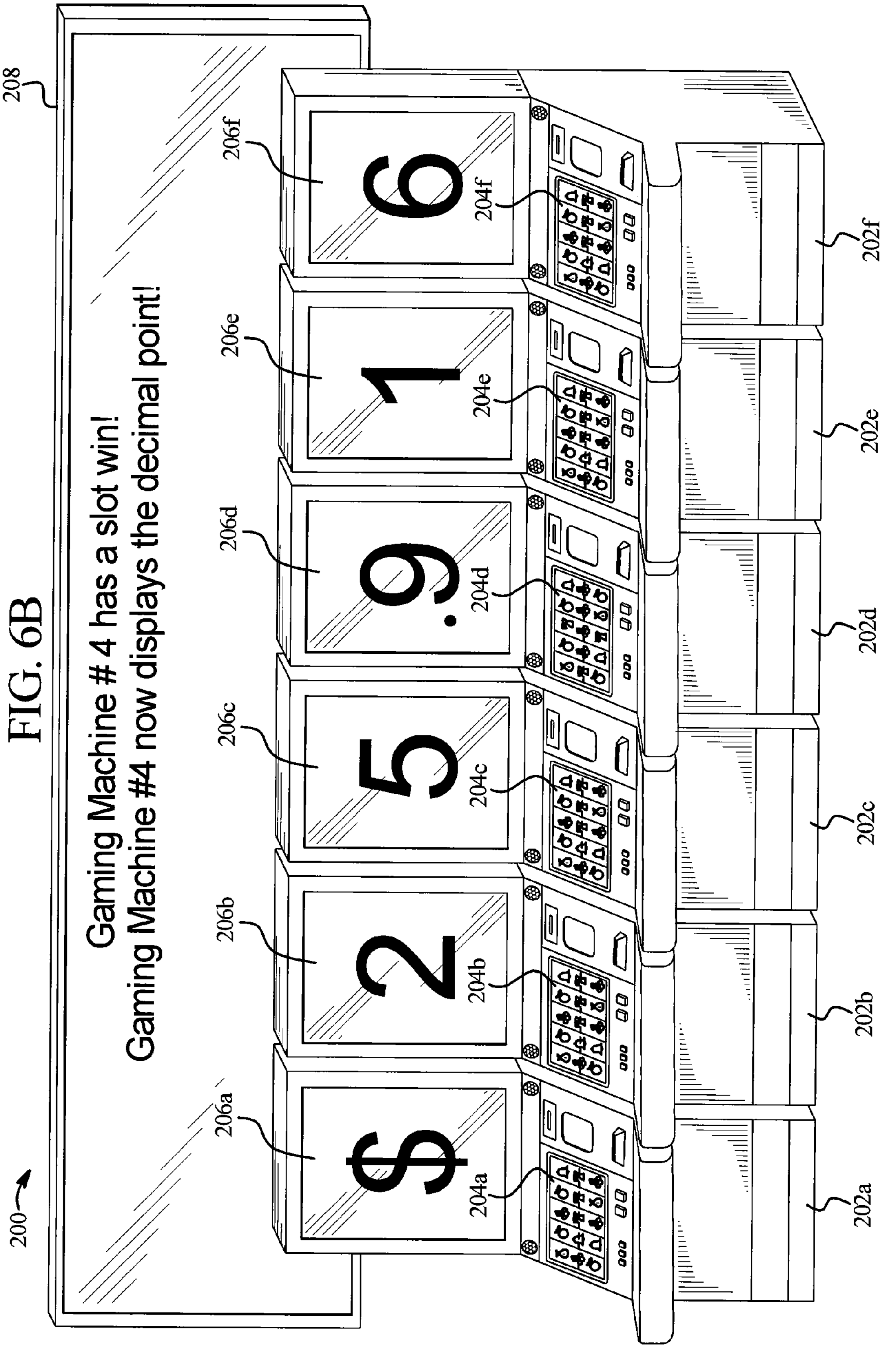

As illustrated in FIG. 6B, the information display 208 communicates a component triggering event occurred on the fourth gaming machine 202*d* and the decimal point is displayed by component display 206*d* of the fourth gaming machine 202*d*. That is, the third gaming machine 202*c* stops displaying the decimal point and the component display device 206*d* of the fourth gaming machine displays the decimal point preceding the 9. The collective number now displayed is now 25.916 and thus the award based on the displayed number would be higher.

Figure 6C:
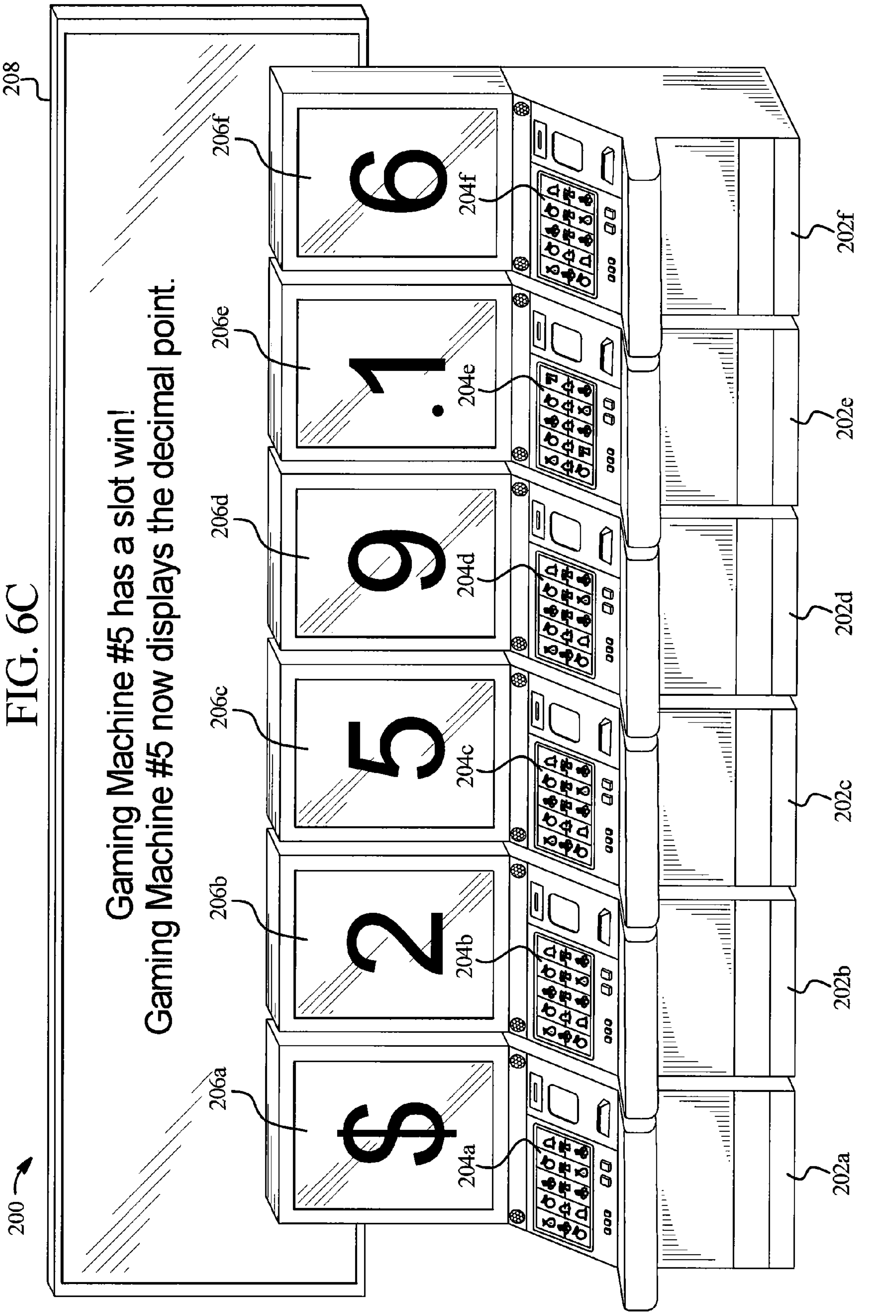

As illustrated by the information display 208 in FIG. 6C, the component triggering event occurs on the fifth gaming machine 202*e* and the component display device 206*e* of the fifth gaming machine 202*e* displays the decimal point. The collective number displayed by the gaming machines is now 259.16.

Figure 6D:
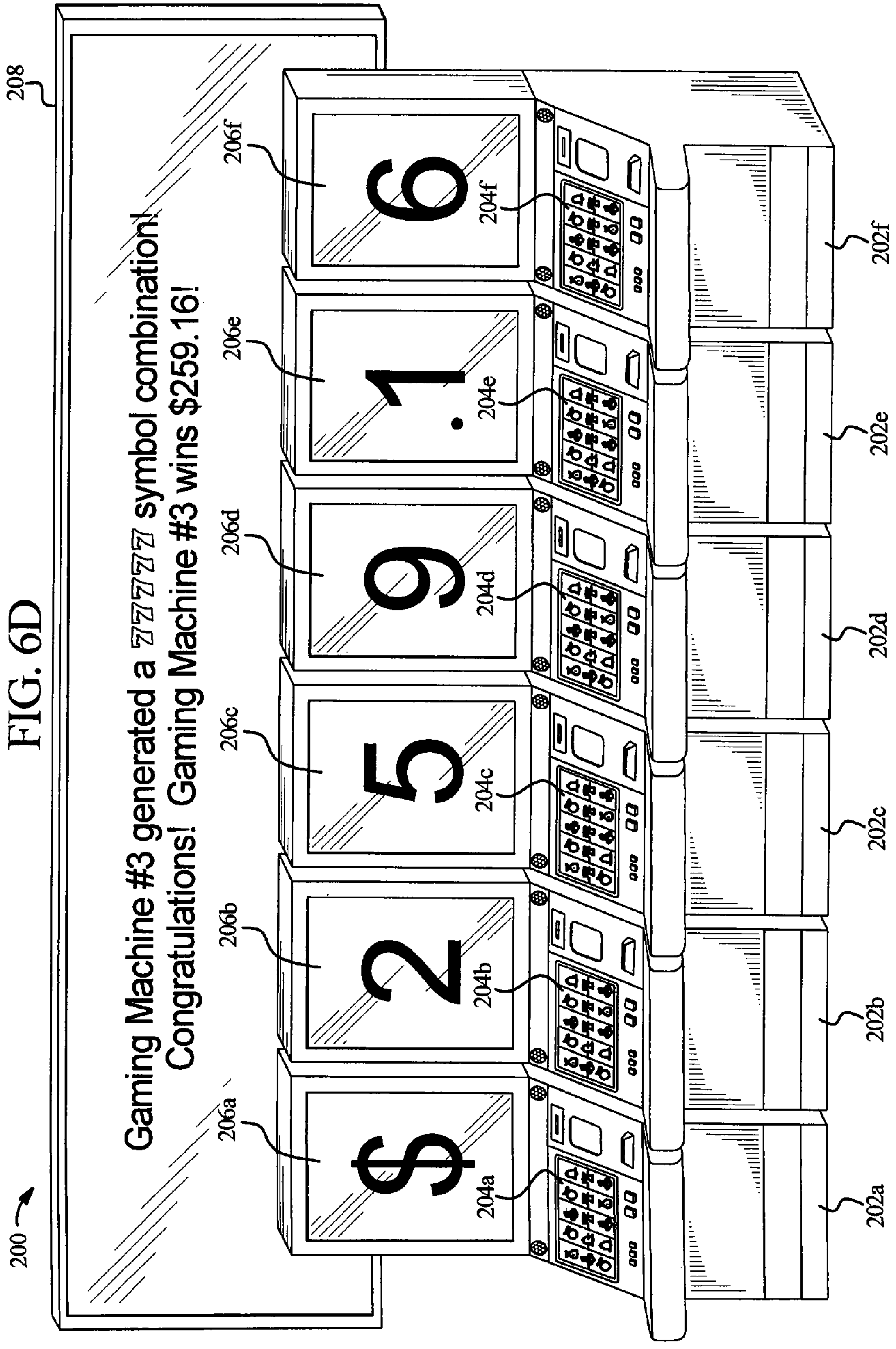

As illustrated in FIG. 6D, the third gaming machine 202*c* generates a symbol combination of five 7's on the payline primary game display 204*c*. The third gaming machine 202*c* has an occurrence of the evaluation triggering event. In this embodiment, the gaming machine 202*c* in communication with the central controller randomly determines if the player receives the award. In this embodiment, the gaming machine 202*c* determines that the player receives the award. In one embodiment, the gaming machine awards the player $259.16.

It should be appreciated that the award may be determined in any suitable manner. For example, when the decimal point is displayed in front of the two, the number is 0.25916. In one embodiment, this number is rounded up to $1 upon an evaluation triggering event. In another embodiment, the number is truncated and rounded down to an award of $0.25.

In an alternative embodiment, each of the digits displayed on the gaming machines increase as more games are played on that gaming machine. That is, as more wagers are placed on each gaming machine, randomly or at certain monetary intervals, the number displayed by the component display device of that gaming machine increase. It should be appreciated that the numbers may be the component that changes in addition to the decimal point. It should be appreciated that the numbers may be determined, generated and display in any suitable manner.

Figure 9A:
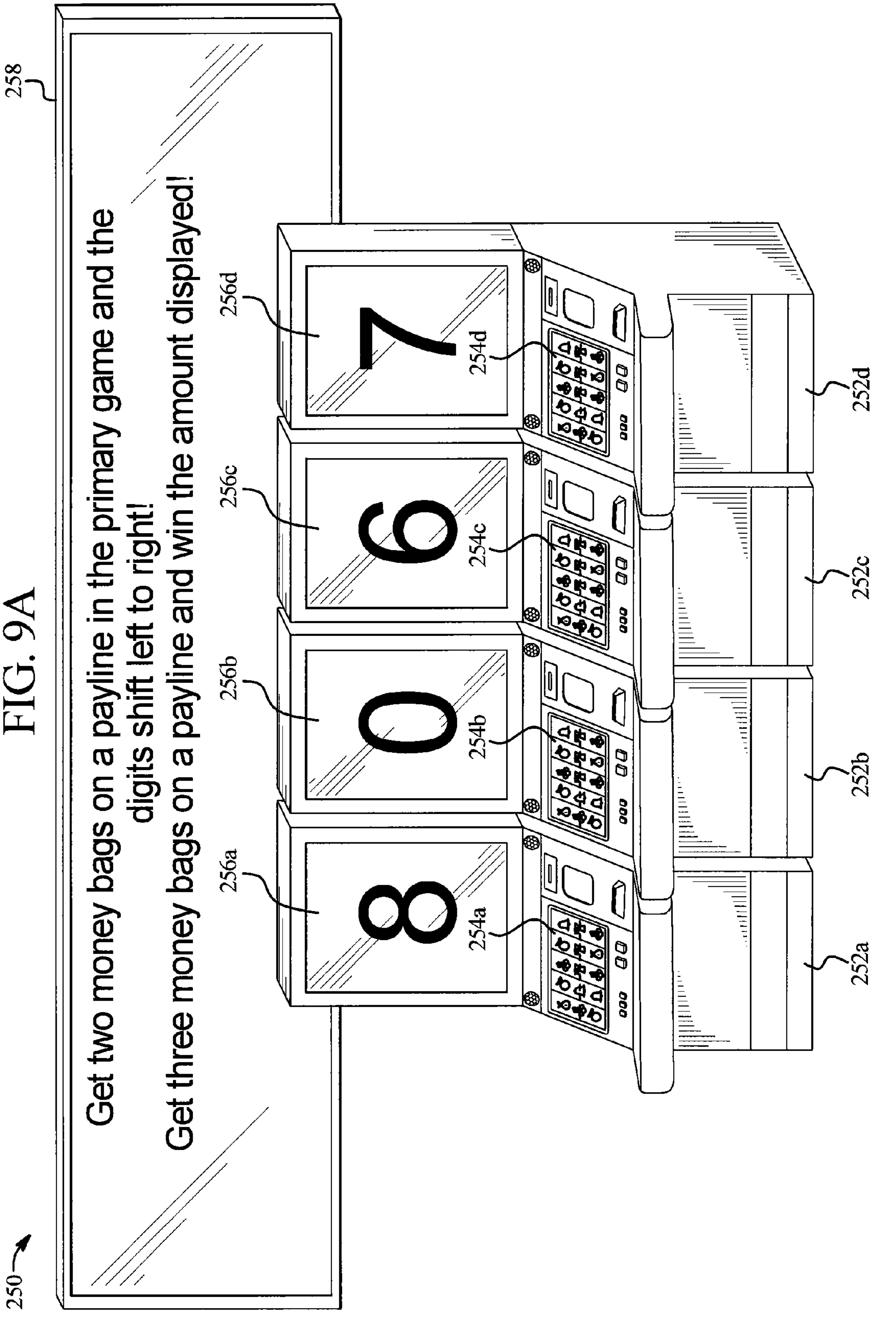
FIGS. 9A, 9B, 9C and 9D are perspective views of one embodiment of the gaming system of the present disclosure including a plurality of gaming machines that enable players to participate in a multi-component digit game where upon a multi-component triggering event, the digits shift to the right.

As illustrated in FIGS. 9A, 9B, 9C and 9D, in another embodiment, the multi-component game is a digit game and the digits on one or more of the gaming machines shift upon an occurrence of a component triggering event. That is, one or more of the component display devices displays a number previously displayed on one of the other adjacent component display devices upon the occurrence of a triggering event. As illustrated in FIG. 9A, a plurality of component display devices 256*a*, 256*b*, 256*c*, and 256*d* of a plurality of adjacently arranged gaming machines 252*a*, 252*b*, 252*c*, and 252*d* of a gaming system 250 display a number or a digit. The first gaming machine 252*a* displays an 8 symbol. The second gaming machine 252*b* displays a 0 symbol. The third gaming machine 252*c* displays a 6 symbol. The fourth gaming machine 252*d* displays a 7 symbol. Thus, combined, the gaming machines display a multi-component game outcome of 8,067. It should be appreciated that all of the digits may shift to the left or the right to change the multi-component game outcome.

In one embodiment, as illustrated on the shared display 258 in FIG. 9A, upon a component triggering event of the generation of two adjacent money bag symbols on a payline, the symbols shift to the right. That is, a symbol that is displayed by the component display device of a first gaming machine is displayed by a second gaming machine directly to the right of the first gaming machine. Upon an occurrence of an evaluation triggering event of the generation of three adjacent money bag symbols on a payline, the gaming machine awards the player the amount currently displayed by the component display devices.

Figure 9B:
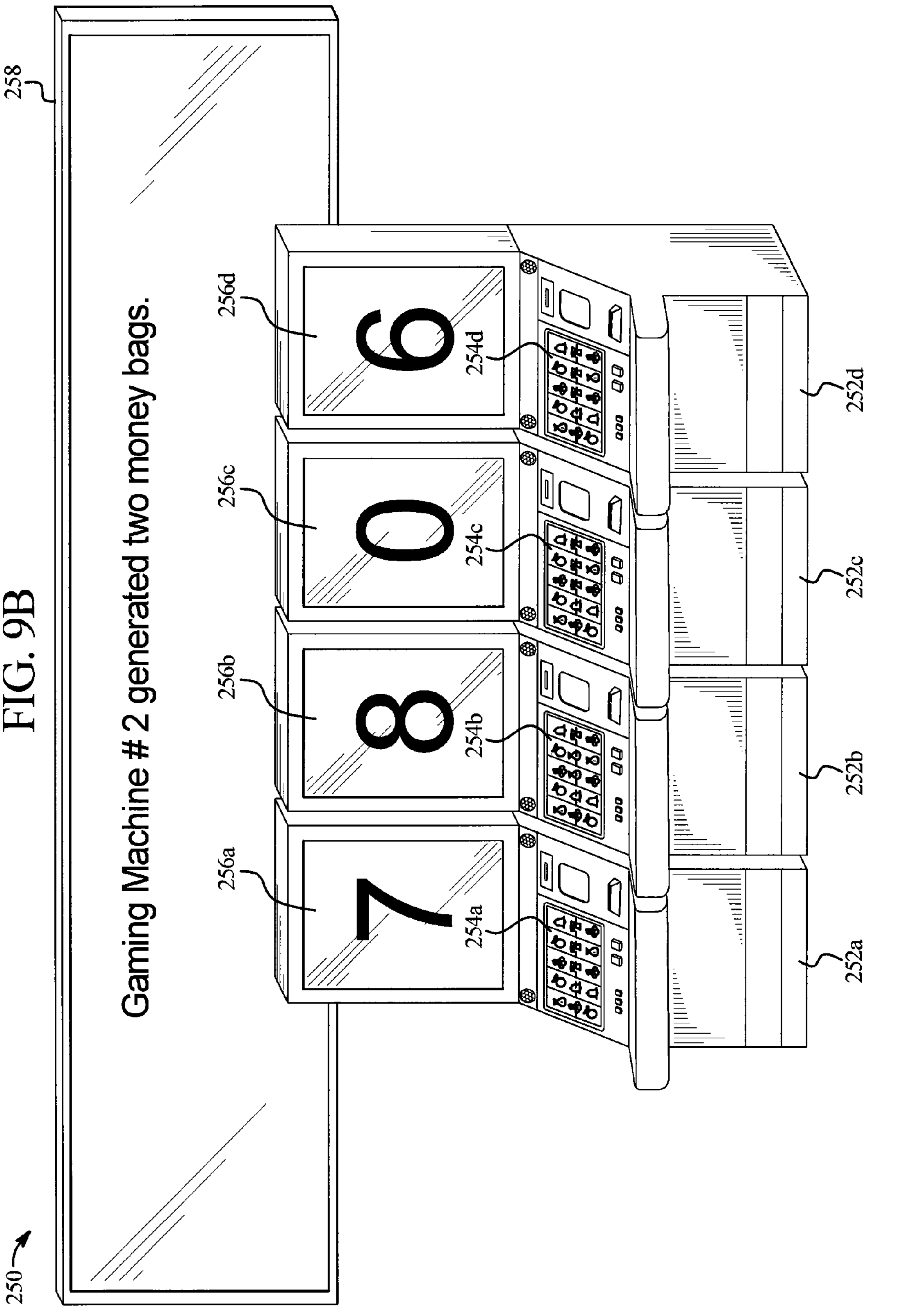

As illustrated in FIG. 9B, the second gaming machine 252*b* generates two money bags on the payline of the slot game displayed on the primary display device 254*b*. Therefore, all of the digits "shift" to the right. That is, the first gaming machine 252*a* now displays the number 7 on the component display device 256*a* that was previously displayed by the fourth gaming machine 252*d*. The second gaming machine 252*b* now displays an 8 on the component display device 256*b* that was previously displayed by the first gaming machine 252*a*. The third gaming machine 252*c* now displays a 0 which was previously displayed by the second gaming machine 252*b*. The fourth gaming machine 252*d* displays a 6 which was previously displayed by the third gaming machine 252*c*.

Figure 9C:
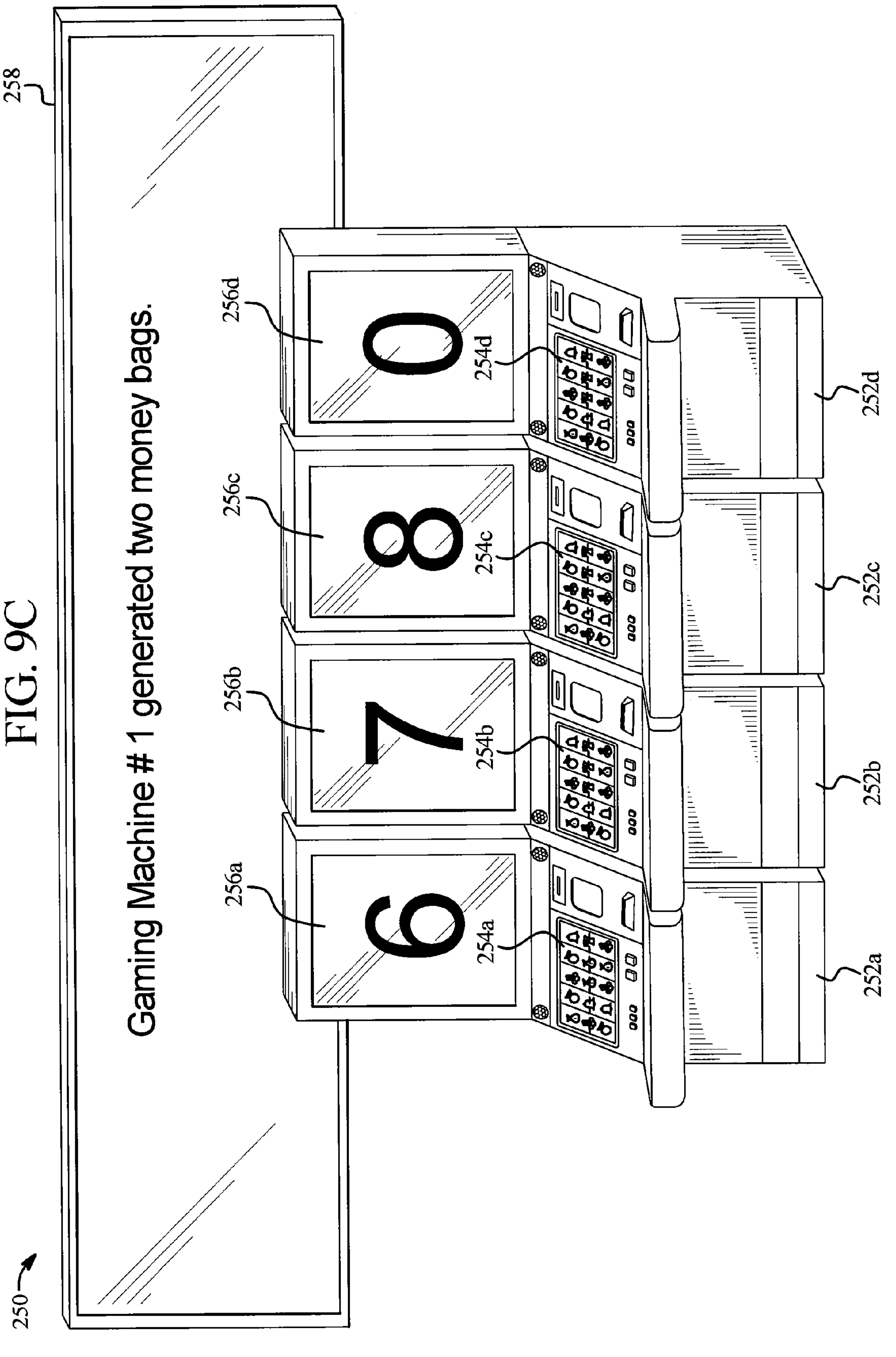

As illustrated in FIG. 9C, the first gaming machine 252*a* generates two money bags on the payline in the primary game. Therefore, all of the digits shift to the right. The component display devices 256*a*, 256*b*, 256*c* and 256*d* now display a multi-component game outcome of 6,780.

Figure 9D:
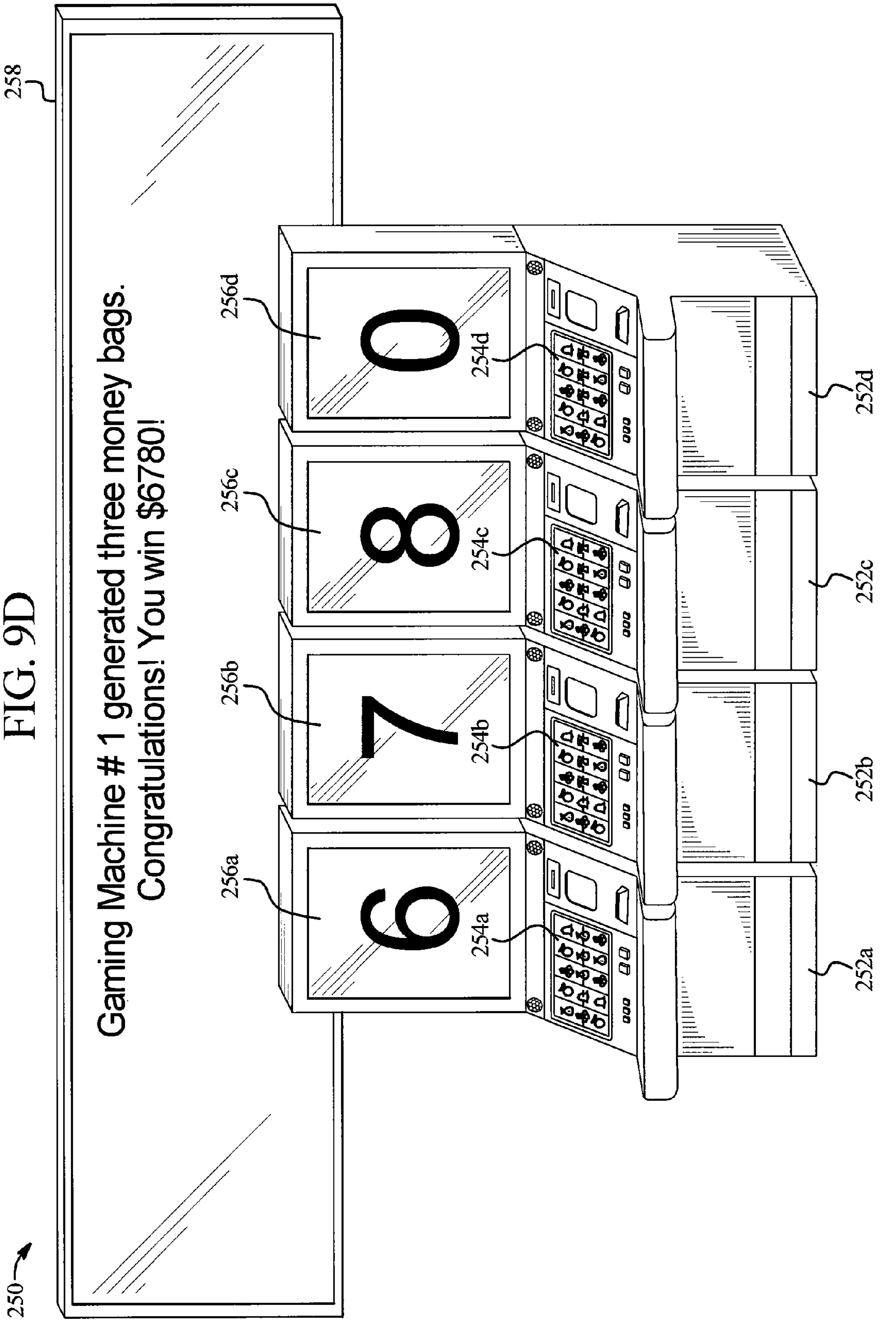

As illustrated in FIG. 9D, the first gaming machine 252*a* generates the evaluation triggering event of three money bags on the payline in the primary game. Therefore, in the illustrated embodiment, the first gaming machine 252*a* provides the player an award of the currently displayed multi-component game outcome or $6,780.00.

In one embodiment, after a triggering event occurs, the gaming machines display new digits or numbers for the multi-component game. In another embodiment, after an evaluation triggering event occurs, the gaming machines display the same digits or numbers previously displayed. It should be appreciated that any number of gaming machines may display any suitable number of digits. It should also be appreciated that one of the gaming machines may display a decimal point. It should be appreciated that the numerical digits may represent any credit or monetary denomination. In one embodiment, the award is partially based on the displayed digits. It should be appreciated that any suitable multi-component game outcome may be based on the order of some or all of the components displayed in the multi-component game. For example, a multi-component game outcome of a slot game or a digit game may be based on the order which the components are displayed.

In another embodiment of the digit multi-component game, the triggering gaming machine generates a new number and one or more of the numbers shift based on this number. For example, the gaming machines display a 3, 5, 9, 2, and 1. When the third gaming machine has an occurrence of a component triggering event, in one embodiment, the third gaming machine generates a new number, such as a three. In this embodiment, the number previously displayed by the triggering gaming machine is displayed on an adjacent gaming machine and the number previously displayed on that gaming machine is displayed by the next adjacent gaming machine. For example, the fourth gaming machine now displays a 9 and the fifth gaming machine now displays a 2. That is, the numbers shift to the right. In one embodiment, the first and second gaming machines display the same numbers.

It should also be appreciated that this shift-digit embodiment of the multi-component game may be incorporated into the other embodiments disclosed herein in any suitable manner. In one embodiment, all of the digits shift. The digits may shift to the right or to the left. In one embodiment, an event or an input determines which direction the digits shift. In another embodiment, the player of a triggering gaming machine may hold one or more numbers. That is, the player can cause at least one of the gaming machines to continue displaying the same number on the component display device instead of displaying a new number.

It should appreciated that any suitable symbol or component may be displayed in the multi-component game. It should be appreciated that the gaming system may include more than one primary game. That is, one, a plurality or all of the gaming machines may include a different primary game. The gaming machines may each include more than one primary game. In one embodiment, the gaming machines each include at least one secondary or bonus game in addition to the multi-component game.

Figure 7A:
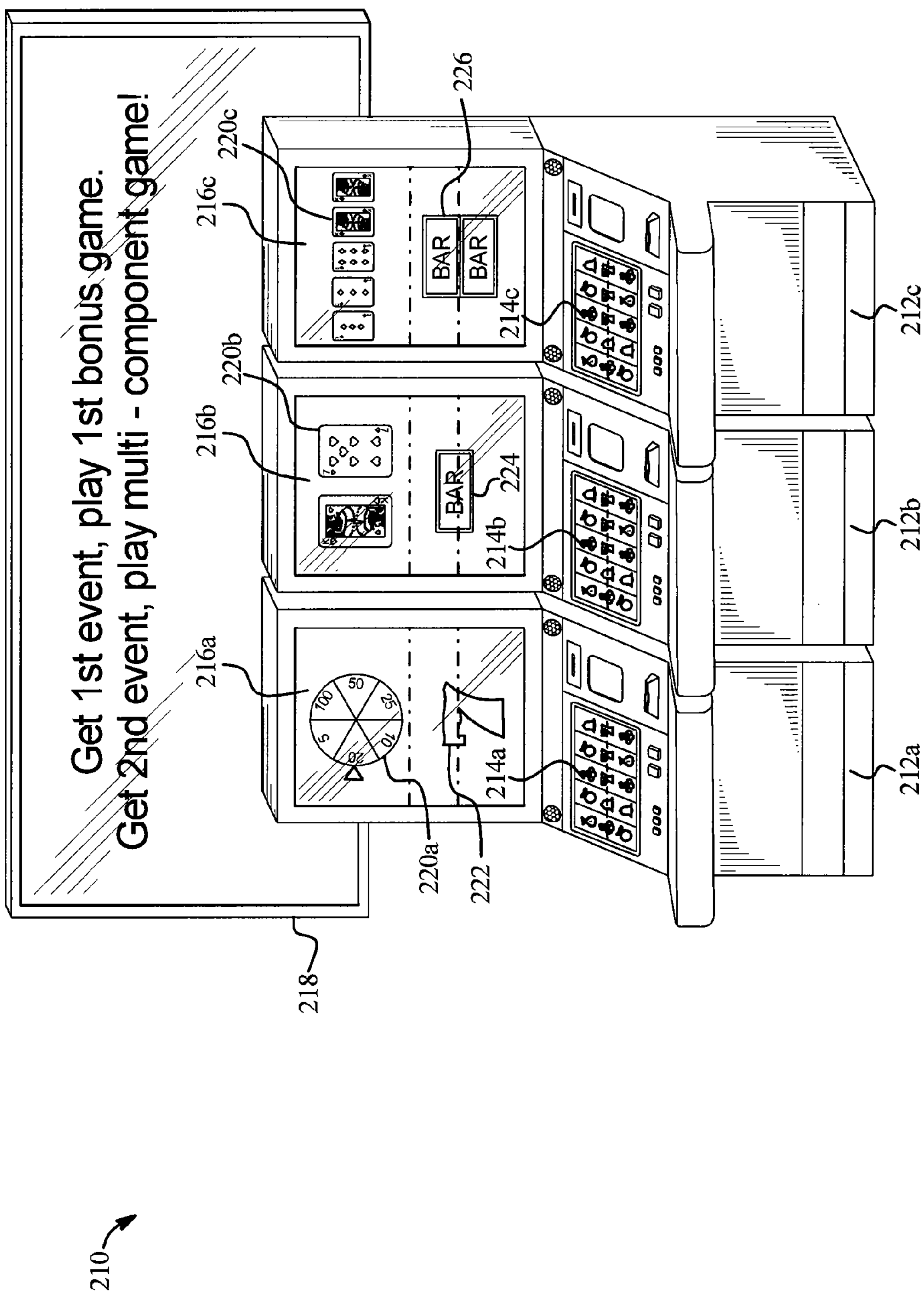
FIGS. 7A, 7B, 7C and 7D are perspective views of one embodiment of the gaming system of the present disclosure including a plurality of gaming machines that enables players to participate in a primary game and upon appropriate triggering events a bonus game and/or a multi-component game.
Figure 7B:
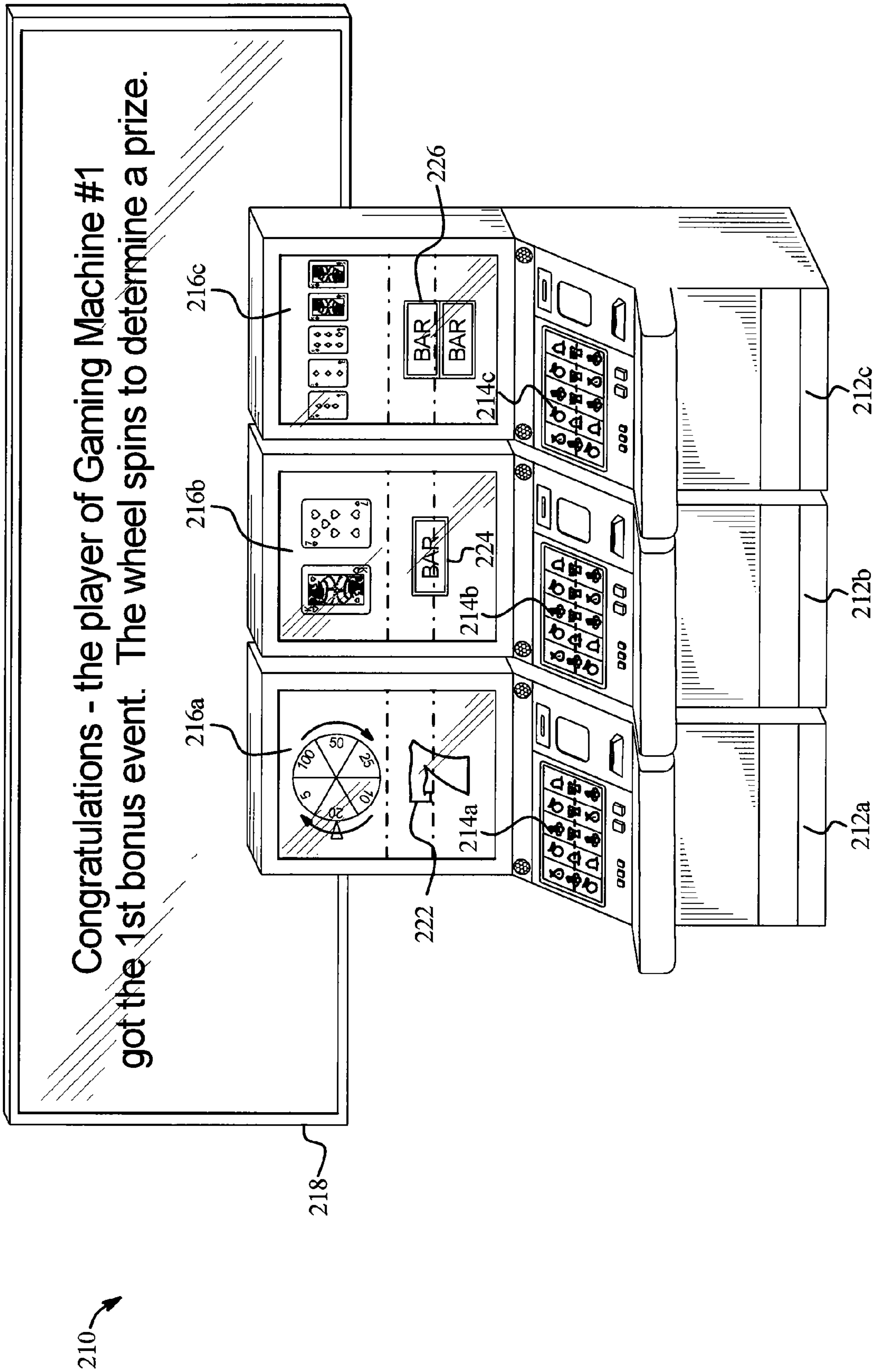
Figure 7C:
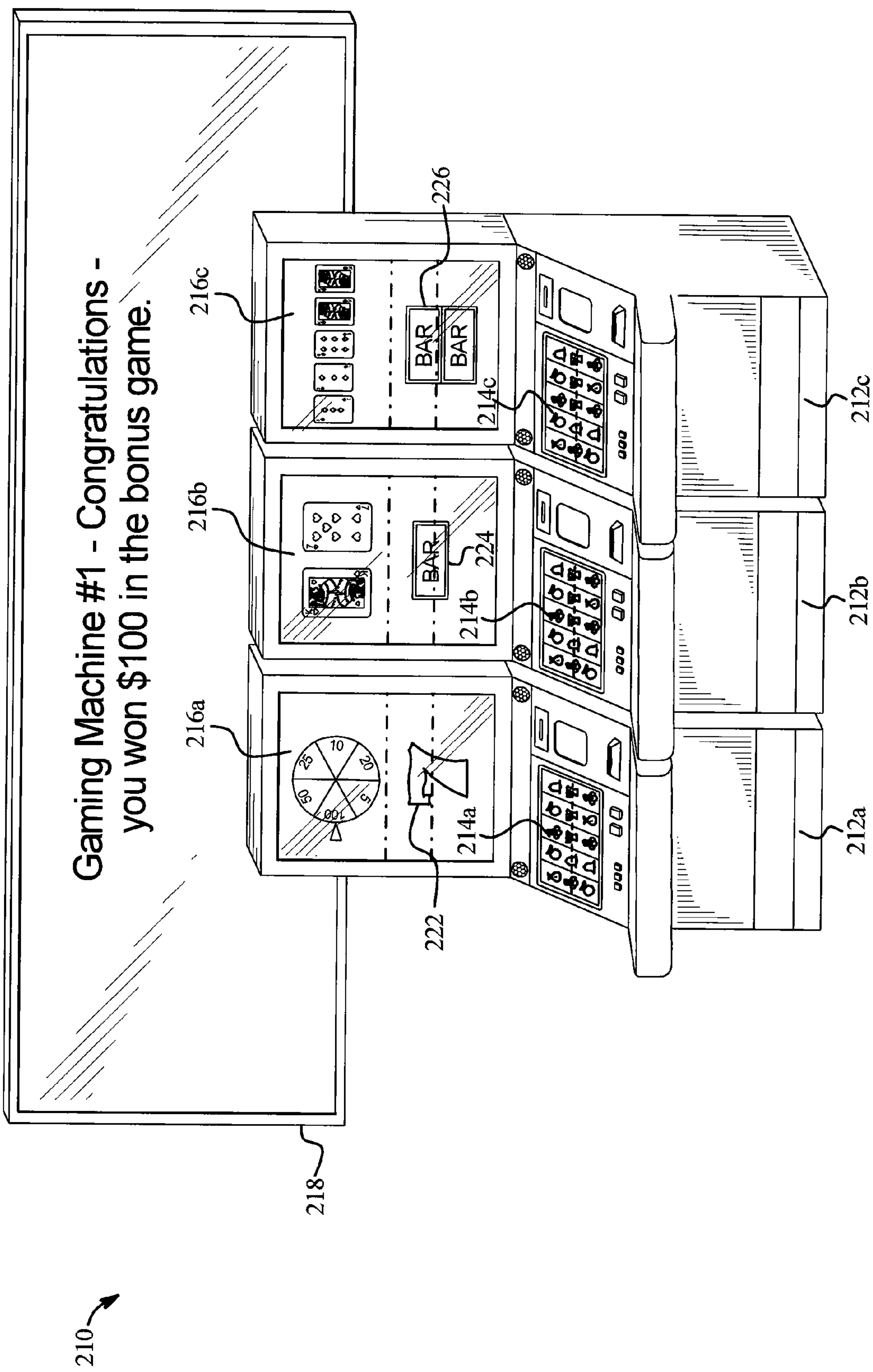

As illustrated in FIGS. 7A, 7B and 7C, each of the gaming machines 212*a*, 212*b* and 212*c* of a gaming system 210 includes a primary game, such as a slot game displayed by a primary display device 214*a*, 214*b*, and 214*c*. Each gaming machine 212*a*, 212*b* and 212*c* includes a plurality of games on the secondary or component display 216*a*, 216*b* and 216*c*.

In this embodiment, each of the gaming machines displays an individual secondary or bonus game. The first gaming machine 212*a* displays a wheel secondary game 220*a*, the second gaming machine 212*b* displays a card secondary game 220*b* such as blackjack and the third gaming machine 212*c* displays a card secondary game 220*c* such as poker. Each of the secondary displays 216*a*, 216*b* and 216*c* additionally displays a multi-component game slot game. As illustrated on the bottom half of the component display devices 216*a*, 216*b* and 216*c*, the first gaming machine 212*a* displays a seven symbol 222, the second gaming machine 212*b* displays a single bar symbol 224 and the gaming machine 212*c* displays a double bar symbol 226. The bonus game and the multi-component game may be implemented and displayed in any suitable manner.

In one embodiment, as illustrated in FIG. 7A, if a player of one of the gaming devices achieves or obtains a first triggering event or a bonus game triggering event, the gaming machine enables the player to play the associated individual secondary or bonus game, such as the wheel and card games. Upon a multi-component triggering event at one of the gaming machines, the gaming machine generates a new symbol for the player. In this embodiment, the evaluation triggering event for the multi-component game is the same triggering event as the component triggering event. Therefore, when a player achieves the component triggering event, the gaming machine generates a new symbol in the reel game and evaluates the symbols for any winning combinations.

As indicated by the information display 218 in FIG. 7B, the player of the first gaming machine 212*a* obtains the first bonus event or the bonus event. The gaming machine spins the wheel to determine a prize to provide the player of the first gaming machine 212*a* in the bonus game. As illustrated in FIG. 7C, the gaming machine generates an award of $100 on the component display 216*a*. The gaming machine provides the player with an award of $100.

Figure 7D:
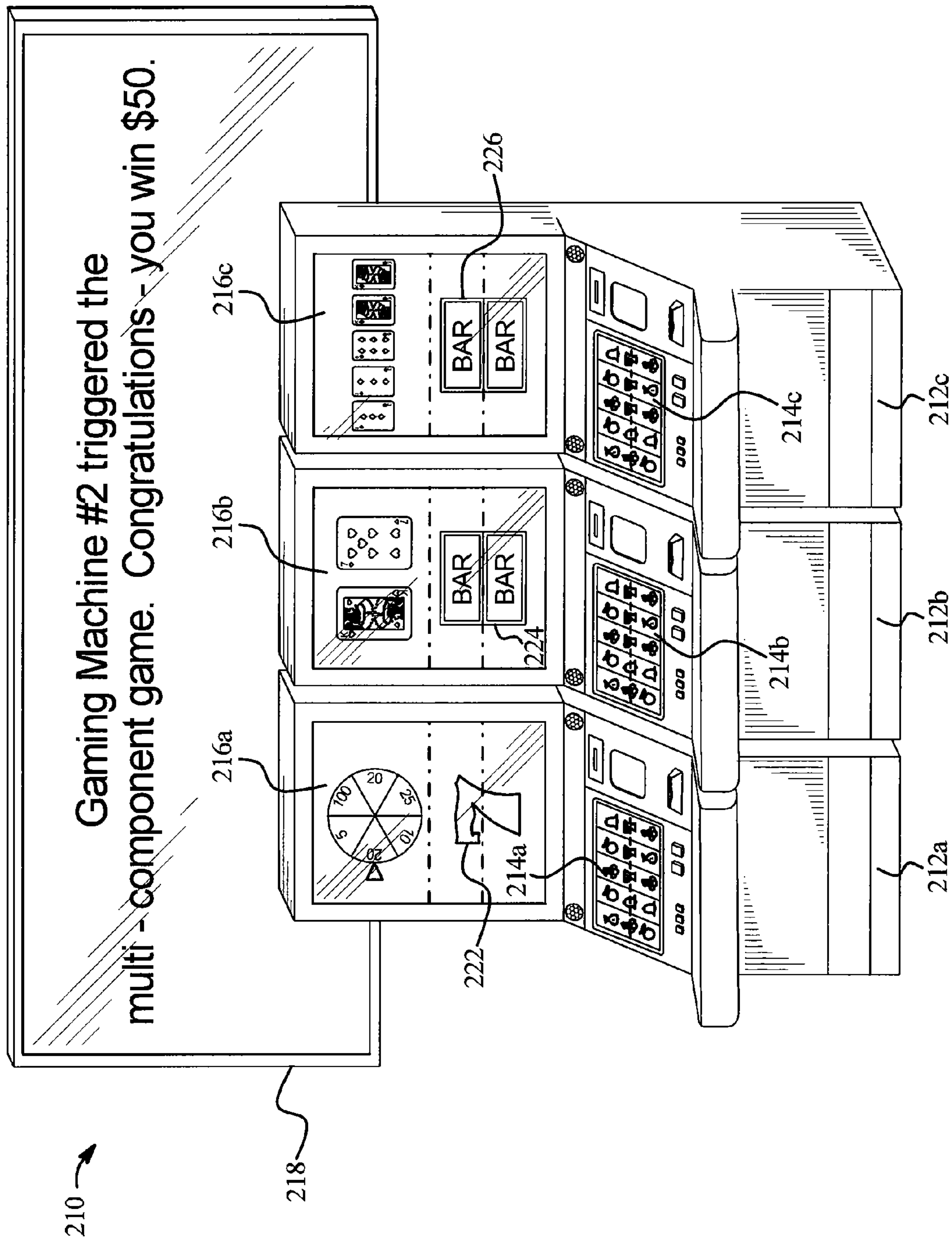

As indicated in display 218 of the gaming system 210, illustrated in FIG. 7D, the second gaming machine triggers the multi-component slot game. The second gaming machine 212*b* generates a new symbol on the component display device 216*b*. Therefore, the gaming machine and/or gaming system evaluates the generated symbols and provides the player with a multi-component game outcome. In this embodiment, the player obtained two double bar symbols and wins an award of $50.

In another embodiment, a gaming system includes a plurality of gaming machines and each of the gaming machines includes a primary game, a component display device to display at least one component of a multi-component game and one or more secondary or bonus games. In one embodiment, each the gaming machines includes a component triggering event and an evaluation triggering event. In this embodiment, the component triggering event and the evaluation triggering event are the same. When the component triggering event occurs, that gaming machine generates a component in the multi-component game. If a bonus triggering event occurs in the multi-component game, the gaming machine enables the player to play the bonus game. In one such embodiment, the bonus game that the gaming machine enables the player to play is based upon the wager in the primary game.

More specifically, in one embodiment, each gaming machine includes a base or primary game, such as a slot game. In one embodiment, the component triggering event and the evaluation triggering event are the same event. That is, each gaming machine or each active gaming machine generates another component on the component display device and evaluates each of the generated components upon one event, such as an input in the primary game. In one embodiment, the bonus triggering event is a winning combination in the multi-component game. That is, if upon a component and evaluation triggering event the generated components are a winning combination or multi-component game winning outcome, each of the participating gaming machines enable the players to play a secondary or bonus game. In one embodiment, which type or kind of bonus game each player is enabled to play is determined by the individual wager in the primary game. For example, if a player wagers $1 and achieves the bonus game, the bonus game is blackjack. If a player wagers $3 in the primary game and achieves the bonus game, the bonus game is slots. If the player wagers $5 and achieves the bonus game, the bonus game is a wheel game. In one embodiment, the multi-component game outcome additionally determines a multiplier to be used in the bonus game. If the player achieves a winning bonus game outcome, the award provided to the player is determined, at least in part, by the multiplier. It should be appreciated that in one embodiment of this multi-game embodiment, the primary game does not generate an award. Rather, the primary game generates a component triggering event and/or an evaluation triggering event for the multi-component game and/or a bonus triggering event for the bonus game.

It should be appreciated that any events in the primary game, multi-component game or bonus game may influence any other event in the primary game, multi-component game or bonus game in any suitable manner.

In one embodiment, each of the players is enabled to place a side wager to participate in one or more plays of the multi-component game as illustrated in FIGS. 8A, 8B, 8C, and 8D. That is, the component triggering event and the evaluation triggering event are both combined and are the placement of a side wager. Each gaming machine 232*a*, 232*b*, 232*c*, 232*d* and 232*e* enables a player to place a wager on a primary game and enables the player to place a side bet or wager an extra amount to play or participate in the multi-component game. In this embodiment, the player is able to place a side bet and then participate in a certain number of plays of the multi-component game based on the amount of the side bet. That is, one wager may be more than one component triggering event and evaluation triggering event, depending on the wager amount. The same wager may trigger the generation of a plurality of components on the same gaming machine and a plurality of evaluations after each component generation.

Figure 8A:
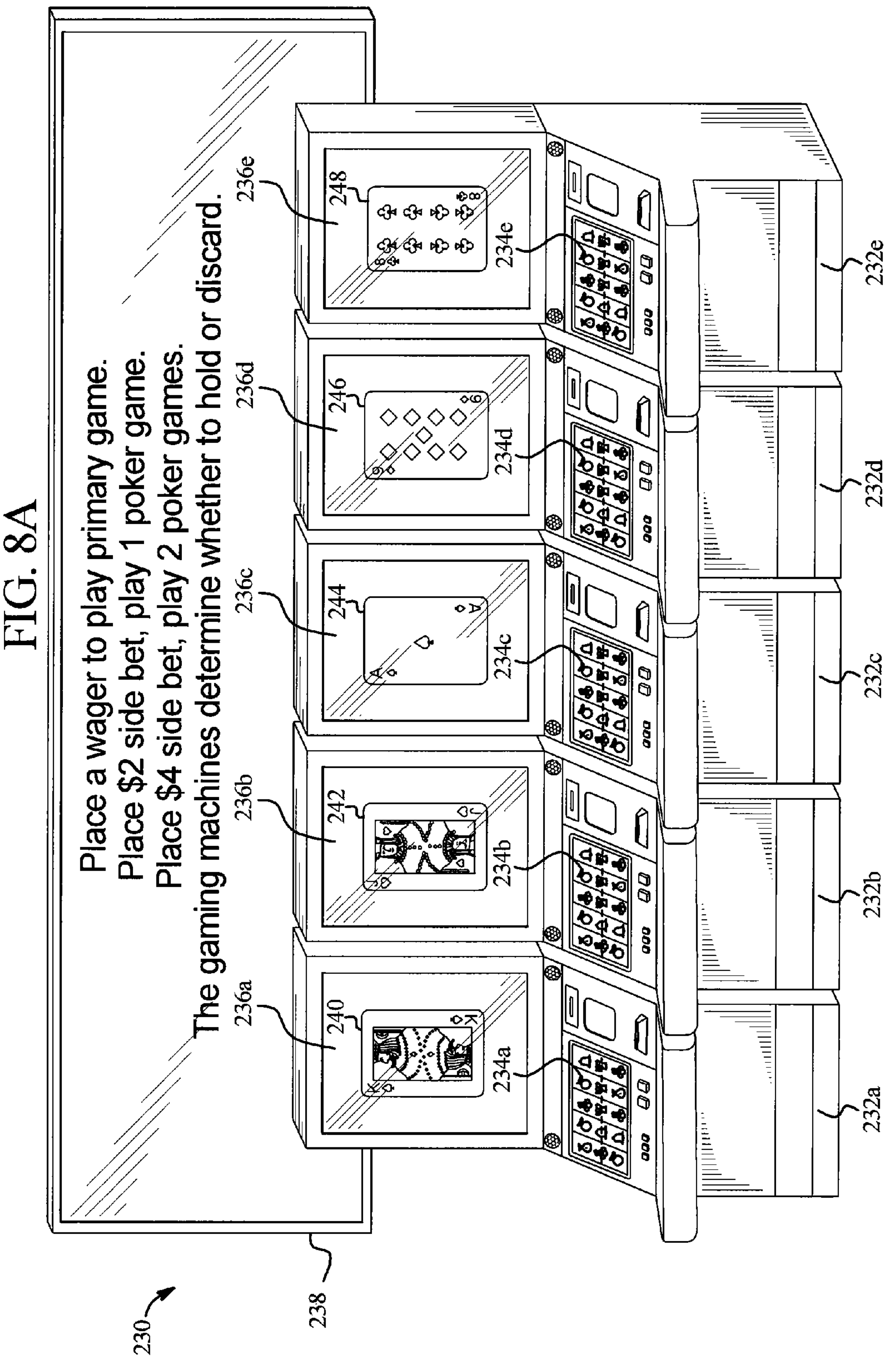
FIGS. 8A, 8B, 8C and 8D are perspective views of one embodiment of the gaming system of the present disclosure including a plurality of gaming machines that enable players to participate in a primary game and upon a placement of a side wager a multi-component game.

More specifically, as illustrated in FIG. 8A, a gaming system 230 includes a plurality of gaming machines 232*a*, 232*b*, 232*c*, 232*d* and 232*e*. Each of the gaming machines includes a primary game display device 234*a*, 234*b*, 234*c*, 234*d* and 234*e* to display the primary slot game and a secondary or component display device 236*a*, 236*b*, 236*c*, 236*d* and 236*e* to display at least one component of the multi-component draw poker game. In this embodiment, the gaming system 230 additionally includes a display 238.

The secondary display 238 informs the players if the player wagers a side bet of two dollars, the gaming machine will enable the player to participate in one play of the multi-component poker game. If the player wagers four dollars, they are enabled participate in the two plays of the multi-component poker game. As illustrated in FIG. 8A, each of the component display devices 236*a*, 236*b*, 236*c*, 236*d* and 236*e* displays one card of a five card poker hand: a king of spades 240, a jack of hearts 242, an ace of spades 244, a nine of diamonds 246 and an eight of clubs 248, respectively.

Each gaming machine requires the player to enter a wager to play the primary slot game and to place a side bet to play the multi-component poker game. It should be appreciated that this side bet can be incorporated in any embodiment of the present disclosure.

Figure 8B:
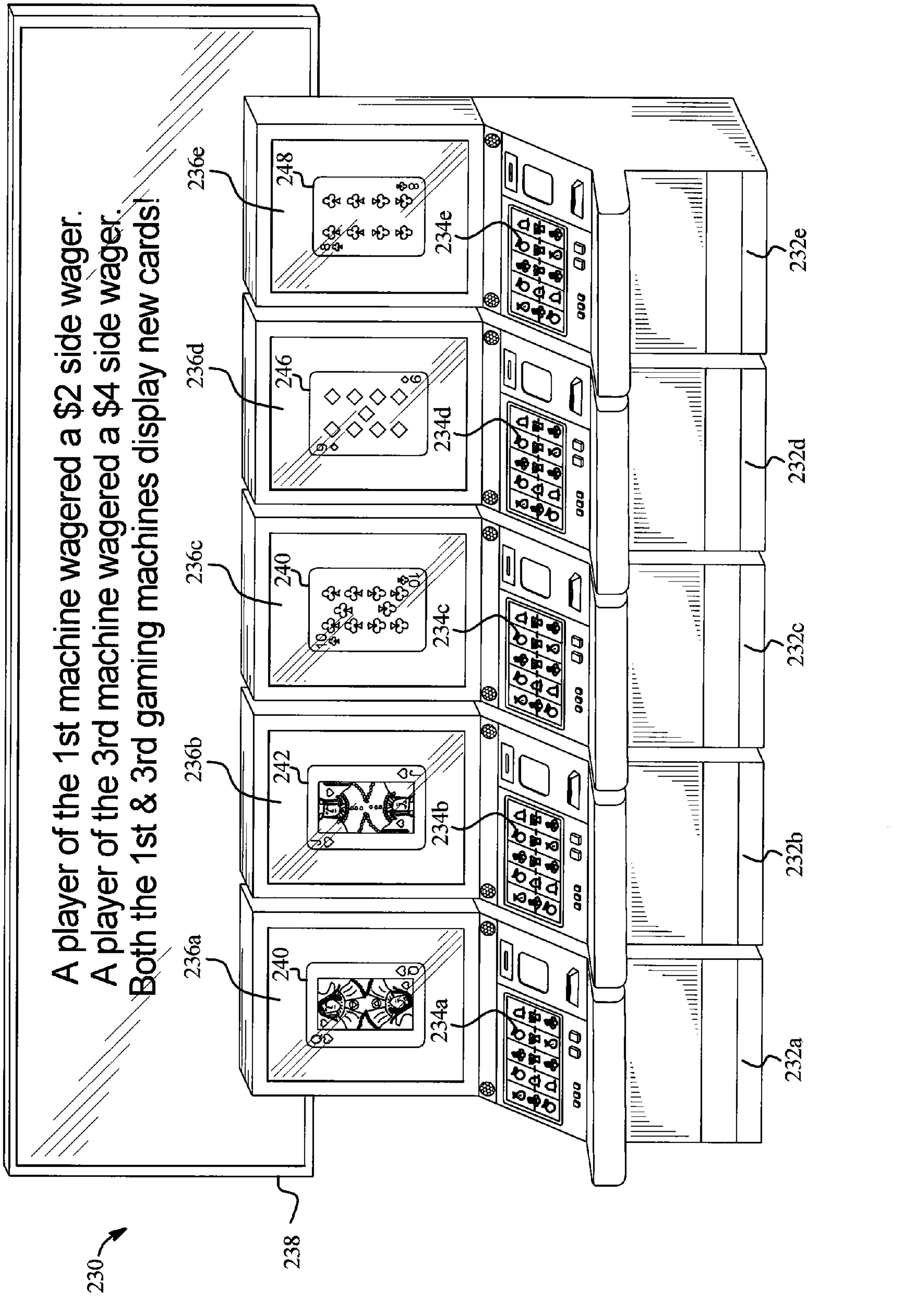

As illustrated in FIG. 8B and indicated by the display 238, the player of the first gaming machine 232*a* wagered a $2 side bet and the player of the third machine 232*c* wagered a $4 side bet. Therefore, the player of the first gaming machine 232*a* is enabled to play one play of the multi-component poker game and the player of the third gaming machine 232*c* is enabled to play two plays of the multi-component poker game.

Figure 8C:
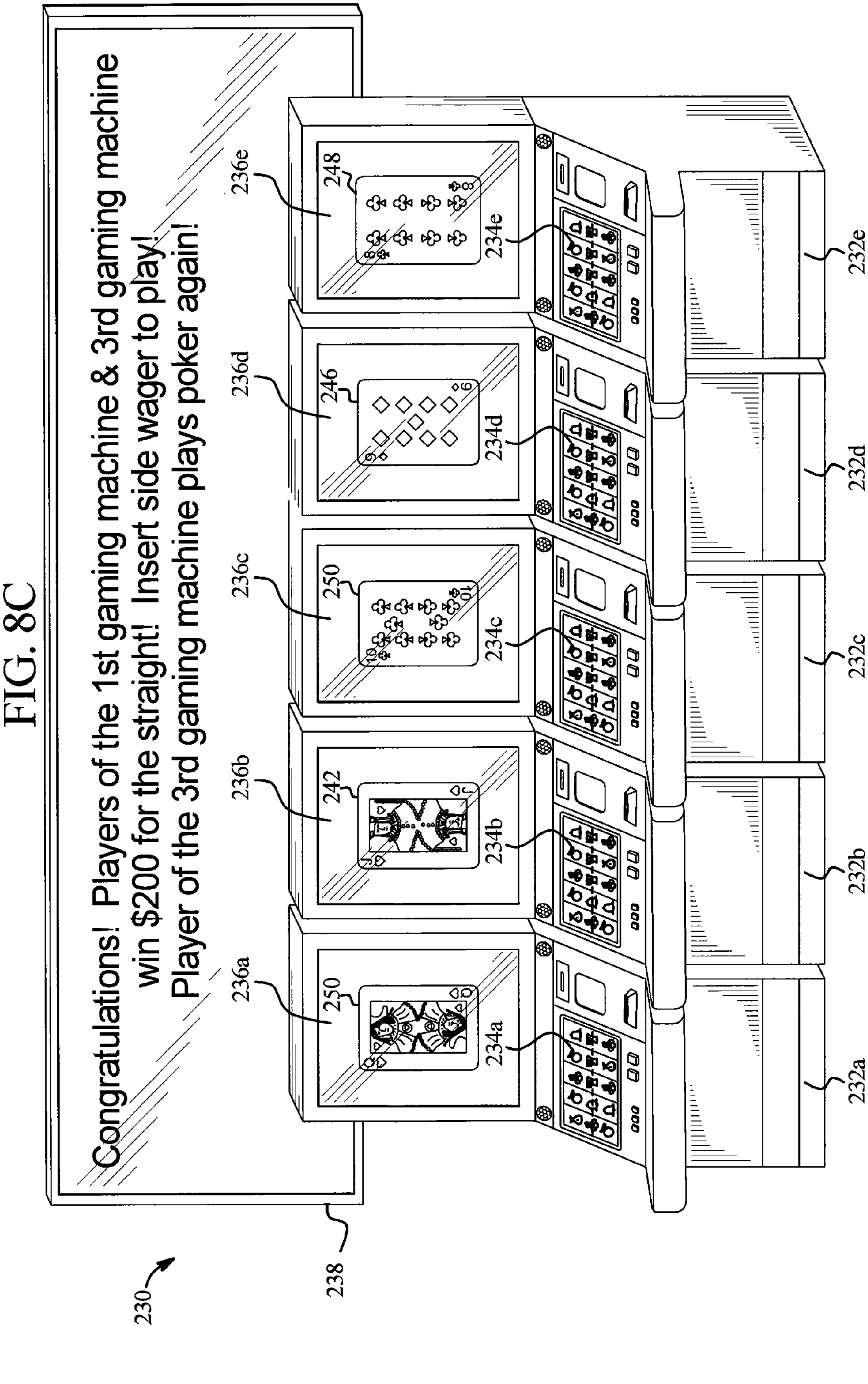

In one embodiment, as illustrated in FIG. 8C, each of the participating gaming machines 232*a* and 232*c* generate a new card upon the multi-component triggering event. The first gaming machine 232*a* generates a queen of hearts 250 on the component display device 236*a* and the third gaming machine 232*c* generates a ten of clubs 252 on the component display device 236*c*. It should be appreciated that the generation and display of the cards may be simultaneous with play of the primary slot game or after play of the primary slot games. The other gaming machines do not generate a new card but continue displaying the same card.

The first and third gaming machines send a signal to the central controller indicating each newly generated card. The central controller evaluates the components or cards of the multi-component game, which are the queen of hearts 250, the jack of hearts 242, the ten of clubs 250, the nine of diamonds 246 and the eight of clubs 248. This combination is a straight. As illustrated in FIG. 8C, the first and third gaming machines provide the players each an award of $100 for the winning poker combination.

Figure 8D:
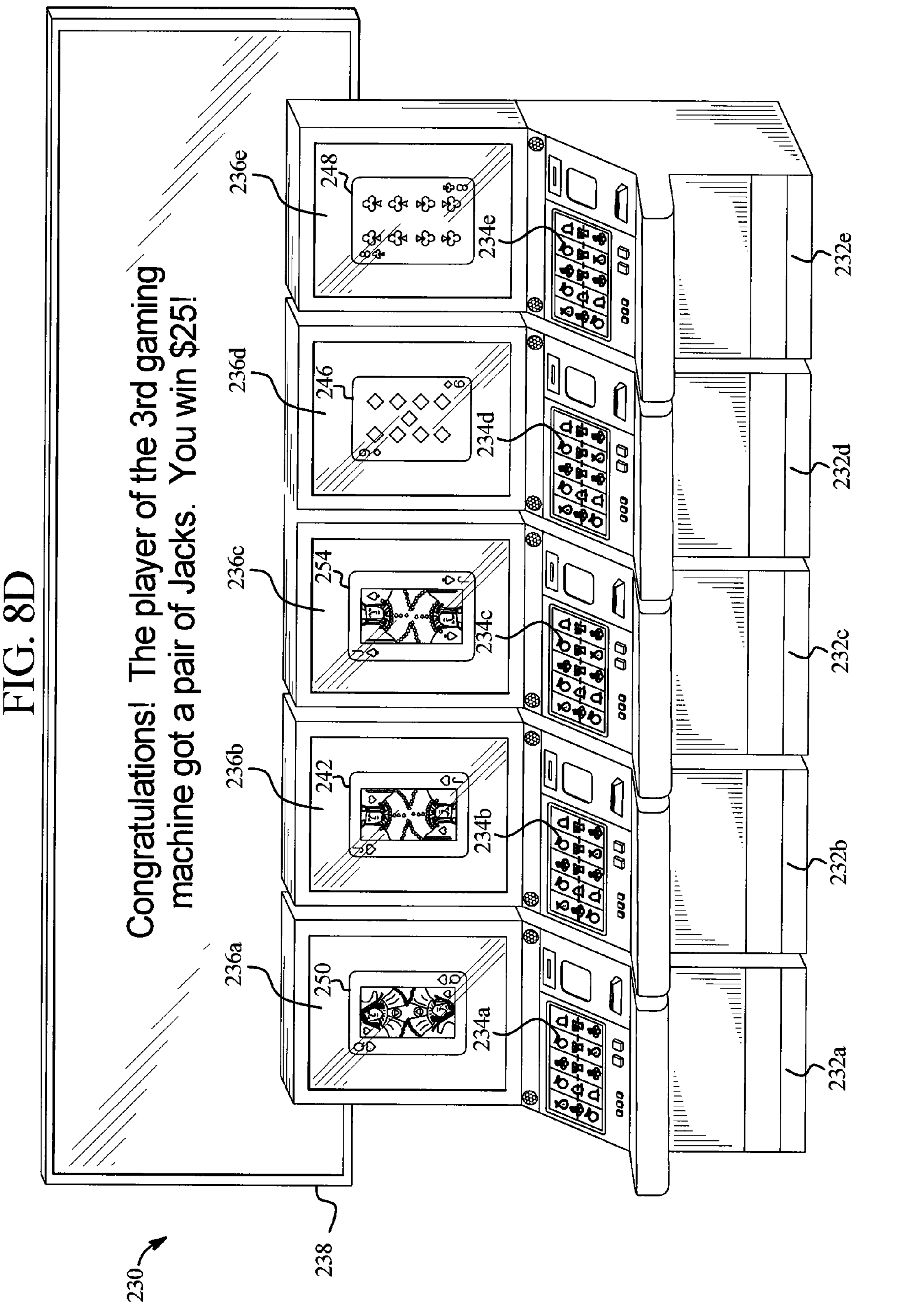

As illustrated in FIG. 8D, the third gaming machine 232*c* generates a card because the player of the gaming machine wagered a large enough amount to play two multi-component games. The component display device 236*c* generates a jack of spades 254 and sends an appropriate signal to the central controller. The displayed card hand includes two jacks, the jack of hearts 242 and the jack of spades 254. The central controller determines this is a winning combination which is two of a kind. The central controller sends a signal to the third gaming machine to provide the player an award. As illustrated in FIG. 8D, the gaming machine provides the player an award of $25 for the win.

As illustrated in FIGS. 10A, 10B, 10C, 10D and 10E in another embodiment, the multi-component game is a free spin game. In one such embodiment, the gaming system 260 includes a plurality of gaming machines 262*a*, 262*b*, 262*c* 262*d*, and 262*e*. In this embodiment, each of the gaming machines includes a primary game display device 264*a*, 264*b*, 264*c*, 264*d*, and 264*e* that displays a primary game. The gaming machines also include a player activation display 268*a*, 268*b*, 268*c*, 268*d* and 268*e* illustrating whether a player is actively playing that gaming machine. Each of the gaming machines includes a component display device or a secondary display device 268*a*, 268*b*, 268*c*, 268*d*, and 268*e*. The gaming system includes a central display 270.

In the illustrated embodiment, the multi-component game is a free spin slot game, though it should be appreciated that the game may be any suitable game. In the illustrated embodiment, the component triggering event and the evaluation triggering event are the same event, the generation of three stars in one of the primary slot games. In this embodiment, when a player obtains the triggering event, any player that meets one or more certain conditions is enabled to participate in the multi-component free spin game.

More specifically, the gaming machines enable the players to place a first wager to play the primary game that is played on that gaming machine. In the illustrated embodiment, the primary game is a slot game. It should be appreciated that one or more of the gaming machines may include a plurality of primary games or different types primary games. When one of the players obtains the combination of three stars in the primary game, each of the players that meet the qualifying condition may participate in the free spin game.

In one embodiment, the gaming system enables the players to place a second wager to be eligible to participate in the free spin game. In one embodiment, to be eligible to play the multi-component game, the criteria to play the multi-component game is that active players must have placed the second wager within a certain time period or a certain number of games from the triggering event. In this embodiment, the player must have placed a second wager within five minutes before the occurrence of the multi-component triggering event.

Figure 10A:
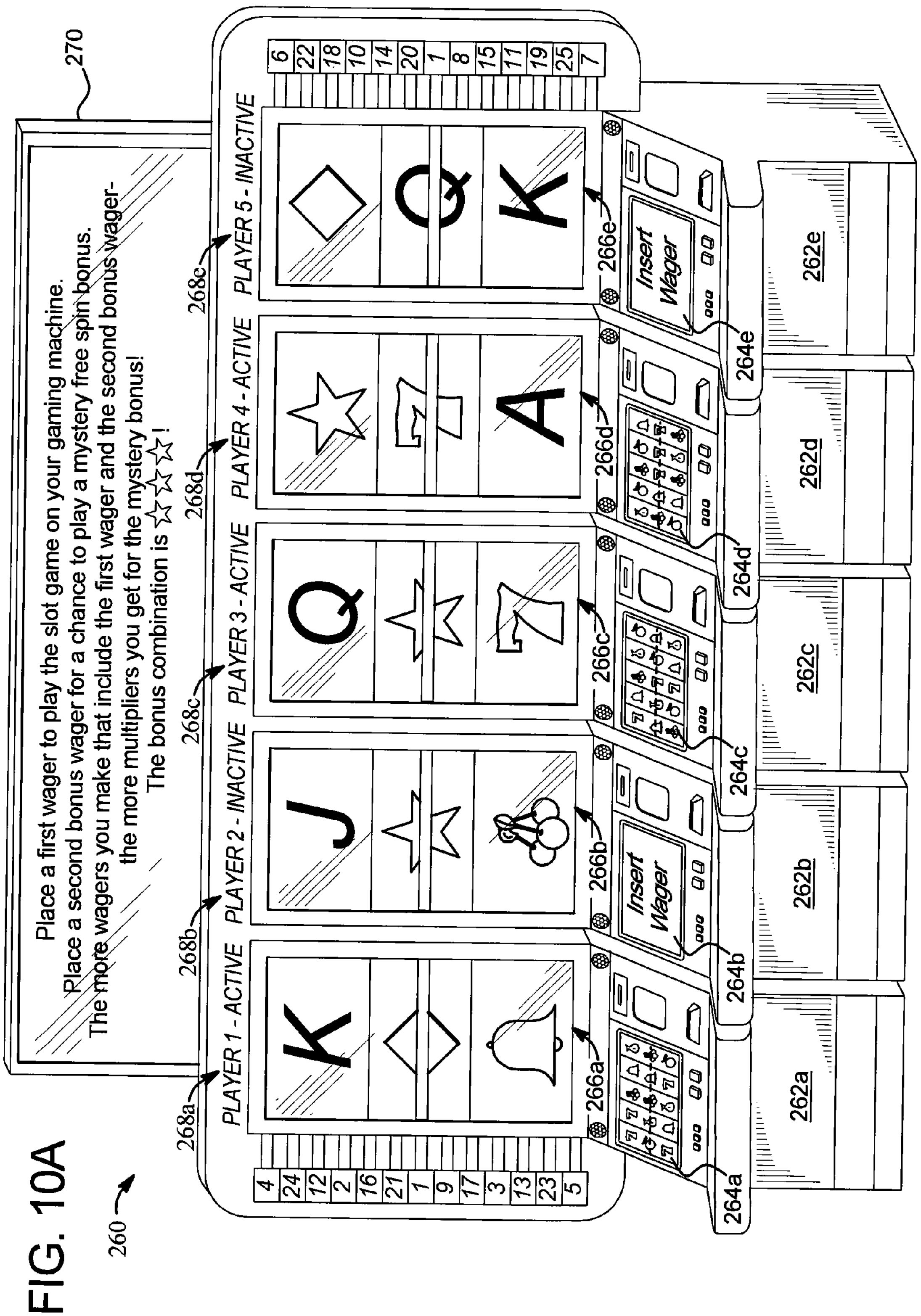
FIGS. 10A, 10B, 10C, 10D and 10E are perspective views of one embodiment of the gaming system of the present disclosure including a plurality of gaming machines that enable active players to participate in a multi-component free spin game upon a multi-component triggering event.

In one embodiment, the multi-component game includes an additional bonus, benefit, or advantage based on certain criterion or conditions. In this embodiment, the gaming system determines which players will receive a bonus for the multi-component game, such as a multiplier. In one embodiment, for each triggering of the multi-component game, the gaming system provides a plurality of multipliers to the participants of the multi-component game. As illustrated in FIG. 10A, the amount of multipliers a player receives is based on the amount wagered since the last occurrence of the triggering event where each wager counted towards the amount wagered must have included the second wager. For example, if a player wagers three wagers, Wager #1, Wager #2 and Wager #3 and Wager #1 only includes the first wager, Wager #2 includes the first wager and the second wager and Wager #3 includes the first wager and the second wager, only the amounts of Wager #2 and Wager #3 will count for determining how many multipliers the gaming system provides each participating player. Additionally, in one embodiment, the player with the multi-component triggering event receives an additional bonus or advantage. In the illustrated embodiment, the triggering player receives a multiplier regardless of the amount wagered with the second wager since the occurrence of the last triggering event. That is, the remaining multipliers are distributed to the participating gaming machines based on relative coin-in since the last occurrence of the multi-component triggering event and only wagers that include the second wager are included in the multiplier determination. A gaming machine's proportion of coin-in to the bank's total coin-in is the probability that the gaming machine will be awarded one of the multipliers.

For example, if the multi-component game has 3 players and the triggering gaming machine receives 1 of the multipliers, and Gaming Machine #1 has 50% of the coin-in, Gaming Machine #2 has 40% of the coin in and Gaming Machine #3 has 10% of the coin in, then these are the probabilities used to determine how each and every one of the remaining multipliers will be distributed to the gaming machines. Therefore, on average Gaming Machine #1 would receive 50% of the remaining multipliers distributed after the distribution of the single multiplier to the triggering gaming machine. Additionally, the gaming system plays a determined number of free spins of the secondary displays to determine awards for the participating players.

Figure 10B:
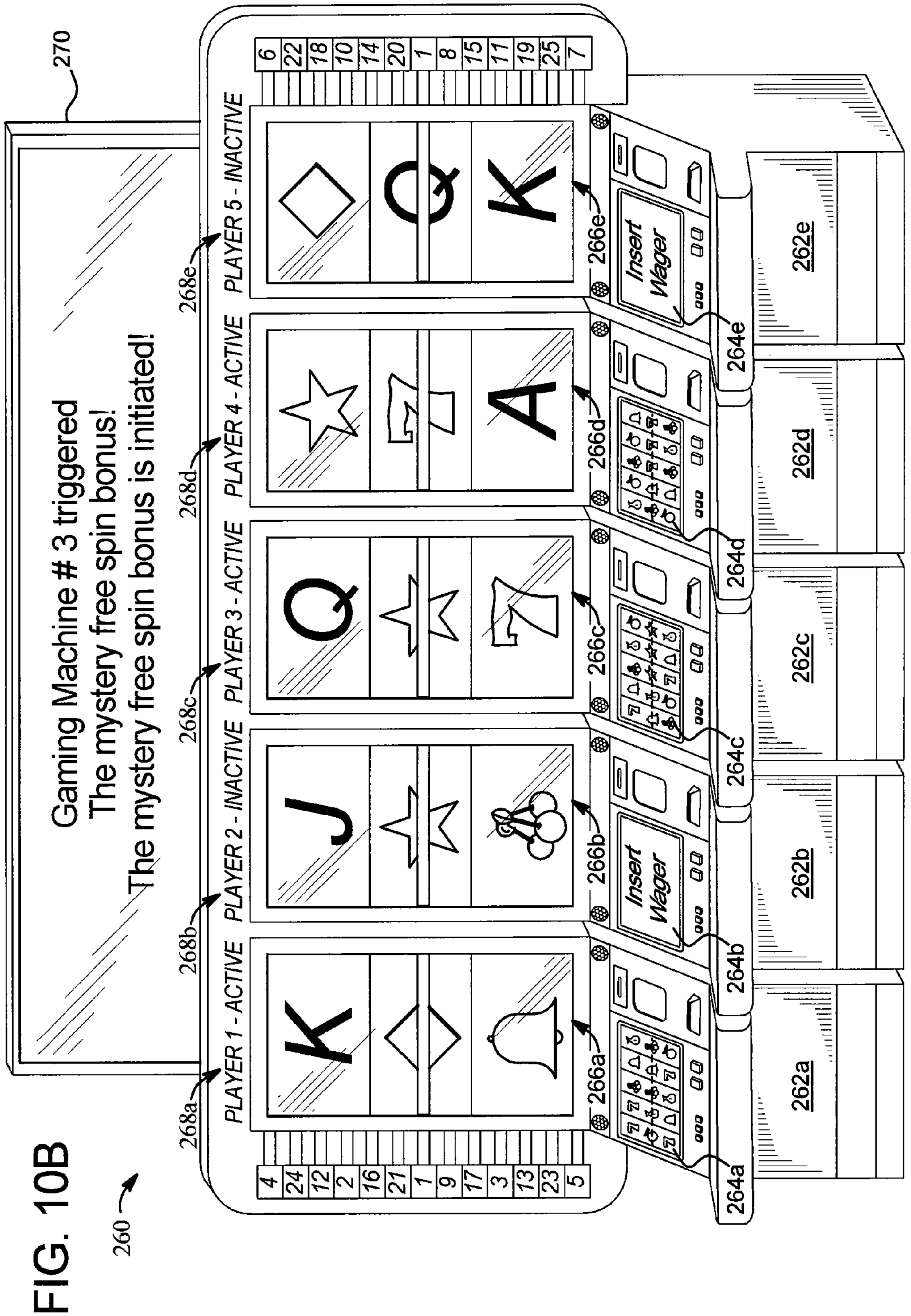
Figure 10C:
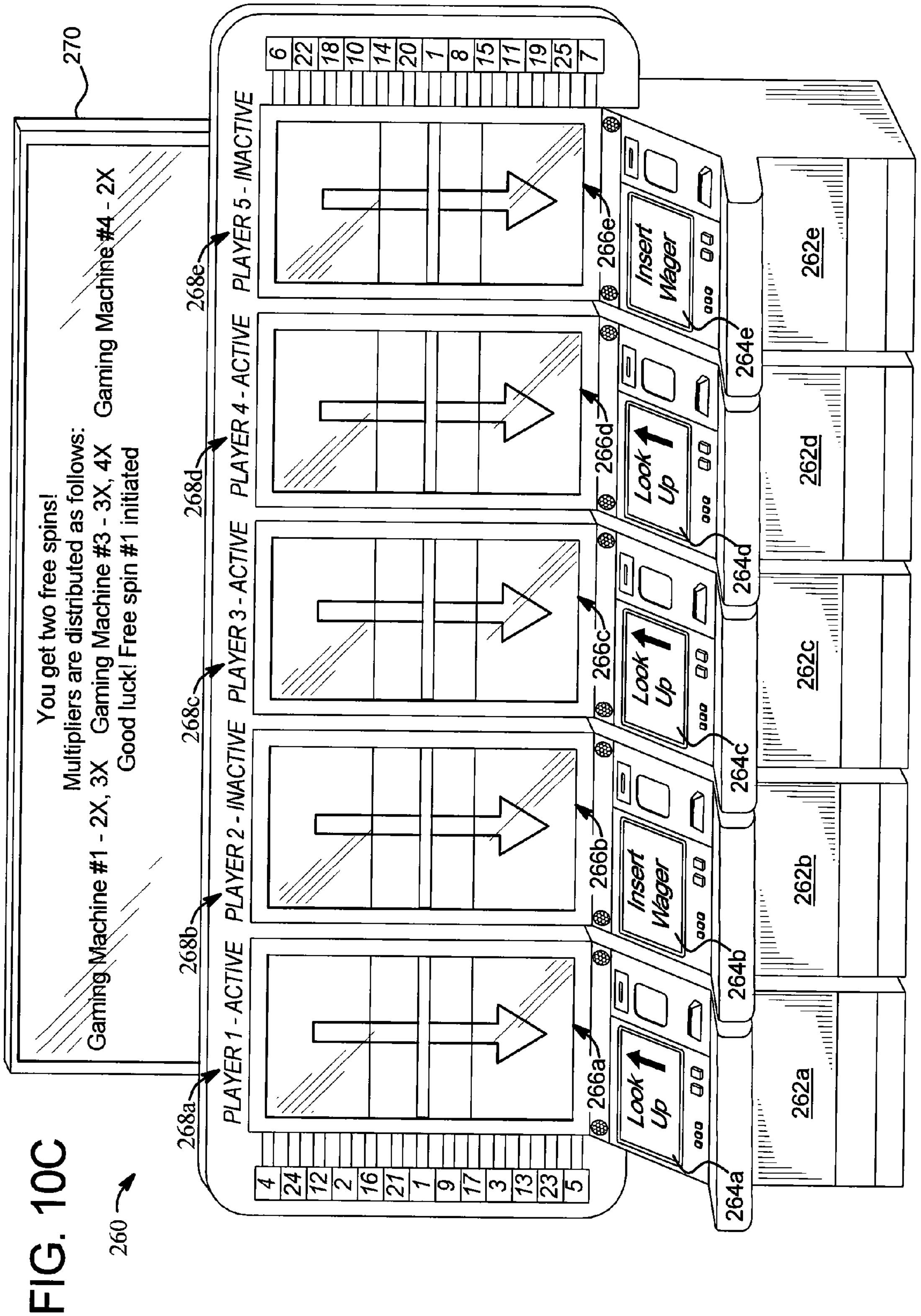

As illustrated in FIG. 10A, three of the gaming machines 262*a*, 262*c* and 262*d* are actively being played by players. As illustrated in FIG. 10B, the third gaming machine 262*c* generates the symbol combination of star-star-star on the payline of the slot game. Therefore, the free spin multi-component game is initiated. As illustrated in FIG. 10C, in this embodiment, the number of free spins provided to the players is a mystery and may be determined in any suitable manner. In this illustrated embodiment, the gaming system randomly determines to provide two free spin games to the players for the multi-component game.

The gaming system determines the number of multipliers to provide to each player. The gaming machine determines which players are active which is indicated on the active displays of the gaming machines of the active players 268*a*, 268*c* and 268*d*.

The gaming system next determines the relative coin-in of the active players to determine the distribution of the multipliers. In this example, the player of the first gaming machine wagered the largest amount which included the second wagers since the last multi-component triggering event or had the highest percentage of coin-in which included the second wager. Therefore, the first gaming machine 262*a* is awarded two multipliers, a 2× multiplier and a 3× multiplier. In the illustrated example, the third and fourth gaming machines had an equal percentage of coin-in which included the second wager. Therefore, the triggering gaming machine 262*c* receives one multiplier, the 3× multiplier, for initiating the free spin game and receives a second 4× multiplier for the coin-in. The fourth gaming machine 262*d* receives a single 2× multiplier for the coin-in. In the illustrated example, a first multiplier awarded to a gaming machine is automatically applied to any award from the first free spin game and the second multiplier, if provided, is applied to any award from the second free spin game spin.

Figure 10D:
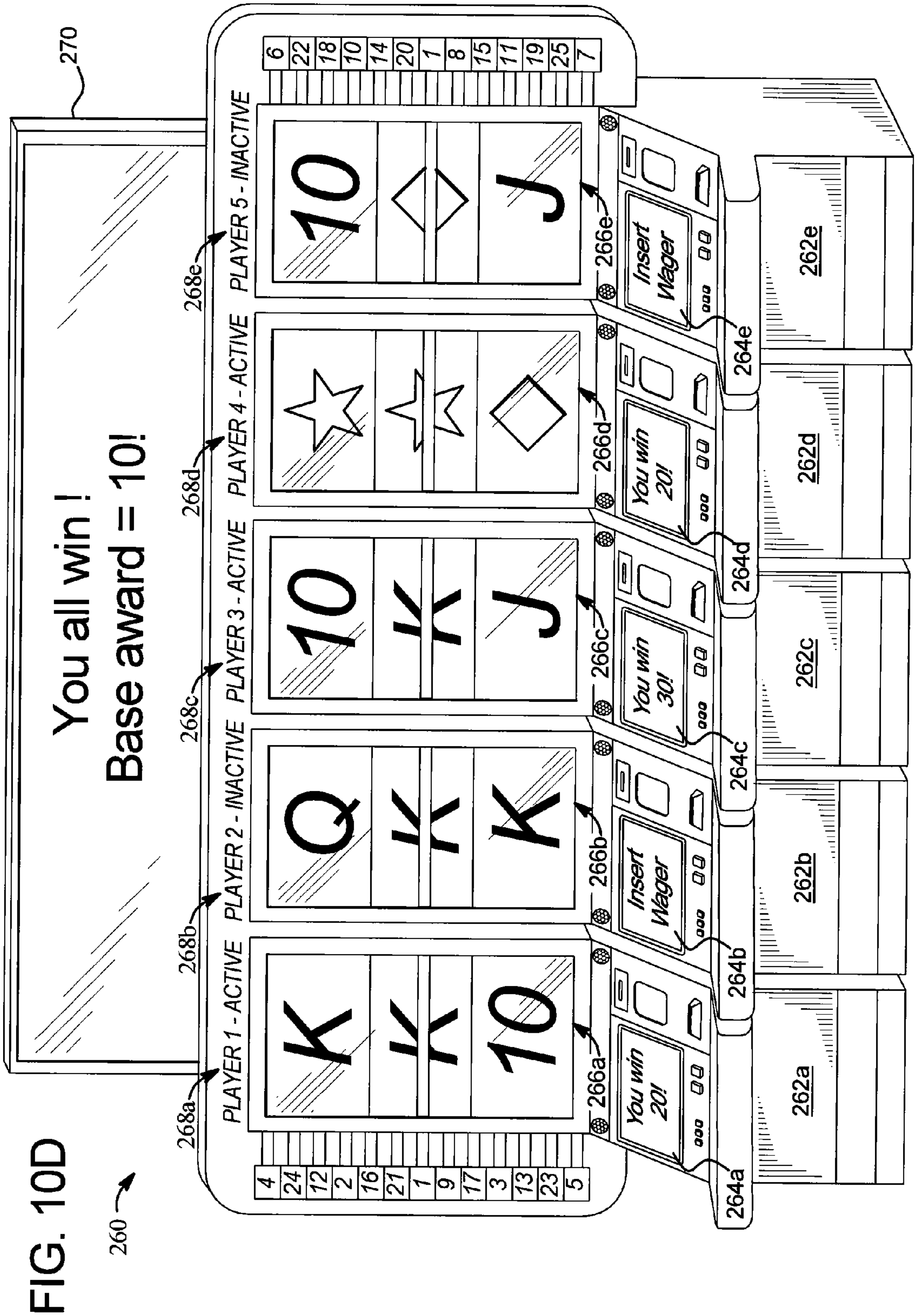

As illustrated in FIG. 10D, on the first of the two free spins, the first three of the gaming machines display a k symbol on the payline of the component display devices. Therefore, the base award for each player is 10 credits. However, the player of the first gaming machine wins 20 credits because of the 2× multiplier. The player of the third gaming machine wins 30 credits because of the 3× multiplier. The player of the fourth gaming machine wins 20 because of the 2× multiplier.

Figure 10E:
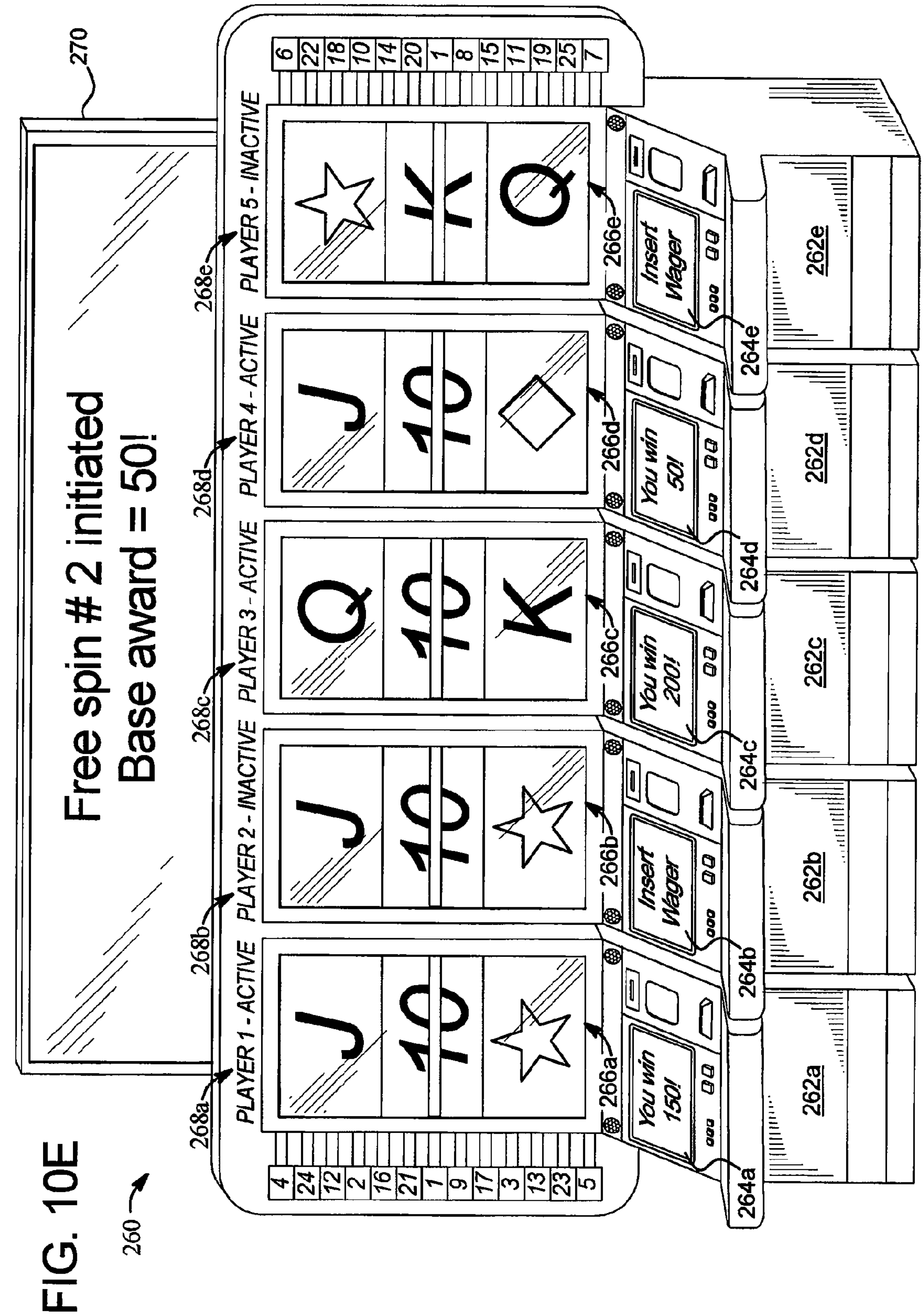

The players won two free spins, and the gaming system spins the reels again. As illustrated in FIG. 10E, four of the gaming machines generate a 10 symbol in the multi-component game. Therefore, the base award won by the players is 50. Therefore, the player of the first gaming machine 262*a* wins 150 credits because of the 3× multiplier. The player of the third gaming machine wins 200 credits because of the 4× multiplier and the player of the third gaming machine won 50 because there was not a multiplier applied to the score of the second free spin game.

It should be appreciated that the gaming system may implement a free spin game or multi-component game in any suitable manner. In one embodiment, upon a triggering event, every component display displays a new component or displays a change of a component even if there is not a player playing on that gaming machine. For example, for a multi-component slot game, upon a triggering event, each of the reels spin for the triggering player. In another embodiment, only certain of the component display devices display a new component upon an occurrence of a triggering event. For example, only active gaming machines may display a new component. It should be appreciated that any suitable number of gaming machines may display a new component upon an occurrence of a triggering event.

In one embodiment, there is a benefit, bonus or an advantage associated with the multi-component game, such as the multipliers in the example illustrated in FIGS. 10A to 10E. It should be appreciated that the benefit associated with the multi-component game may include any suitable benefit. In one embodiment, the player may choose when to use the benefit. For example, if the player is awarded a plurality of multipliers, the player may wager all of the multipliers on one multi-component game or decide how to allocate the multipliers in the multi-component games. In another embodiment, the gaming system automatically implements the benefit or the advantage. In another embodiment, the player wins a benefit or an advantage in the multi-component game that may be applied to a primary game.

It should be appreciated that the players may qualify for the benefits or the advantages in any suitable manner. It should also be appreciated that players may be eligible for or qualify for the multi-component game in any suitable manner. In one embodiment, not all active non-triggering players are enabled to play the multi-component game. That is, the players must fulfill additional criteria or requirements to play the multi-component game. In one embodiment, a player's eligibility for the multi-component game is based on if a player qualifies for one or more benefits. For example, if the advantage is extra points which are based on player tracking, the player does not qualify for the extra points, then the player is not eligible to play the multi-component game if they did not trigger the multi-component. In another example, if the benefits are multipliers and the player does not meet the requirements to obtain a multiplier then the player is not enabled to participate in the multi-component game.

In another embodiment, at least one of the triggering events of the multi-component game is based on the amount of the wagers or total amount wagered at that gaming machine. For example, every time a total of $5 is wagered on that machine, the gaming machine generates a new component on the component display device. Then, the gaming machine starts the count over and when the next $5 is wagered, the gaming machine generates a new component on the component display device. Likewise, the evaluation triggering event is a wager threshold. In one embodiment, the evaluation event is triggered upon a larger wager amount than the component generating event. That is, component triggering events are more frequent than evaluation triggering events. Either or both triggering events may be based on the wager amount for a single gaming machine and thus be the only triggering events for that gaming machine.

Either or both triggering events for the entire gaming system may be based on the wager as well. In one embodiment, the component triggering event is a certain total wager has been wagered on the gaming system, and triggers the generation of a component on every gaming machine. In another embodiment, the evaluation triggering event is a certain total wager has been wagered on the gaming system. In one embodiment, this evaluation triggering event triggers an evaluation and multi-component game outcome for one or more active gaming machines.

In one embodiment, both the component triggering event and the evaluation triggering event are based on the number of credits or monetary units wagered on the gaming system. For example, the component triggering event is when 1000 credits are wagered on the gaming system. That is, when 1000 total credits are wagered on or at the gaming system, one or more gaming machines generate a new component on the component display devices. In one embodiment, all active gaming machines generate a new component on the component display devices. In one embodiment, the evaluation triggering event is 1500 credits being wagered on the total wagering system. That is, every time 1500 total credits are wagered at the individual gaming machines, one or more of the gaming machines evaluates the generated symbols and provides the player a multi-component outcome and/or award based on the generated symbols. In another embodiment, the central controller evaluates the generated symbols and causes one or more individual gaming machines to provide to the player an award based on the generated symbols.

In another embodiment, both the component triggering event and the evaluation triggering event are based on wagers on the individual gaming machines. In one such embodiment, the component triggering event and the evaluation triggering event are based on the number of credits wagered at that gaming machine. For example, the generation of a new component occurs when 50 credits are wagered on that gaming machine. That is, the component triggering event is the total wagers equaling 50 credits. In one embodiment, all active gaming machines generate a new component on the component display devices upon a designated number of credits wagered. In one embodiment, the evaluation triggering event is 500 credits being wagered on or at that gaming machine. That is, every time 500 credits are wagered, the gaming machine evaluates the generated components and provides the player an award based on the generated components. In another embodiment, the central controller evaluates the generated components and causes the triggering gaming machine to provide the player an award, if any, based on the generated component.

In another embodiment, the component triggering event and the evaluation triggering event are based on time. In one embodiment, the component triggering event is the same as the evaluation triggering event and each occur every N minutes. Therefore, at a certain time interval all of the component display devices of the gaming machines generate and display a new component on each of the component display devices and one or more of the gaming machines evaluate the components and provide an award. In one embodiment, the new components are requested by the server. That is, the server instructs one or more of the gaming machines to generate a new component and the gaming machines generate and display one of the components of the multi-component game whether or not a player is actively playing the gaming machine. In another embodiment, the server determines which component for that gaming machine to display. In another embodiment, only active gaming machines display a new component on each of the component display devices. In another embodiment, only active gaming machines perform the evaluation step.

In another embodiment, the component triggering event and the evaluation triggering event are the same event based on time intervals as described above. In this embodiment, a portion or segment of the bet is wagered on the primary game and a portion of the bet is wagered on the multi-component game. In one embodiment, the portion wagered for each game is a set percentage or amount of the bet, for example 90% is wagered on the primary game and 10% is wagered on the multi-component game. The award provided for each of these games is based on the percentage wagered on that game. For example, the component and evaluation triggering events occur every five minutes. During those five minute segments, 10% of the accumulated wager is wagered on the multi-component game. That is, the wagers placed at each gaming machine during the time interval accumulate for the multi-component game. In one embodiment, this portion is displayed on a multi-component wager meter. For example, in the five minute period a first player wagers $2000, $200 of those credits are wagered on the multi-component game upon the occurrence of the triggering event at the end of the time interval. A second player wagers $100 in the five minute period, only $1 is wagered on the multi-component game. After the five minute period is up, each gaming machine generates a new component on the component display devices. In this embodiment, each gaming machine provides an award to the player based on that player's wager and the multi-component game outcome. It should be appreciated that in this embodiment, the component triggering event and the evaluation triggering events may be different events.

It should be appreciated that any suitable aspect of the gaming system may be controlled by a single processor such as a central controller or central server or different aspects of the gaming system may be controlled by multiple processors. A single processor or multiple processors may control: (a) the determination of what the component triggering is; (b) the determination of what the evaluation triggering is; (c) the detection of an occurrence of a component triggering event; (d) the detection of an occurrence of an evaluation triggering event; (e) the generation of components; (f) the display of components; (g) the evaluation of components; (h) the determination of an award; and (i) any combination thereof. One or more processors may communicate in any suitable manner to implement one, a plurality or all of the features of the present disclosure.

In another embodiment, the components of the multi-component games are a plurality of symbols. In one embodiment, the plurality of symbols includes at least one special symbol such as a bonus symbol. In one embodiment, every gaming machine has an equal probability of generating the bonus symbol in the multi-component game. In one embodiment, when one of the gaming machines generates the bonus symbol upon a component triggering event, that gaming machine provides the player an award based on the bonus symbol regardless of whether the evaluation triggering event has occurred. In one embodiment, this bonus award is a separate award than the multi-component game award. Upon an evaluation triggering event, the gaming machine evaluates all of the generated components and provides the player with a separate multi-component game outcome and an award, separate from any generated bonus awards.

In another embodiment, the probability of generating one of the bonus symbols increases as the wager increases. For example, each gaming machine has a 1 in 20 chance of generating a bonus symbol. However, when a player wagers more than $5, that gaming machine has a 1 in 10 chance of generating a bonus symbol. In one embodiment, the bonus symbols are wild symbols.

It should be appreciated that the primary game and the multi-component may be any suitable game. The primary game may be, but is not limited to, auction, slot, bingo, poker, keno, blackjack, craps, bunco, checkers and any combination thereof. The multi-component game may be, but is not limited to, auction, slot, bingo, poker, keno, and any combination thereof.

It should be appreciated that each gaming machine may include: a) a component triggering event and/or b) an evaluation triggering event. The component triggering event causes the generation and display of one or more components of the game. The evaluation triggering event causes an evaluation of the generated components in the multi-component game to provide a multi-component game outcome to one or more players of the gaming system. It should be appreciated that the component triggering event and/or the evaluation triggering event may be any suitable event in the primary game, such as but not limited to: length of primary game play, a primary game outcome, a symbol combination, a generated symbol, a point accumulation, player input or any other suitable feature or function of the primary game. It should be appreciated that the component triggering event or the evaluation triggering event may be any suitable event outside the primary game, such as wager amount, a side bet, an input by a game implementer, time interval, or any other suitable feature.

It should be appreciated that one or more aspects of the primary game may influence or determine any aspect or component of the multi-component game, in addition to providing one or both of the component triggering event and the evaluation triggering event. In one embodiment, the length of time of the primary game determines an aspect of the multi-component game. In another embodiment, the length of time a player is playing the gaming machine determines an aspect of the multi-component game. In one embodiment, the amount of the wager determines an aspect or characteristic of the multi-component game. In another embodiment, an input during the primary game, such as pressing a button, determines an aspect of the multi-component game. In another embodiment, a primary game result determines any aspect of the multi-component game. In another embodiment, the primary game wager determines an aspect of the multi-outcome game. It should be appreciated that any suitable aspect of a primary game can determine any suitable characteristic or aspect of the multi-component game.

It should be appreciated any suitable aspect or feature of the multi-component game may be influenced by one or more factors of the primary game, such as but not limited to, the multi-component game provided to a player, a paytable, an average payback percentage, an eligibility for a bonus game, a symbol generation or a number generation, an eligibility for a multiplier, a progressive award, bonus credits or monetary units, a number of selections in a game, a number of plays in a game, a number of games, a number of paylines, an amount of a modifier such as a multiplier and/or a number of rounds in a game.

It should be appreciated that one or more aspects of the primary game, or the multi-outcome game may influence or determine any aspect or component one or more additional bonus or secondary games. In one embodiment, the length of time of the primary game and/or the multi-component game determines an aspect of the bonus game. In another embodiment, the length of time a player is playing the gaming machine determines an aspect of the bonus game. In one embodiment, the amount of the wager, or wagers above a certain level determine an aspect or characteristic of the secondary game. In another embodiment, an input during the primary game and/or the multi-component game, such as pressing a button, determines an aspect of the bonus game. In another embodiment, the result of the primary game and/or the multi-component game determines any aspect of the bonus game. In another embodiment, the primary game wager determines an aspect of the bonus game. It should be appreciated that any suitable aspect of the primary game and/or the multi-component game can determine any suitable characteristic or aspect of the multi-component game.

The characteristics or aspects of the secondary or bonus game determined or influenced by any suitable aspect of the primary game and/or the multi-component game include but are not limited to: a multiplier, which bonus game the player is enabled to play, the opportunity to play bonus game, the length of the bonus game, an award in the bonus game, the number of bonus games, or any other suitable aspect of the secondary game. Likewise, the secondary or bonus game may determine any aspect of the primary game and/or the multi-component game.

In one embodiment, only the triggering gaming machine provides an award to the player. That is, the player of the gaming machine with the occurrence of the evaluation event is the only player with the chance to receive an award. In this embodiment, the gaming system does not determine which gaming machines are active or inactive because only one specific gaming machine is providing an award. In another embodiment, the gaming machines and gaming system provide more than one player an award. In one such embodiment, the gaming system determines the active status of each gaming machine of the gaming system. The gaming system enables other non-triggering gaming machines to participate in either one or both of the component generation and the evaluation event.

In one embodiment, upon the occurrence of either a component triggering event or an evaluation triggering event, the triggering gaming machine is considered active or to be in an active state. That is, the gaming machine is active to either generate a component of the multi-component game and/or evaluate the generated components of the gaming system to provide a multi-component outcome to the player.

In one embodiment, the gaming system enables active or eligible gaming machines to participate in the multi-component game or have a chance to win awards from the multi-component game even though they did not have an occurrence one of the triggering events. That is, the gaming system enables other non-triggering gaming machines to participate in either or both of the component generation and the evaluation event. In one embodiment, if the gaming machine is active during the occurrence of the component triggering event at another one of the gaming machines, any gaming machine which is active, in addition to the triggering gaming machine, generates at least one component of the multi-component game. In one embodiment, if the gaming machine is active during the occurrence of an evaluation triggering event at one of the other gaming machines, the non-triggering gaming machine is operable with the central controller to evaluate the generated and displayed components of the multi-component game on the adjacently arranged gaming machines to determine the multi-component game outcome and if the multi-component game outcome results in an award to provide the award to the player of the active gaming machine.

Active status means that the gaming machine is being actively played by a player, wherein the active status requirements can be based on any suitable number of satisfied criteria or defined in any suitable manner by the implementer of the gaming system. For example, the current level of a gaming machine's accumulated wager pool (i.e., is the accumulated wager pool at or above a designated threshold wager level) may be part of the determination of whether that gaming machine is in the active status. In one embodiment, actively playing during a multi-component game event qualification period means that the player is playing the primary game of the gaming machine (i.e., placing wagers on plays of the primary game) at least at a predefined minimum rate during a predefined time period. For example, the gaming machine may be in active status when a player has made at least one play of the primary game in a fifteen second period prior to the component triggering event. In this example, the multi-component game event qualification period is that fifteen second period prior to the triggering of the multi-component game event.

In another embodiment, the active status is alternatively or additionally based on the amount wagered on the plays of the primary game during a multi-component game event qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming machines. In another embodiment, a gaming machine can only be determined to be an active gaming machine if an additional wager, such as a side-bet or side-wager, is made by a player at a gaming machine of the gaming system for one player of a game, a plurality of plays of a game or all plays of a game in a designed period of time, such as a for a designated time interval. It should be appreciated that a gaming machine is classified as active based on any one or more suitable parameters or criteria as determined by the implementer or operator of the gaming system. It should be appreciated that these parameters and criteria may define the component triggering event. Therefore, instead of only one gaming machine having a component triggering event and/or an evaluation triggering event and then determining if the gaming machines are active or inactive, each gaming machine that satisfies the parameter has the occurrence of a component triggering event and/or an evaluation triggering event.

Additionally, it should be appreciated that the gaming system disclosed herein contemplates other or additional methods for determining that a gaming machine is active. For instance, the player may be enabled to make a side wager or additional wager to be active for one or more subsequent multi-component game events or bonus events. The side wager feature could also be time based where the additional wager causes the gaming machine to be active for a subsequent time period, such as one minute. In another alternative embodiment, a minimum wager level is required for a gaming machine to qualify to participate in the multi-component game. In one embodiment, this minimum wager level is the maximum wager level for the primary game in the gaming machine. This requirement is in addition to the requirement that the gaming machine include a component triggering event and/or evaluation triggering event. Another method for determining if the gaming machine is active is whether or not the player has wagered a minimum level of monetary units since the occurrence of the last multi-component game event.

It should also be appreciated that one or more additional statuses may be employed. For instance, a gaming machine will be in a participating status if an individual player playing the gaming machine is a premier player. This could be determined at least in part based on the status of that player determined via a player tracking card used by that player in the gaming machine. It should be appreciated that other criteria can be used to determine if a player is in the participating status. It should be further appreciated that when a gaming machine is in the participating status, the gaming system automatically treats the gaming machine as an active gaming machine for purposes of the other determinations including bonus event eligibility by the gaming system.

Inactive status means that the gaming machine is one of the gaming machines in the gaming system, but is not in the active status (i.e., not being actively played by a player according to one or more of the predetermined criteria).

It should be appreciated that the award for the multi-component game may be any suitable award. In one embodiment, the award is a monetary award. In another embodiment, it is a prize, such as a hotel stay or a free dinner. It should be appreciated that the numbers displayed by gaming machines for the multi-component game may also change, such as in a progressive game. In one embodiment, the gaming system includes a plurality of awards and a multi-level progressive game.

In an alternative embodiment, the multi-component game is the only game of the gaming machine. A player inserts a wager and wagers only on the multi-component game. That is, the multi-component game is not associated with any a triggering conditions and is not accompanied by a primary game. It should be appreciated that in this embodiment any suitable queuing method can be introduced to enable any amount of players to play.

It should be appreciated that any embodiments or aspects of the present disclosure can be combined to form any suitable game with a multi-component game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming machines, each of the gaming machines including:

(a) a primary game display device configured to display a primary game, said primary game operable upon a wager, (b) at least one input device configured to enable a player of said gaming machine to make the wager on the primary game to cause a play of the primary game including a random generation of an outcome for said play of the primary game, and (c) at least one secondary game component display device located above said primary game display device and configured to display at least one, but not all, of a plurality of components of a multi-component secondary game; and at least one processor programmed to:

(i) upon an occurrence of a designated component triggering event, for each of a first determined number of the gaming machines, said first determined number being at least two, regardless of whether said gaming machines are being played by any players:

(1) randomly generate at least one of the components, each said generation being in addition to the outcomes randomly generated for plays of the primary game, and (2) cause the at least one secondary game component display device of said gaming machine to display said at least one generated component independently of any of the components displayed by any of the secondary game component display devices of any of the other gaming machines, and (ii) after displaying said at least one generated component and upon an occurrence of an evaluation triggering event, which is in addition to and independent of the display of said at least one generated component, evaluate a combination of components displayed by the at least one secondary game component display devices of a second determined number of the gaming machines to determine a multi-component secondary game outcome, said second determined number being at least two and said designated component triggering event and said evaluation triggering event being independent separately triggered events, and if an award is associated with said multi-component secondary game outcome, cause at least a portion of said award to be provided to one of the players of one of the gaming machines.

2. The gaming system of claim 1, wherein the at least one processor includes a central controller and the central controller is programmed to detect the occurrence of the designated component triggering event.

3. The gaming system of claim 2, wherein the central controller is programmed, upon the occurrence of the designated component triggering event, for each of the first determined number of the gaming machines to randomly generate at least one of the components, and to cause the secondary game component display device of said gaming machine to display said at least one generated component.

4. The gaming system of claim 1, wherein the at least one processor includes a processor of one of the gaming machines, wherein said processor is programmed to detect the occurrence of the designated component triggering event.

5. The gaming system of claim 4, wherein said processor is programmed, upon the occurrence of the designated component triggering event, for said gaming machine to randomly generate at least one of the components, and to cause the secondary game component display device of said gaming machine to display said at least one generated component.

6. The gaming system of claim 1, wherein the at least one processor includes a central controller and the central controller is programmed to detect the occurrence of the evaluation triggering event.

7. The gaming system of claim 6, wherein the central controller is programmed, upon the occurrence of the evaluation triggering event, to evaluate the combination of components displayed by the secondary game component display devices of the second determined number of the gaming machines to determine the multi-component secondary game outcome.

8. The gaming system of claim 1, wherein the at least one processor includes a processor of one of the gaming machines, wherein said processor is programmed to detect the occurrence of the evaluation triggering event.

9. The gaming system of claim 8, wherein said processor is programmed, upon the occurrence of the evaluation triggering event, to evaluate the combination of components displayed by the secondary game component display devices of the second determined number of the gaming machines to determine the multi-component secondary game outcome.

10. The gaming system of claim 1, wherein the at least one processor includes a central controller and a plurality of gaming machine processors.

11. The gaming system of claim 10, wherein the central controller is programmed, upon the occurrence of the designated component triggering event, for each of the first determined number of the gaming machines to randomly generate at least one of the components.

12. The gaming system of claim 10, wherein at least one of the gaming machine processors is programmed, upon the occurrence of the evaluation triggering event, to evaluate the combination of components displayed by the secondary game component display devices of the second determined number of the gaming machines to determine the multi-component secondary game outcome.

13. The gaming system of claim 12, wherein the central controller is programmed, upon the occurrence of the designated component triggering event, for each of the first determined number of the gaming machines to cause the secondary game component display device of said gaming machine to display said at least one generated component.

14. The gaming system of claim 10, wherein the central controller is programmed, upon the occurrence of the evaluation triggering event, to evaluate the combination of components displayed by the secondary game component display devices of the second determined number of the gaming machines to determine the multi-component secondary game outcome.

15. The gaming system of claim 10, wherein at least one of the gaming machine processors is programmed, upon the occurrence of the designated component triggering event, for said gaming machine to randomly generate at least one of the components.

16. The gaming system of claim 10, wherein at least one of the gaming machine processors is programmed, upon the occurrence of the designated component triggering event, to cause the secondary game component display device of said gaming machine to display said at least one generated component.

17. The gaming system of claim 10, wherein at least one of the gaming machine processors is programmed, upon the occurrence of the evaluation triggering event, to evaluate the combination of components displayed by the secondary game component display devices of the second determined number of the gaming machines to determine the multi-component secondary game outcome.

18. The gaming system of claim 10, wherein the central controller processor is programmed, upon the occurrence of the designated component triggering event, for each of the first determined number of the gaming machines to randomly generate at least one of the components and to cause the secondary game component display device of said gaming machine to display said at least one generated component, and at least one of the gaming machine processors is programmed upon the occurrence of the evaluation triggering event to evaluate the combination of components displayed by the secondary game component display devices of the second determined number of the gaming machines to determine the multi-component secondary game outcome.

19. The gaming system of claim 10, wherein each of the gaming machine processors is programmed, upon the occurrence of the evaluation triggering event, to evaluate the combination of components displayed by the secondary game component display devices of the second determined number of the gaming machines to determine the multi-component secondary game outcome and if the award is associated with said multi-component secondary game outcome, cause at least the portion of said award to be provided to the player of said gaming machine.

20. The gaming system of claim 1, which includes a bonus game in addition to the multi-component secondary game.

21. The gaming system of claim 1, wherein the first determined number is all of the plurality of gaming machines.

22. The gaming system of claim 1, wherein the first determined number is less than all of the plurality of gaming machines.

23. The gaming system of claim 1, wherein the second determined number is all of the plurality of gaming machines.

24. The gaming system of claim 1, wherein the second determined number is less than all of the plurality of gaming machines.

25. The gaming system of claim 1, wherein the portion of the award is one hundred percent of the award.

26. The gaming system of claim 1, wherein the portion of the award is less than one hundred percent of the award.

27. The gaming system of claim 1, wherein the evaluation is based on an order of the combination of components displayed by the secondary game component display devices of the second determined number of the gaming machines to determine the multi-component secondary game outcome, said second determined number being at least two.

28. The gaming system of claim 1, wherein the gaming machines are adjacently arranged.

29. The gaming system of claim 1, wherein the combination of components displayed by the secondary game component display devices are in substantial alignment.

30. A gaming system comprising:

a plurality of gaming machines, each of the gaming machines including:

(a) a primary game display device configured to display a primary game, said primary game operable upon a wager, and (b) at least one input device configured to enable a player of said gaming machine to make the wager on the primary game to cause a play of the primary game including a random generation of an outcome for said play of the primary game;

a secondary game display device located above said primary game display devices and configured to display a plurality of components of a multi-component secondary game, wherein at least a portion of the secondary game display device is associated with each gaming machine, and each said portion is configured to operate at least one processor to display at least one, but not all, of the components of the multi-component secondary game; and said at least one processor programmed to:

(i) upon an occurrence of a designated component triggering event, for each of a first determined number of the gaming machines, said first determined number being at least two, regardless of whether said gaming machine is being played by any players:

(1) randomly generate at least one of the components, each said generation being in addition to the outcomes randomly generated for plays of the primary game, and (2) cause the portion of the secondary game display device associated with said gaming machine to display the at least one generated component independently of any of the other portions of the secondary game display device associated with, and (ii) after displaying said at least one generated component and upon an occurrence of an evaluation triggering event, which is in addition to and independent of the display of said at least one generated component, evaluate a combination of the at least one generated component displayed by the portions of the secondary game display device associated with a second determined number of the gaming machines to determine a multi-component secondary game outcome, said second determined number being at least two and said designated component triggering event and said evaluation triggering event being independent separately triggered events, and if an award is associated with said multi-component secondary game outcome, cause at least a portion of said award to be provided to one of the players of one of the gaming machines.

31. The gaming system of claim 30, wherein the at least one processor includes a central controller and the central controller is programmed to detect the occurrence of the designated component triggering event.

32. The gaming system of claim 31, wherein the central controller is programmed, upon the occurrence of the designated component triggering event, for each of the first determined number of the gaming machines to randomly generate at least one of the components, and to cause the portion of the secondary game component display device associated with said gaming machine to display said at least one generated component.

33. The gaming system of claim 31, wherein the central controller is programmed, upon the occurrence of the designated component triggering event, for each of the first determined number of the gaming machines to randomly generate at least one of the components, and to cause the portion of the secondary game component display device associated with said gaming machine to display said at least one generated component.

34. The gaming system of claim 33, wherein said processor is programmed, upon the occurrence of the designated component triggering event, for said gaming machine to randomly generate at least one of the components, and to cause the portion of the secondary game component display device associated with said gaming machine to display said at least one generated component.

35. The gaming system of claim 30, wherein the at least one processor includes a central controller and the central controller is programmed to detect the occurrence of the evaluation triggering event.

36. The gaming system of claim 35, wherein the central controller is programmed, upon the occurrence of the evaluation triggering event, to evaluate the combination of components displayed by the portions of the secondary game display device associated with the second determined number of the gaming machines to determine the multi-component secondary game outcome.

37. The gaming system of claim 30, wherein the at least one processor includes a processor of one of the gaming machines, wherein said processor is programmed to detect the occurrence of the evaluation triggering event.

38. The gaming system of claim 37, wherein said processor is programmed, upon the occurrence of the evaluation triggering event, to evaluate the combination of components displayed by the portions of the secondary game display device associated with the second determined number of the gaming machines to determine the multi-component secondary game outcome.

39. The gaming system of claim 30, wherein the at least one processor includes a central controller and a plurality of gaming machine processors.

40. The gaming system of claim 39, wherein the central controller is programmed, upon the occurrence of the designated component triggering event, for each of the first determined number of the gaming machines to randomly generate at least one of the components.

41. The gaming system of claim 39, wherein at least one of the gaming machine processors is programmed, upon the occurrence of the evaluation triggering event, to evaluate the combination of components displayed by the portions of the secondary game display device associated with the second determined number of the gaming machines to determine the multi-component secondary game outcome.

42. The gaming system of claim 41, wherein the central controller is programmed, upon the occurrence of the designated component triggering event, for each of the first determined number of the gaming machines to cause the portion of the secondary game component display device associated with said gaming machine to display said at least one generated component.

43. The gaming system of claim 39, wherein the central controller is programmed, upon the occurrence of the evaluation triggering event, to evaluate the combination of components displayed by the portions of the secondary game display device associated with the second determined number of the gaming machines to determine the multi-component secondary game outcome.

44. The gaming system of claim 39, wherein at least one of the gaming machine processors is programmed, upon the occurrence of the designated component triggering event, for said gaming machine to randomly generate at least one of the components.

45. The gaming system of claim 39, wherein at least one of the gaming machine processors is programmed, upon the occurrence of the designated component triggering event, to cause the portion of the secondary game component display device associated with said gaming machine to display said at least one generated component.

46. The gaming system of claim 39, wherein the central controller processor is programmed, upon the occurrence of the designated component triggering event, for each of the first determined number of the gaming machines to randomly generate at least one of the components, and to cause the portion of the secondary game component display device associated with said gaming machine to display said at least one generated component, and at least one of the gaming machine processors is programmed, upon the occurrence of the evaluation triggering event, to evaluate the combination of components displayed by the portions of the secondary game display device associated with the second determined number of the gaming machines to determine the multi-component secondary game outcome.

47. The gaming system of claim 39, wherein each of the gaming machine processors is programmed, upon the occurrence of the evaluation triggering event, to evaluate the combination of components displayed by the portions of the secondary game display device associated with the second determined number of the gaming machines to determine the multi-component secondary game outcome and if the award is associated with said multi-component secondary game outcome, cause at least the portion of said award to be provided to the player of said gaming machine.

48. The gaming system of claim 30, which includes a bonus game in addition to the multi-component secondary game.

49. The gaming system of claim 30, wherein the first determined number is all of the plurality of gaming machines.

50. The gaming system of claim 30, wherein the first determined number is less than all of the plurality of gaming machines.

51. The gaming system of claim 30, wherein the second determined number is all of the plurality of gaming machines.

52. The gaming system of claim 30, wherein the second determined number is less than all of the plurality of gaming machines.

53. The gaming system of claim 30, wherein the portion of the award is one hundred percent of the award.

54. The gaming system of claim 30, wherein the portion of the award is less than one hundred percent of the award.

55. The gaming system of claim 30, wherein the evaluation is based on an order of the combination of components displayed by the portions of the secondary game display device associated with the second determined number of the gaming machines to determine the multi-component secondary game outcome, said second determined number being at least two.

56. The gaming system of claim 30, wherein the gaming machines are adjacently arranged.

57. The gaming system of claim 30, wherein the combination of components displayed by the secondary game component display device are in substantial alignment.

58. A gaming system comprising:

a plurality of gaming machines, each gaming machine having a primary game;

a multi-component game display configured to display components of a multi-component game, each component displayed in association with one, but not all, of the gaming machines associated with said multi-component game display;

a memory device; and at least one processor networked with the gaming machines, multi-component game display and memory device, said at least one processor configured to:

(i) upon an occurrence of a designated component triggering event, cause a random generation of at least one component, each random generation being in addition to any primary game random generation, and cause the randomly generated component to be displayed on the multi-component display in association with one of the gaming machines regardless of whether said gaming machine is being played by any player, said randomly generated component displayed independently of any of the components displayed in association with any of the other gaming machines; and (ii) after displaying said at least one generated component and upon an occurrence of an evaluation triggering event, which is in addition to and independent of the display of said at least one generated component, evaluate a combination of a plurality of displayed components being simultaneously displayed in association with at least two of the gaming machines in a predetermined arrangement, the designated component triggering event and the evaluation triggering event being independent separately triggered events and cause at least one of the gaming machines to provide an award if the evaluated combination is a winning combination.

59. The gaming system of claim 58, wherein the multi-component game display includes a plurality of display devices.

60. The gaming system of claim 59, wherein each of the plurality of display devices is individually associated with a separate one of the plurality of gaming machines.

61. The gaming system of claim 58, wherein the at least one processor includes a central controller.

62. The gaming system of claim 58, wherein the at least one processor includes a gaming machine processor.

63. The gaming system of claim 58, wherein said at least one processor includes a central controller and a gaming machine processor of each gaming machine.

64. The gaming system of claim 63, wherein the central controller is configured to cause the random generation of the at least one component.

65. The gaming system of claim 64, wherein at least one of the gaming machine processors is configured to cause the randomly generated component to be displayed on the multi-component display in association with one of the gaming machines.

66. The gaming system of claim 63, wherein the central controller is configured to cause the randomly generated component to be displayed on the multi-component display in association with one of the gaming machines.

67. The gaming system of claim 66, wherein at least one of the gaming machine processors is configured to cause the random generation of the at least one component.

* * * * *

UNITED STATES PATENT AND TRADEMARK OFFICE

CERTIFICATE OF CORRECTION

PATENT NO. : 8,216,065 B2
APPLICATION NO. : 11/470169
DATED : July 10, 2012
INVENTOR(S) : Joseph E. Kaminkow et al.

It is certified that error appears in the above-identified patent and that said Letters Patent is hereby corrected as shown below:

IN THE CLAIMS

In Claim 18, Column 44, Line 24, delete “processor”.
In Claim 27, Column 44, Lines 66 to 67, delete “, said determined number being at least two”.
In Claim 30, Column 45, Line 17, after “game;” insert --and--.
In Claim 30, Column 45, Line 26, delete “and”.
In Claim 30, Column 45, Line 23, after “operate” insert --with--.
In Claim 30, Column 45, Line 42, delete “associated with”.
In Claim 30, Column 45, Lines 47 to 48, delete “at least one generated” and replace “component” with --components--.
In Claim 34, Column 46, Line 12, replace “33” with --30-- and between “said” and “processor” insert --at least one--.
In Claim 34, Column 46, Line 14, replace “for said” with --to cause a--.
In Claim 46, Column 47, Line 16, delete “processor”.
In Claim 55, Column 47, Line 60, delete “, said second determined number being at least two”.
In Claim 58, Column 48, Line 11, between “machines,” and “multi-component” and between “and” and “memory” insert --the--.
In Claim 58, Column 48, Line 17, between “the” and “randomly” insert --at least one--.
In Claim 58, Column 48, Lines 20 to 21, between “said” and “randomly” insert --at least one--.
In Claim 65, Column 48, Lines 53 to 54, between “the” and “randomly” insert --at least one--.
In Claim 66, Column 48, Line 58, between “the” and “randomly” insert --at least one--.

Signed and Sealed this
Twenty-eighth Day of May, 2013

Teresa Stanek Rea
*Acting Director of the United States Patent and Trademark Office*